(12) United States Patent
Wang et al.

(10) Patent No.: US 9,843,370 B2
(45) Date of Patent: Dec. 12, 2017

(54) METHOD AND APPARATUS FOR DETERMINING PRECODING MATRIX INDICATOR, USER EQUIPMENT, AND BASE STATION

(71) Applicant: HUAWEI TECHNOLOGIES CO., LTD., Shenzhen (CN)

(72) Inventors: Jianguo Wang, Bonn (DE); Yongxing Zhou, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/463,966

(22) Filed: Mar. 20, 2017

(65) Prior Publication Data
US 2017/0195021 A1    Jul. 6, 2017

Related U.S. Application Data

(63) Continuation of application No. 14/982,286, filed on Dec. 29, 2015, now Pat. No. 9,634,748, which is a
(Continued)

(51) Int. Cl.
*H04B 7/06* (2006.01)
*H04B 7/0456* (2017.01)
(Continued)

(52) U.S. Cl.
CPC ......... *H04B 7/0456* (2013.01); *H04B 7/0639* (2013.01); *H04L 5/0048* (2013.01); *H04W 16/28* (2013.01); *H04J 13/0022* (2013.01)

(58) Field of Classification Search
CPC .. H03M 7/00; H04B 1/38; H04B 7/02; H04B 7/04; H04B 7/0456; H04B 7/06;
(Continued)

(56) References Cited

U.S. PATENT DOCUMENTS

2004/0203468 A1    10/2004    Dent et al.
2007/0280373 A1    12/2007    Lee et al.
(Continued)

FOREIGN PATENT DOCUMENTS

CN    101043298 A    9/2007
CN    101146078 A    3/2008
(Continued)

OTHER PUBLICATIONS

Supplementary European Search Report in Application No. 13887858.2-1874/3007380 PCT/CN2013078514 dated Jul. 11, 2016 (16 pages).
(Continued)

*Primary Examiner* — Shawkat M Ali
(74) *Attorney, Agent, or Firm* — Staas & Halsey LLP

(57) ABSTRACT

The present invention provides a method and an apparatus for determining a precoding matrix indicator, user equipment, and a base station. The method includes: determining a precoding matrix indicator PMI, where the PMI corresponds to a precoding matrix W, and the precoding matrix W satisfies a first condition, a second condition, or a third condition; and sending the PMI to a base station. Embodiments of the present invention further provide a corresponding apparatus, and the corresponding user equipment and base station. Technical solutions provided in the embodiments of the present invention can effectively control a beam, especially a beam shape and a beam orientation, in a horizontal direction and a perpendicular direction.

13 Claims, 9 Drawing Sheets

Related U.S. Application Data continuation of application No. PCT/CN2013/078514, filed on Jun. 29, 2013.

(51) Int. Cl.
*H04W 16/28* (2009.01)
*H04L 5/00* (2006.01)
*H04J 13/00* (2011.01)

(58) Field of Classification Search
CPC .... H04B 7/0626; H04B 7/0639; H04B 15/00; H04B 17/00; H04J 1/16; H04J 3/14; H04J 11/00; H04L 1/00; H04L 1/02; H04L 5/00; H04L 5/14; H04L 12/26; H04L 25/03; H04L 25/49; H04L 27/00; H04L 27/26; H04L 27/28; H04W 4/00; H04W 24/08; H04W 24/10; H04W 40/00; H04W 72/02; H04W 72/04; H04W 72/0406; H04W 72/10; H04W 88/08
USPC ........ 341/106; 370/210, 241, 248, 252, 328, 370/329, 334, 335; 375/140, 219, 259, 375/260, 267, 295, 296, 316, 349; 455/101; 704/238; 708/520, 607
See application file for complete search history.

(56) References Cited

U.S. PATENT DOCUMENTS

| | | |
|---|---|---|
| 2009/0028264 A1 | 1/2009 | Zhang et al. |
| 2011/0110405 A1 | 5/2011 | Lee et al. |
| 2011/0280290 A1 | 11/2011 | Ihm et al. |
| 2011/0319092 A1 | 12/2011 | Kim et al. |
| 2012/0275500 A1 | 11/2012 | Wang et al. |
| 2013/0064129 A1 | 3/2013 | Koivisto et al. |
| 2013/0077660 A1 | 3/2013 | Ko et al. |
| 2013/0121437 A1 | 5/2013 | Wang et al. |
| 2013/0136200 A1 | 5/2013 | Liu |
| 2013/0230081 A1* | 9/2013 | Wernersson ......... H04B 7/0617 375/219 |
| 2013/0242896 A1* | 9/2013 | Son ..................... H04W 72/085 370/329 |
| 2013/0279460 A1 | 10/2013 | Kim et al. |
| 2014/0146756 A1* | 5/2014 | Sahin .................... H04L 1/0025 370/329 |
| 2014/0153427 A1* | 6/2014 | Seo .......................... H04L 1/20 370/252 |
| 2014/0177745 A1* | 6/2014 | Krishnamurthy .... H04B 7/0413 375/267 |
| 2015/0256243 A1 | 9/2015 | Wang et al. |
| 2016/0233935 A1 | 8/2016 | Ko et al. |

FOREIGN PATENT DOCUMENTS

| | | |
|---|---|---|
| CN | 101969366 A | 2/2011 |
| CN | 102130752 A | 7/2011 |
| JP | 2009-538555 | 11/2009 |
| JP | 2013-526136 | 6/2013 |
| WO | 2009/025493 A2 | 2/2009 |
| WO | WO 2011/085695 | 7/2011 |

OTHER PUBLICATIONS

Notice of Allowance dated Dec. 5, 2016 in co-pending U.S. Appl. No. 14/982,286 (15 pages).
Final Office Action dated Aug. 17, 2016 in co-pending U.S. Appl. No. 14/982,286 (13 pages).
Non-final Office Action dated Feb. 16, 2016 in co-pending U.S. Appl. No. 14/982,286 (22 pages).
"Downlink 8TX codebook considerations", 3GPP TSG RAN WG1#59bis, Jan. 18-22, 2010, Valencia, Spain, R1-100256, 11 pages.
European Office Action dated Apr. 8, 2016 in corresponding European Patent Application No. 13887858.2, 9 pages.
International Search Report dated Apr. 3, 2014 in corresponding International Patent Application No. PCT/CN2013/078514, (Total 19 pages).
U.S. Appl. No. 14/982,286, filed Dec. 29, 2015, Jianguo Wang, Huawei Technologies Co., Ltd.

\* cited by examiner

METHOD AND APPARATUS FOR DETERMINING PRECODING MATRIX INDICATOR, USER EQUIPMENT, AND BASE STATION

CROSS-REFERENCE TO RELATED APPLICATIONS

This application is a continuation of U.S. application Ser. No. 14/982,286, filed on Dec. 29, 2015, which is a continuation of International Application No. PCT/CN2013/078514, filed on Jun. 29, 2013, all of which are hereby incorporated by reference in their entireties.

TECHNICAL FIELD

The present disclosure relates to data transmission technologies, and in particular, to a method and an apparatus for determining a precoding matrix indicator, user equipment, and a base station, and belongs to the field of communications technologies.

BACKGROUND

By means of transmit precoding and receive combining, a multiple input multiple output (MIMO) system can obtain a diversity gain and an array gain. A system using precoding may be represented as:

$$y=HVs+n$$

where y is a received signal vector, H is a channel matrix, V is a precoding matrix, s is a transmitted symbol vector, and n is an interference and noise vector.

Optimal precoding usually requires that a transmitter completely knows channel state information (CSI). A commonly-used method is: user equipment (User Equipment, UE for short) quantizes instantaneous CSI, and sends a feedback to a base station.

In an existing long term evolution (LTE) R8-R11 (Release 8-11) system, CSI fed back by UE includes rank indicator (RI) information, precoding matrix indicator (PMI) information, channel quality indicator (CQI) information, and the like, where the RI and the PMI respectively indicate a quantity of used layers and a precoding matrix. A set of a used precoding matrix is generally referred to as a codebook, where each precoding matrix is a code word in the codebook.

In order to reduce system costs and meanwhile achieve higher requirements on a system capacity and coverage, an active antenna system (AAS) has been widely studied. Compared with an existing base station antenna that has only a capability of controlling a beam orientation in a horizontal direction, the can provide a capability of controlling a beam orientation both in a horizontal direction and in a perpendicular direction, and meanwhile, has a capability of controlling a beam shape to control power distribution in space. However, in the prior art, a precoding matrix fed back by UE to a node device cannot effectively control a beam, especially a beam shape and a beam orientation, in a horizontal direction and a perpendicular direction at the same time.

SUMMARY

Embodiments of the present invention provide a method and an apparatus for determining a precoding matrix indicator, user equipment, and a base station, which are used to effectively control a beam, especially a beam shape and a beam orientation, in a horizontal direction and a perpendicular direction.

A first aspect of the present invention provides a method for determining a precoding matrix indicator, including:

determining a precoding matrix indicator PMI, where the PMI corresponds to a precoding matrix W, and the precoding matrix W satisfies a first condition, a second condition, or a third condition; and sending the PMI to a base station, where the first condition is that the precoding matrix W satisfies W=DV, where the matrix D is a diagonal matrix, $D=\alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix;

the second condition is that the precoding matrix W includes one or more column vectors of a block diagonal matrix $W_1$, or the precoding matrix W is obtained by performing weighted combination on one or more column vectors of a block diagonal matrix $W_1$, where $W_1=\text{diag}\{X_1, \ldots, X_{N_B}\}$, and $N_B \geq 1$, where at least one block matrix X is a product X=DV of a matrix D and a matrix V, and $X \in \{X_1, X_2, \ldots, X_{N_B}\}$; the matrix D is a diagonal matrix, $D=\alpha \cdot \text{diag}\{u_1, u_2, \ldots, u_n, u^*_n, u^*_{n-1}, \ldots u^*_1\}$, $\alpha$ is a complex factor, a complex number $u^*_i$ is a conjugate complex number of a complex number $u_i$, and n is determined by a quantity of antenna ports; and the matrix V is a constant modulus matrix; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1=\text{diag}\{X_1, \ldots, X_{N_B}\}$, and $N_B \geq 1$, where at least one block matrix X is a Kronecker product of a matrix A and a matrix B, $X=A \otimes B$, and $X \in \{X_1, X_2, \ldots, X_{N_B}\}$; the matrix A or the matrix B is a product of a matrix D and a matrix V; the matrix D is a diagonal matrix, $D=\alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, $i=1, \ldots, n$ and n is a quantity of rows of the matrix A or the matrix B; and the matrix V is a constant modulus matrix.

With reference to the foregoing first aspect, in a first possible implementation manner, in the second condition or the third condition, the precoding matrix W satisfies $W=W_1 W_2$, where the matrix $W_2$ is used to select one or more column vectors of the matrix $W_1$; or is used to perform weighted combination on one or more column vectors of the $W_1$ to obtain the precoding matrix W.

With reference to the foregoing first aspect or the first possible implementation manner of the first aspect, in a second possible implementation manner, phases of diagonal elements $u_1, u_2, \ldots, u_n$ of the matrix D form an arithmetic progression.

With reference to the foregoing first aspect or either possible implementation manner of the foregoing first aspect, in a third possible implementation manner, the matrix V includes a column vector 1 and/or at least one column vector v, the column vector 1 is a column vector whose elements are all 1, and the column vector v is $v=[v_1 v_2 \ldots v_n \bar{v}_n \bar{v}_{n-1} \ldots \bar{v}_1]^T$, where an element is $\bar{v}_i=-v_i$, $v_i=\pm 1$, and $i=1, \ldots, n$.

With reference to the third possible implementation manner of the foregoing first aspect, in a fourth possible implementation manner, the matrix V includes only the column vector 1 and the at least one column vector v, and when the matrix V includes multiple column vectors v, the multiple column vectors v are different.

With reference to the third or fourth possible implementation manner of the foregoing first aspect, in a fifth possible implementation manner, the column vector v of the matrix V is a column vector of a matrix $[H^T H^T]^T$, where a matrix H is a Hadamard matrix.

With reference to any possible implementation manner of the foregoing first aspect, in a sixth possible implementation manner, the PMI includes a first index PMI1 and a second index PMI2, where when the precoding matrix W satisfies the first condition, the first index PMI1 corresponds to the matrix D, and the second index PMI2 corresponds to the matrix V;

when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

With reference to the sixth possible implementation manner of the foregoing first aspect, in a seventh possible implementation manner, the first index PMI1 and the second index PMI2 have different time-domain granularities or frequency-domain granularities; or the first index PMI1 and the second index PMI2 are sent to the base station by using different time periods.

With reference to the foregoing first aspect or any possible implementation manner of the first aspect, in an eighth possible implementation manner, the method further includes:

receiving a reference signal sent by the base station; and
selecting, from a codebook according to the reference signal, the precoding matrix W corresponding to the PMI.

With reference to the eighth possible implementation manner of the first aspect, the codebook includes a precoding matrix $W_i$ and a precoding matrix $W_j$, and the two precoding matrices satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, ..., n and n is determined by a quantity of antenna ports.

With reference to the ninth possible implementation manner of the first aspect, in a tenth possible implementation manner, phases of diagonal elements $\mu_1, \mu_2, \ldots, \mu_n$ of the matrix D(i,j) form an arithmetic progression.

With reference to the eighth possible implementation manner of the first aspect, the codebook includes a precoding matrix $W_i$ and a precoding matrix $W_k$, and the two precoding matrices satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, m=i,k, $\alpha_m$ is a complex factor, a complex number $u^*_{m,l}$ is a conjugate complex number of a complex number $u_{m,l}$, m=i,k, l=1, ..., n and n is determined by a quantity of antenna ports.

With reference to the eleventh possible implementation manner of the first aspect, in a twelfth possible implementation manner, phases of diagonal elements $u_{m,1}, u_{m,2}, \ldots, u_{m,n}$ of the matrix $D_m$ form an arithmetic progression.

A second aspect of the present invention provides a method for determining a precoding matrix indicator, including:

receiving a precoding matrix indicator PMI sent by user equipment; and determining a corresponding precoding matrix W according to the PMI, where the precoding matrix W satisfies a first condition, a second condition, or a third condition, where the first condition is that the precoding matrix W satisfies W=DV;

the second condition is that the precoding matrix W includes one or more column vectors of a block diagonal matrix $W_1$, or the precoding matrix W is obtained by performing weighted combination on one or more column vectors of a block diagonal matrix $W_1$, where $W_1 = \text{diag}\{X_1, \ldots, X_{N_B}\}$, $N_B \geq 1$, where at least one block matrix X is a product X=DV of a matrix D and a matrix V, and $X \in \{X_1, X_2, \ldots, X_{N_B}\}$; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1 = \text{diag}\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$; the matrix A or the matrix B is a product of a matrix D and a matrix V; the matrix D is a diagonal matrix, i=1, ..., n, and n is a quantity of rows of the matrix A or the matrix B, where the matrix D is a diagonal matrix, $D = \alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix.

With reference to the second aspect, in a first possible implementation manner, in the second condition or the third condition, the precoding matrix W satisfies $W = W_1 W_2$, where the matrix $W_2$ is used to select one or more column vectors of the matrix $W_1$; or is used to perform weighted combination on one or more column vectors of the $W_1$ to obtain the precoding matrix W.

With reference to the second aspect or the first possible implementation manner of the second aspect, in a second possible implementation manner, phases of diagonal elements $u_1, u_2, \ldots, u_n$ of the matrix D form an arithmetic progression.

With reference to the second aspect or either possible implementation manner of the second aspect, in a third possible implementation manner, the matrix V includes a column vector 1 and/or at least one column vector v, the column vector 1 is a column vector whose elements are all 1, and the column vector v is $v = [v_1 v_2 \ldots v_n \bar{v}_n \bar{v}_{n-1} \ldots \bar{v}_1]^T$, where an element is $\bar{v}_i = -v_i$, $v_i = \pm 1$, and i=1, ..., n.

With reference to the third possible implementation manner of the foregoing second aspect, in a fourth possible implementation manner, the matrix V includes only the column vector 1 and the at least one column vector v, and when the matrix V includes multiple column vectors v, the multiple column vectors v are different.

With reference to the third or fourth possible implementation manner of the foregoing second aspect, in a fifth possible implementation manner, the column vector v of the matrix V is a column vector of a matrix $[H^T H^T]^T$, where a matrix H is a Hadamard matrix.

With reference to any possible implementation manner of the foregoing second aspect, in a sixth possible implementation manner, the precoding matrix indicator PMI includes a first index PMI1 and a second index PMI2, where when the precoding matrix W satisfies the first condition, the first index PMI1 corresponds to the matrix D, and the second index PMI2 corresponds to the matrix V;

when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

With reference to the sixth possible implementation manner of the foregoing second aspect, in a seventh possible implementation manner, the first index PMI1 and the second index PMI2 have different time-domain granularities or frequency-domain granularities; or the first index PMI1 and the second index PMI2 are sent to a base station by using different time periods.

With reference to the foregoing second aspect or any possible implementation manner of the second aspect, in an eighth possible implementation manner, the determining a corresponding precoding matrix W according to the PMI includes:

selecting the corresponding precoding matrix W from a codebook according to the PMI.

With reference to the eighth possible implementation manner of the second aspect, the codebook includes a precoding matrix $W_i$ and a precoding matrix $W_j$, and the two precoding matrices satisfy $W_i=D(i,j)W_j$, where $D(i,j)=\alpha_{(i,j)}$ diag$\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n, and n is determined by a quantity of antenna ports.

With reference to the eighth possible implementation manner of the second aspect, in a tenth possible implementation manner, phases of diagonal elements $\mu_1, \mu_2, \ldots, \mu_n$ of the matrix $D(i,j)$ form an arithmetic progression.

With reference to the second aspect, in an eleventh possible implementation manner, the codebook includes a precoding matrix $W_i$ and a precoding matrix $W_k$, and the two precoding matrices satisfy $D_i^{-1}W_i=D_k^{-1}W_k=V$, where $D_m=\alpha_m \cdot$diag$\{u_{m,1}, u_{m,2}, \ldots, u_{m,n}, u^*_{m,n}, u^*_{m,n-1}, \ldots, u^*_{m,1}\}$, m=i,k, $\alpha_m$ is a complex factor, a complex number $u^*_{m,l}$ is a conjugate complex number of a complex number $u_{m,l}$, m=i,k, l=1, . . . , n and n is determined by a quantity of antenna ports.

With reference to the eleventh possible implementation manner of the second aspect, in a twelfth possible implementation manner, phases of diagonal elements $u_{m,1}, u_{m,2}, \ldots, u_{m,n}$ of the matrix $D_m$ form an arithmetic progression.

A third aspect of the present invention provides a method for determining a precoding matrix indicator, including:

determining a first precoding matrix indicator PMI, where the PMI corresponds to a precoding matrix $W_i$ in a codebook; and sending the first PMI to a base station, where the codebook includes at least: the precoding matrix $W_i$ and a precoding matrix $W_j$, and the precoding matrix $W_i$ and the precoding matrix $W_j$ in the codebook satisfy $W_i=D(i,j)W_j$, where $D(i,j)=\alpha_{(i,j)}$ diag$\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu^*_m$, m=1, . . . , n and n is determined by a quantity of antenna ports.

With reference to the third aspect, in a first possible implementation manner, phases of diagonal elements $\mu_1, \mu_2, \ldots, \mu_n$ of the matrix $D(i,j)$ form an arithmetic progression.

A fourth aspect of the present invention provides a method for determining a precoding matrix indicator, including:

receiving a first precoding matrix indicator PMI sent by user equipment; and determining a corresponding precoding matrix $W_i$ from a codebook according to the first PMI, where the codebook includes at least: the precoding matrix $W_i$ and a precoding matrix $W_j$, and the precoding matrix $W_i$ and the precoding matrix $W_j$ in the codebook satisfy $W=D(i,j)W_j$, where $D(i,j)=\alpha_{(i,j)}$ diag$\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n, and n is determined by a quantity of antenna ports.

With reference to the fourth aspect, in a first possible implementation manner, phases of diagonal elements $\mu_1, \mu_2, \ldots, \mu_n$ of the matrix $D(i,j)$ form an arithmetic progression.

A fifth aspect of the present invention provides a method for determining a precoding matrix indicator, including:

determining a first precoding matrix indicator PMI, where the first PMI corresponds to a precoding matrix $W_i$ in a codebook; and sending the first PMI to a base station, where the codebook includes at least: the precoding matrix $W_i$ and a precoding matrix $W_j$, and the precoding matrix $W_i$ and a precoding matrix $W_k$ in the codebook satisfy $D_i^{-1}W_i=D_k^{-1}W_k=V$, where $D_m=\alpha_m \cdot$diag$\{u_{m,1}, u_{m,2}, \ldots, u_{m,n}, u^*_{m,n}, u^*_{m,n-1}, \ldots, u^*_{m,1}\}$, m=i,k, $\alpha_m$ is a complex factor, a complex number $u^*_{m,l}$ is a conjugate complex number of a complex number $u_{m,l}$, m=i,k, l=1, . . . , n, n is determined by a quantity of antenna ports, and the matrix V is a constant modulus matrix.

With reference to the fifth aspect, in a first possible implementation manner, phases of diagonal elements $u_{m,1}, u_{m,2}, \ldots, u_{m,n}$ of the matrix $D_m$ form an arithmetic progression.

A sixth aspect of the present invention provides a method for determining a precoding matrix indicator, including:

receiving a first precoding matrix indicator PMI sent by user equipment; and determining a corresponding precoding matrix $W_i$ from a codebook according to the first PMI, where the codebook includes at least: the precoding matrix $W_i$ and a precoding matrix $W_j$, and the precoding matrix $W_i$ and a precoding matrix $W_k$ in the codebook satisfy $D_i^{-1}W_i=D_k^{-1}W_k=V$, where $D_m=\alpha_m \cdot$diag$\{u_{m,1}, u_{m,2}, \ldots, u_{m,n}, u^*_{m,n}, u^*_{m,n-1}, \ldots, u^*_{m,1}\}$, $\alpha_m$ is a complex factor, a complex number $u^*_{m,l}$ is a conjugate complex number of a complex number $u_{m,l}$, m=i,k, l=1, . . . , n, n is determined by a quantity of antenna ports, and the matrix V is a constant modulus matrix.

With reference to the sixth aspect, in a first possible implementation manner, phases of diagonal elements $u_{m,1}, u_{m,2}, \ldots, u_{m,n}$ of the matrix $D_m$ form an arithmetic progression.

A seventh aspect of the present invention provides an apparatus for determining a precoding matrix indicator, including:

a first determining module, configured to determine a precoding matrix indicator PMI, where the PMI corresponds to a precoding matrix W, and the precoding matrix W satisfies a first condition, a second condition, or a third condition; and a first sending module, configured to send the PMI to a base station, where the first condition is that the precoding matrix W satisfies W=DV, where the matrix D is a diagonal matrix, $D=\alpha \cdot$diag$\{u_1, u_2, \ldots, u_n, u^*_n, u^*_{n-1}, \ldots, u^*_1\}$, $\alpha$ is a complex factor, a complex number $u^*_1$ is a conjugate complex number of a complex number $u_i$, and n is determined by a quantity of antenna ports; and the matrix V is a constant modulus matrix;

the second condition is that the precoding matrix W includes one or more column vectors of a block diagonal matrix $W_1$, or the precoding matrix W is obtained by performing weighted combination on one or more column vectors of a block diagonal matrix $W_1$, where $W_1$=diag$\{X_1, \ldots, X_{N_B}\}$, and $N_B \geq 1$, where at least one block matrix X is a product X=DV of a matrix D and a matrix V, and $X \in \{X_1, X_2, \ldots, X_{N_B}\}$; the matrix D is a diagonal matrix, D=$\alpha \cdot$diag$\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1$=diag$\{X_1, \ldots, X_{N_B}\}$, and $N_B \geq 1$, where at least one block matrix X is a Kronecker product of a matrix A and a matrix B, $X=A \otimes B$, and $X \in \{X_1, X_2, \ldots, X_{N_B}\}$; the matrix A or the matrix B is a product of a matrix D and a matrix V; the matrix D is a diagonal matrix, D=$\alpha \cdot$diag$\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, i=1, . . . , n and n is a quantity of rows of the matrix A or the matrix B; and the matrix V is a constant modulus matrix.

With reference to the foregoing seventh aspect, in a first possible implementation manner, in the second condition or the third condition, the precoding matrix W satisfies W=$W_1W_2$, where the matrix $W_2$ is used to select one or more column vectors of the matrix $W_1$; or is used to perform weighted combination on one or more column vectors of the $W_1$ to obtain the precoding matrix W.

With reference to the foregoing seventh aspect or the first possible implementation manner of the seventh aspect, in a second possible implementation manner, phases of diagonal elements $u_1, u_2, \ldots, u_n$ of the matrix D form an arithmetic progression.

With reference to the foregoing seventh aspect or either possible implementation manner of the foregoing seventh aspect, in a third possible implementation manner, the matrix V includes a column vector 1 and/or at least one column vector v, the column vector 1 is a column vector whose elements are all 1, and the column vector is v=$[v_1 v_2 \ldots v_n \bar{v}_n \bar{v}_{n-1} \ldots \bar{v}_1]^T$, where the an element is $\bar{v}_i = -v_i$, $v_i = \pm 1$, and i=1, . . . , n.

With reference to the third possible implementation manner of the foregoing seventh aspect, in a fourth possible implementation manner, the matrix V includes only the column vector 1 and the at least one column vector v, and when the matrix V includes multiple column vectors v, the multiple column vectors v are different.

With reference to the third or fourth possible implementation manner of the foregoing seventh aspect, in a fifth possible implementation manner, the column vector v of the matrix V is a column vector of a matrix $[H^T H^T]^T$, where a matrix H is a Hadamard matrix.

With reference to any possible implementation manner of the foregoing seventh aspect, in a sixth possible implementation manner, the PMI includes a first index PMI1 and a second index PMI2, where when the precoding matrix W satisfies the first condition, the first index PMI1 corresponds to the matrix D, and the second index PMI2 corresponds to the matrix V;

when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

With reference to the sixth possible implementation manner of the foregoing seventh aspect, in a seventh possible implementation manner, the first index PMI1 and the second index PMI2 have different time-domain granularities or frequency-domain granularities; or the first index PMI1 and the second index PMI2 are sent to the base station by using different time periods.

With reference to the foregoing seventh aspect or any possible implementation manner of the seventh aspect, in an eighth possible implementation manner, the apparatus further includes:

a first receiving module, configured to receive a reference signal sent by the base station, and select, from a codebook according to the reference signal, the precoding matrix W corresponding to the PMI.

With reference to the eighth possible implementation manner of the seventh aspect, the codebook includes a precoding matrix $W_i$ and a precoding matrix $W_j$, and the two precoding matrices satisfy $W_i = D(i,j)W_j$, where $D(i,j) = \alpha_{(i,j)}$ diag$\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n, and n is determined by a quantity of antenna ports.

With reference to the ninth possible implementation manner of the seventh aspect, in a tenth possible implementation manner, phases of diagonal elements $\mu_1, \mu_2, \ldots, \mu_n$ of the matrix D(i,j) form an arithmetic progression.

With reference to the eighth possible implementation manner of the seventh aspect, the codebook includes a precoding matrix $W_i$ and a precoding matrix $W_k$, and the two precoding matrices satisfy $D_i^{-1}W_i = D_k^{-1}W_k = V$, where $D_m = \alpha_m \cdot$diag$\{u_{m,1}, u_{m,2}, \ldots, u_{m,n}, u^*_{m,n}, u^*_{m,n-1}, \ldots, u^*_{m,1}\}$, m=i, k, $\alpha_m$ is a complex factor, a complex number $u^*_{m,l}$ is a conjugate complex number of a complex number $u_{m,l}$, m=i, k, l=1, . . . , n and n is determined by a quantity of antenna ports.

With reference to the eleventh possible implementation manner of the seventh aspect, in a twelfth possible implementation manner, phases of diagonal elements $u_{m,1}, u_{m,2}, \ldots, u_{m,n}$ of the matrix $D_m$ form an arithmetic progression.

An eighth aspect of the present invention provides an apparatus for determining a precoding matrix indicator, including:

a second receiving module, configured to receive a precoding matrix indicator PMI sent by user equipment; and a second determining module, configured to determine a corresponding precoding matrix W according to the PMI, where the precoding matrix W satisfies a first condition, a second condition, or a third condition, where the first condition is that the precoding matrix W satisfies W=DV;

the second condition is that the precoding matrix W includes one or more column vectors of a block diagonal matrix $W_1$, or the precoding matrix W is obtained by performing weighted combination on one or more column vectors of a block diagonal matrix $W_1$, where $W_1$=diag $\{X_1, \ldots, X_{N_B}\}$, and $N_B \geq 1$, where at least one block matrix X is a product X=DV of a matrix D and a matrix V, and $X \in \{X_1, X_2, \ldots, X_{N_B}\}$; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1 = \text{diag}\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$, the matrix A or the matrix B is a product of a matrix D and a matrix V; the matrix D is a diagonal matrix, i=1, . . . , n, and n is a quantity of rows of the matrix A or the matrix B, where the matrix D is a diagonal matrix, $D = \alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix.

With reference to the eighth aspect, in a first possible implementation manner, in the second condition or the third condition, the precoding matrix W satisfies $W = W_1 W_2$, where the matrix $W_2$ is used to select one or more column vectors of the matrix $W_1$; or is used to perform weighted combination on one or more column vectors of the to obtain the precoding matrix W.

With reference to the eighth aspect or the first possible implementation manner of the eighth aspect, in a second possible implementation manner, phases of diagonal elements $u_1, u_2, \ldots, u_n$ of the matrix D form an arithmetic progression.

With reference to the eighth aspect or either possible implementation manner of the eighth aspect, in a third possible implementation manner, the matrix V includes a column vector 1 and/or at least one column vector v, the column vector 1 is a column vector whose elements are all 1, and the column vector v is $v = [v_1 \, v_2 \ldots v_n \, \bar{v}_n \, \bar{v}_{n-1} \ldots \bar{v}_1]^T$, where an element is $\bar{v}_i = -v_i$, $v_i = \pm 1$, and i=1, . . . , n.

With reference to the third possible implementation manner of the foregoing eighth aspect, in a fourth possible implementation manner, the matrix V includes only the column vector 1 and the at least one column vector v, and when the matrix V includes multiple column vectors v, the multiple column vectors v are different.

With reference to the third or fourth possible implementation manner of the foregoing eighth aspect, in a fifth possible implementation manner, the column vector v of the matrix V is a column vector of a matrix $[H^T \, H^T]^T$, where a matrix H is a Hadamard matrix.

With reference to any possible implementation manner of the foregoing eighth aspect, in a sixth possible implementation manner, the precoding matrix indicator PMI includes a first index PMI1 and a second index PMI2, where when the precoding matrix W satisfies the first condition, the first index PMI1 corresponds to the matrix D, and the second index PMI2 corresponds to the matrix V;

when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

With reference to the sixth possible implementation manner of the foregoing eighth aspect, in a seventh possible implementation manner, the first index PMI1 and the second index PMI2 have different time-domain granularities or frequency-domain granularities; or the first index PMI1 and the second index PMI2 are sent to a base station by using different time periods.

With reference to the foregoing eighth aspect or any possible implementation manner of the eighth aspect, in an eighth possible implementation manner, the determining a corresponding precoding matrix W according to the PMI includes:

selecting the corresponding precoding matrix W from a codebook according to the PMI.

With reference to the eighth possible implementation manner of the eighth aspect, in a ninth possible implementation manner, the codebook includes a precoding matrix $W_i$ and a precoding matrix $W_j$, and the two precoding matrices satisfy $W_i = D(i,j) W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n, and n is determined by a quantity of antenna ports.

With reference to the ninth possible implementation manner of the eighth aspect, in a tenth possible implementation manner, phases of diagonal elements $\mu_1, \mu_2, \ldots, \mu_n$ of the matrix D(i,j) form an arithmetic progression.

With reference to the eighth possible implementation manner of the eighth aspect, the codebook includes a precoding matrix $W_i$ and a precoding matrix $W_k$, and the two precoding matrices satisfy $D_i^{-1} W_i = D_k^{-1} W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, m=i, k, $\alpha_m$ is a complex factor, a complex number $u^*_{m,l}$ is a conjugate complex number of a complex number $u_{m,l}$, m=i, k, l=1, . . . , n, and n is determined by a quantity of antenna ports.

With reference to the eleventh possible implementation manner of the eighth aspect, in a twelfth possible implementation manner, phases of diagonal elements $u_{m,1}, u_{m,2}, \ldots, u_{m,n}$ of the matrix $D_m$ form an arithmetic progression.

A ninth aspect of the present invention provides an apparatus for determining a precoding matrix indicator, including:

a third determining module, configured to determine a first precoding matrix indicator PMI, where the PMI corresponds to a precoding matrix $W_i$ in a codebook; and a second sending module, configured to send the first PMI to a base station, where the codebook includes at least: the precoding matrix $W_i$ and a precoding matrix $W_j$, and the precoding matrix $W_i$ and the precoding matrix $W_j$ in the codebook satisfy $W_i = D(i,j) W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n, and n is determined by a quantity of antenna ports.

With reference to the ninth aspect, in a first possible implementation manner, phases of diagonal elements $\mu_1, \mu_2, \ldots \mu_n$ of the matrix D(i,j) form an arithmetic progression.

A tenth aspect of the present invention provides an apparatus for determining a precoding matrix indicator, including:

a third receiving module, configured to receive a first precoding matrix indicator PMI sent by user equipment; and a fourth determining module, configured to determine a corresponding precoding matrix $W_i$ from a codebook according to the first PMI, where the codebook includes at least: the precoding matrix $W_i$ and a precoding matrix $W_j$, and the precoding matrix $W_i$ and the precoding matrix $W_j$ in the codebook satisfy $W_i=D(i,j)W_j$, where $D(i,j)=\alpha_{(i,j)}\text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n, and n is determined by a quantity of antenna ports.

With reference to the tenth aspect, in a first possible implementation manner, phases of diagonal elements $\mu_1, \mu_2, \ldots, \mu_n$ of the matrix D(i,j) form an arithmetic progression.

An eleventh aspect of the present invention provides an apparatus for determining a precoding matrix indicator, including:

a fifth determining module, configured to determine a first precoding matrix indicator PMI, where the first PMI corresponds to a precoding matrix $W_i$ in a codebook; and a third sending module, configured to send the first PMI to a base station, where the codebook includes at least: the precoding matrix $W_i$ and a precoding matrix $W_j$, and the precoding matrix $W_i$ and a precoding matrix $W_k$ in the codebook satisfy $D_i^{-1}W_i=D_k^{-1}W_k=V$, where $D_m=\alpha_m \text{diag}\{u_{m,1}, u_{m,2}, \ldots, u_{m,n}, u^*_{m,n}, u^*_{m,n-1}, \ldots, u^*_{m,1}\}$, m=i, k, $\alpha_m$ is a complex factor, a complex number $u^*_{m,l}$ is a conjugate complex number of a complex number $u_{m,l}$, m=i, k, l=1, . . . , n, n is determined by a quantity of antenna ports, and the matrix V is a constant modulus matrix.

With reference to the eleventh aspect, in a first possible implementation manner, phases of diagonal elements $u_{m,1}, u_{m,2}, \ldots, u_{m,n}$ of the matrix $D_m$ form an arithmetic progression.

A twelfth aspect of the present invention provides an apparatus for determining a precoding matrix indicator, including:

a fourth receiving module, configured to receive a first precoding matrix indicator PMI sent by user equipment; and a sixth determining module, configured to determine a corresponding precoding matrix $W_i$ from a codebook according to the first PMI, where the codebook includes at least: the precoding matrix $W_i$ and a precoding matrix $W_j$, and the precoding matrix $W_i$ and a precoding matrix $W_k$ in the codebook satisfy $D_i^{-1}W_i=D_k^{-1}W_k=V$, where $D_m=\alpha_m\text{diag}\{u_{m,1}, u_{m,2}, \ldots, u_{m,n}, u^*_{m,n}, u^*_{m,n-1}, \ldots, u^*_{m,1}\}$, m=i,k, $\alpha_m$ is a complex factor, a complex number $u^*_{m,l}$ is a conjugate complex number of a complex number $u_{m,l}$, m=i,k, l=1, . . . , n, n is determined by a quantity of antenna ports, and the matrix V is a constant modulus matrix.

With reference to the twelfth aspect, in a first possible implementation manner, phases of diagonal elements $u_{m,1}, u_{m,2}, \ldots, u_{m,n}$ of the matrix $D_m$ form an arithmetic progression.

A thirteenth aspect of the present invention provides user equipment, including:

a first processor, configured to determine a precoding matrix indicator PMI, where the PMI corresponds to a precoding matrix W, and the precoding matrix W satisfies a first condition, a second condition, or a third condition; and a first transmitter, configured to send the PMI to a base station, where the first condition is that the precoding matrix W satisfies W=DV, where the matrix D is a diagonal matrix, $D=\alpha\cdot\text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports, and the matrix V is a constant modulus matrix;

the second condition is that the precoding matrix W includes one or more column vectors of a block diagonal matrix $W_1$, or the precoding matrix W is obtained by performing weighted combination on one or more column vectors of a block diagonal matrix $W_1$, where $W_1=\text{diag}\{X_1, \ldots, X_{N_B}\}$, and $N_B \geq 1$, where at least one block matrix X is a product X=DV of a matrix D and a matrix V, and $X \in \{X_1, X_2, \ldots, X_{N_B}\}$; the matrix D is a diagonal matrix, $D=\alpha\cdot\text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1=\text{diag}\{X_1, \ldots, X_{N_B}\}$ and $N_B \geq 1$, where at least one block matrix X is a Kronecker product of a matrix A and a matrix B, $X=A \otimes B$, and $X \in \{X_1, X_2, \ldots, X_{N_B}\}$; the matrix A or the matrix B is a product of a matrix D and a matrix V; the matrix D is a diagonal matrix, $D=\alpha\cdot\text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, i=1, . . . , n and n is a quantity of rows of the matrix A or the matrix B; and the matrix V is a constant modulus matrix.

With reference to the foregoing thirteenth aspect, in a first possible implementation manner, in the second condition or the third condition, the precoding matrix W satisfies $W=W_1W_2$, where the matrix $W_2$ is used to select one or more column vectors of the matrix $W_1$; or is used to perform weighted combination on one or more column vectors of the $W_1$ to obtain the precoding matrix W.

With reference to the foregoing thirteenth aspect or the first possible implementation manner of the thirteenth aspect, in a second possible implementation manner, phases of diagonal elements $u_1, u_2, \ldots, u_n$ of the matrix D form an arithmetic progression.

With reference to the foregoing thirteenth aspect or either possible implementation manner of the foregoing thirteenth aspect, in a third possible implementation manner, the matrix V includes a column vector 1 and/or at least one column vector v, the column vector 1 is a column vector whose elements are all 1, and the column vector v is $v=[v_1 \, v_2 \ldots v_n \, \bar{v}_n \, \bar{v}_{n-1} \ldots \bar{v}_1]^T$, where an element is $\bar{v}_i=-v_i$, $v_i=\pm 1$, and i=1, . . . , n.

With reference to the third possible implementation manner of the foregoing thirteenth aspect, in a fourth possible implementation manner, the matrix V includes only the column vector 1 and the at least one column vector v, and when the matrix V includes multiple column vectors v, the multiple column vectors v are different.

With reference to the third or fourth possible implementation manner of the foregoing thirteenth aspect, in a fifth possible implementation manner, the column vector v of the matrix V is a column vector of a matrix $[H^T \, H^T]^T$, where a matrix H is a Hadamard matrix.

With reference to any possible implementation manner of the foregoing thirteenth aspect, in a sixth possible implementation manner, the PMI includes a first index PMI1 and a second index PMI2, where when the precoding matrix W satisfies the first condition, the first index PMI1 corresponds to the matrix D, and the second index PMI2 corresponds to the matrix V;

when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

With reference to the sixth possible implementation manner of the foregoing thirteenth aspect, in a seventh possible implementation manner, the first index PMI1 and the second index PMI2 have different time-domain granularities or frequency-domain granularities; or the first index PMI1 and the second index PMI2 are sent to the base station by using different time periods.

With reference to the foregoing thirteenth aspect or any possible implementation manner of the thirteenth aspect, in an eighth possible implementation manner, the user equipment further includes:

a first receiver, configured to receive a reference signal sent by the base station, and select, from a codebook according to the reference signal, the precoding matrix W corresponding to the PMI.

With reference to the eighth possible implementation manner of the thirteenth aspect, the codebook includes a precoding matrix $W_i$ and a precoding matrix $W_j$, and the two precoding matrices satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n and n is determined by a quantity of antenna ports.

With reference to the ninth possible implementation manner of the thirteenth aspect, in a tenth possible implementation manner, phases of diagonal elements $\mu_1, \mu_2, \ldots, \mu_n$ of the matrix D(i,j) form an arithmetic progression.

With reference to the eighth possible implementation manner of the thirteenth aspect, the codebook includes a precoding matrix $W_i$ and a precoding matrix $W_k$, and the two precoding matrices satisfy $D_i^{-1} W_i = D_k^{-1} W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, $\alpha_m$ is a complex factor, a complex number $u^*_{m,l}$ is a conjugate complex number of a complex number $u_{m,l}$, m=i,k, l=1, . . . , n, and n is determined by a quantity of antenna ports.

With reference to the eleventh possible implementation manner of the thirteenth aspect, in a twelfth possible implementation manner, phases of diagonal elements $u_{m,1}, u_{m,2}, \ldots, u_{m,n}$ of the matrix $D_m$ form an arithmetic progression.

A fourteenth aspect of the present invention provides a base station, including:

a second receiver, configured to receive a precoding matrix indicator PMI sent by user equipment; and a second processor, configured to: determine a corresponding precoding matrix W according to the PMI, where the precoding matrix W satisfies a first condition, a second condition, or a third condition, where the first condition is that the precoding matrix W satisfies W=DV;

the second condition is that the precoding matrix W includes one or more column vectors of a block diagonal matrix $W_1$, or the precoding matrix W is obtained by performing weighted combination on one or more column vectors of a block diagonal matrix $W_1$, where $W_1 = \text{diag}\{X_1, \ldots, X_{N_B}\}$, and $N_B \geq 1$, where at least one block matrix X is a product X=DV of a matrix D and a matrix V, and $X \in \{X_1, X_2, \ldots, X_{N_B}\}$; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1 = \text{diag}\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$; the matrix A or the matrix B is a product of a matrix D and a matrix V; the matrix D is a diagonal matrix, i=1, . . . , n, and n is a quantity of rows of the matrix A or the matrix B, where the matrix D is a diagonal matrix, $D = \alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix.

With reference to the fourteenth aspect, in a first possible implementation manner, in the second condition or the third condition, the precoding matrix W satisfies $W = W_1 W_2$, where the matrix $W_2$ used to select one or more column vectors of the matrix $W_1$; or is used to perform weighted combination on one or more column vectors of the $W_1$ to obtain the precoding matrix W.

With reference to the fourteenth aspect or the first possible implementation manner of the fourteenth aspect, in a second possible implementation manner, phases of diagonal elements $u_1, u_2, \ldots, u_n$ of the matrix D form an arithmetic progression.

With reference to the fourteenth aspect or either possible implementation manner of the fourteenth aspect, in a third possible implementation manner, the matrix V includes a column vector 1 and/or at least one column vector v, the column vector 1 is a column vector whose elements are all 1, and the column vector v is $v = [v_1 \, v_2 \ldots v_n \, \bar{v}_n \, \bar{v}_{n-1} \ldots \bar{v}_1]^T$, where an element is $\bar{v}_i = -v_i$, $v_i = \pm 1$, and i=1, . . . , n.

With reference to the third possible implementation manner of the foregoing fourteenth aspect, in a fourth possible implementation manner, the matrix V includes only the column vector 1 and the at least one column vector v, and when the matrix V includes multiple column vectors v, the multiple column vectors v are different.

With reference to the third or fourth possible implementation manner of the foregoing fourteenth aspect, in a fifth possible implementation manner, the column vector v of the matrix V is a column vector of a matrix $[H^T \, H^T]^T$, where a matrix H is a Hadamard matrix.

With reference to any possible implementation manner of the foregoing fourteenth aspect, in a sixth possible implementation manner, the precoding matrix indicator PMI includes a first index PMI1 and a second index PMI2, where when the precoding matrix W satisfies the first condition, the first index PMI1 corresponds to the matrix D, and the second index PMI2 corresponds to the matrix V;

when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

With reference to the sixth possible implementation manner of the foregoing fourteenth aspect, in a seventh possible implementation manner, the first index PMI1 and the second index PMI2 have different time-domain granularities or frequency-domain granularities; or the first index PMI1 and the second index PMI2 are sent to the base station by using different time periods.

With reference to the foregoing fourteenth aspect or any possible implementation manner of the fourteenth aspect, in an eighth possible implementation manner, the determining a corresponding precoding matrix W according to the PMI includes:

selecting the corresponding precoding matrix W from a codebook according to the PMI.

With reference to the eighth possible implementation manner of the fourteenth aspect, in a ninth possible implementation manner, the codebook includes a precoding matrix $W_i$ and a precoding matrix $W_j$, and the two precoding matrices satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, ..., n, and n is determined by a quantity of antenna ports.

With reference to the ninth possible implementation manner of the fourteenth aspect, in a tenth possible implementation manner, phases of diagonal elements $\mu_1, \mu_2, \ldots, \mu_n$ of the matrix $D(i,j)$ form an arithmetic progression.

With reference to the eighth possible implementation manner of the fourteenth aspect, the codebook includes a precoding matrix $W_i$ and a precoding matrix $W_k$, and the two precoding matrices satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, $\alpha_m$ is a complex factor, a complex number $u^*_{m,l}$ is a conjugate complex number of a complex number $u_{m,l}$, m=i, k, l=1, ..., n, and n is determined by a quantity of antenna ports.

With reference to the eleventh possible implementation manner of the fourteenth aspect, in a twelfth possible implementation manner, phases of diagonal elements $u_{m,1}, u_{m,2}, \ldots, u_{m,n}$ of the matrix $D_m$ form an arithmetic progression.

A fifteenth aspect of the present invention provides user equipment, including:

a third processor, configured to determine a first precoding matrix indicator PMI, where the PMI corresponds to a precoding matrix $W_i$ in a codebook; and a second transmitter, configured to send the first PMI to a base station, where the codebook includes at least: the precoding matrix $W_i$ and a precoding matrix $W_j$, and the precoding matrix $W_i$ and the precoding matrix $W_j$ in the codebook satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, ..., n, and n is determined by a quantity of antenna ports.

With reference to the fifteenth aspect, in a first possible implementation manner, phases of diagonal elements $\mu_1, \mu_2, \ldots, \mu_n$ of the matrix $D(i,j)$ form an arithmetic progression.

A sixteenth aspect of the present invention provides a base station, including:

a third receiver, configured to receive a first precoding matrix indicator PMI sent by user equipment; and a fourth processor, configured to determine a corresponding precoding matrix $W_i$ from a codebook according to the first PMI, where the codebook includes at least: the precoding matrix $W_i$ and a precoding matrix W, and the precoding matrix $W_i$ and the precoding matrix $W_j$ in the codebook satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, ..., n and n is determined by a quantity of antenna ports.

With reference to the sixteenth aspect, in a first possible implementation manner, phases of diagonal elements $\mu_1, \mu_2, \ldots, \mu_n$ of the matrix $D(i,j)$ form an arithmetic progression.

A seventeenth aspect of the present invention provides user equipment, including:

a fifth processor, configured to determine a first precoding matrix indicator PMI, where the first PMI corresponds to a precoding matrix $W_i$ in a codebook; and a third transmitter, configured to send the first PMI to a base station, where the codebook includes at least: the precoding matrix $W_i$ and a precoding matrix $W_j$, and the precoding matrix $W_i$ and a precoding matrix $W_k$ in the codebook satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, $\alpha_m$ is a complex factor, a complex number $u^*_{m,l}$ is a conjugate complex number of a complex number $u_{m,l}$, m=i, k, l=1, ..., n, n is determined by a quantity of antenna ports, and the matrix V is a constant modulus matrix.

With reference to the seventeenth aspect, in a first possible implementation manner, phases of diagonal elements $u_{m,1}, u_{m,2}, \ldots, u_{m,n}$ of the matrix $D_m$ form an arithmetic progression.

An eighteenth aspect of the present invention provides a base station, including:

a fourth receiver, configured to receive a first precoding matrix indicator PMI sent by user equipment; and a sixth processor, configured to determine a corresponding precoding matrix $W_i$ from a codebook according to the first PMI, where the codebook includes at least: the precoding matrix $W_i$ and a precoding matrix $W_j$, and the precoding matrix $W_i$ and a precoding matrix $W_k$ in the codebook satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, m=i, k, $\alpha_m$ is a complex factor, a complex number $u^*_{m,l}$ is a conjugate complex number of a complex number $u_{m,l}$, m=i, k, l=1, ..., n, n is determined by a quantity of antenna ports, and the matrix V is a constant modulus matrix.

With reference to the eighteenth aspect, in a first possible implementation manner, phases of diagonal elements $u_{m,1}, u_{m,2}, \ldots, u_{m,n}$ of the matrix $D_m$ form an arithmetic progression.

In the technical solutions provided in the embodiments of the present invention, a precoding matrix indicator PMI is determined, where the PMI corresponds to a precoding matrix W, and the precoding matrix W satisfies a first condition, a second condition, or a third condition, where the first condition is that the precoding matrix W satisfies W=DV, where the matrix D is a diagonal matrix, $D = \alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix; the second condition is that the precoding matrix W includes one or more column vectors of a block diagonal matrix $W_1$, or the precoding matrix W is obtained by performing weighted combination on one or more column vectors of a block diagonal matrix $W_1$, where $W_1 = \text{diag}\{X_1, \ldots, X_{N_B}\}$, and $N_B \geq 1$ where at least one block matrix X is a product X=DV of a matrix D and a matrix V, and $X \in \{X_1, X_2, \ldots, X_{N_B}\}$; the matrix D is a diagonal matrix, $D = \alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1$=diag$\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$; the matrix A or the matrix B is a product of a matrix D and a matrix V; the matrix D is a diagonal matrix, D=$\alpha$·diag$\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, i=1, ..., n and n is a quantity of rows of the matrix A or the matrix B; and the matrix V is a constant modulus matrix. A beam, especially a beam shape and a beam orientation, in a horizontal direction and a perpendicular direction can be effectively controlled.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
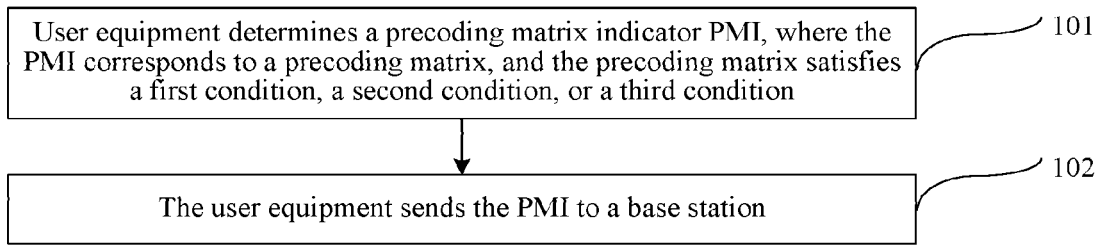
FIG. 1 is a first schematic flowchart of a method for determining a precoding matrix indicator according to an embodiment of the present invention.

An embodiment of the present invention provides a method for determining a precoding matrix indicator. FIG. 1 is a first schematic flowchart of the method for determining a precoding matrix indicator according to this embodiment of the present invention, and as shown in FIG. 1, the method includes the following steps:

Step 101: User equipment determines a precoding matrix indicator PMI, where the PMI corresponds to a precoding matrix W, and the precoding matrix W satisfies a first condition, a second condition, or a third condition.

Step 102: The user equipment sends the PMI to a base station.

The first condition is that the precoding matrix W satisfies W=DV; the second condition is that the precoding matrix W includes one or more column vectors of a block diagonal matrix $W_1$, or the precoding matrix W is obtained by performing weighted combination on one or more column vectors of a block diagonal matrix $W_1$, where $W_1$=diag$\{X_1, \ldots, X_{N_B}\}$, and $N_B \geq 1$; where at least one block matrix X is a product X=DV of a matrix D and a matrix V, and $X \in \{X_1, X_2, \ldots, X_{N_B}\}$; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1$=diag$\{X_1, \ldots, X_{N_B}\}$, and $N_B \geq 1$, where at least one block matrix X is a Kronecker product of a matrix A and a matrix B, $X = A \otimes B$, $X \in \{X_1, X_2, \ldots, X_{N_B}\}$; the matrix A or the matrix B is a product of a matrix D and a matrix V; the matrix D is a diagonal matrix, i=1, ..., n, and n is a quantity of rows of the matrix A or the matrix B, where the matrix D is a diagonal matrix, D=$\alpha$·diag$\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix.

In this embodiment, for detailed descriptions about three cases in which the precoding matrix W separately satisfies the first condition, the second condition, and the third condition, reference may be made to the following specific embodiments.

In addition, the method, provided in this embodiment of the present invention, for determining a precoding matrix indicator may further include: receiving a reference signal sent by the base station, and selecting, from a codebook according to the reference signal, the precoding matrix W corresponding to the PMI. Then, the determining a precoding matrix indicator PMI in the foregoing step 101 is specifically: determining the PMI according to the reference signal or the precoding matrix W.

Alternatively, the method, provided in this embodiment of the present invention, for determining a precoding matrix indicator may further include: receiving a reference signal sent by the base station. Then, the determining a precoding matrix indicator PMI in the foregoing step 101 is specifically: determining the precoding matrix indicator PMI according to the reference signal. In addition, after the determining the PMI according to the reference signal, the method further includes: determining the precoding matrix W according to the reference signal or the precoding matrix indicator PMI.

Figure 2:
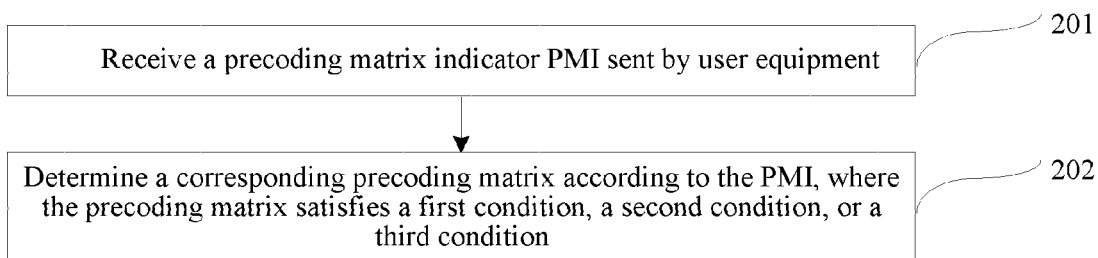
FIG. 2 is a second schematic flowchart of a method for determining a precoding matrix indicator according to an embodiment of the present invention.

Corresponding to the embodiment, shown in FIG. 1, of the method on a user equipment side, the present invention further provides a method for determining a precoding matrix indicator on a base station side. FIG. 2 is a second schematic flowchart of the method for determining a precoding matrix indicator according to an embodiment of the present invention, and as shown in FIG. 2, the method includes the following steps:

Step 201: Receive a precoding matrix indicator PMI sent by user equipment.

Step 202: Determine a corresponding precoding matrix W according to the PMI, where the precoding matrix W satisfies a first condition, a second condition, or a third condition.

The first condition is that the precoding matrix W satisfies W=DV;

the second condition is that the precoding matrix W includes one or more column vectors of a block diagonal matrix $W_1$, or the precoding matrix W is obtained by performing weighted combination on one or more column vectors of a block diagonal matrix $W_1$, where $W_1$=diag$\{X_1, \ldots, X_{N_B}\}$, and $N_B \geq 1$, where at least one block matrix X is a product X=DV of a matrix D and a matrix V, and $X \in \{X_1, X_2, \ldots, X_{N_B}\}$; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1$=diag$\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$; the matrix A or the matrix B is a product of a matrix D and a matrix V; the matrix D is a diagonal matrix, i=1, ..., n and n is a quantity of rows of the matrix A or the matrix B, where the matrix D is a diagonal matrix, D=α·diag$\{u_1, u_2, \ldots, u_n, u^*_n, u^*_{n-1}, \ldots, u^*_1\}$, α is a complex factor, a complex number $u^*_i$ is a conjugate complex number of a complex number $u_i$, and n is determined by a quantity of antenna ports; and the matrix V is a constant modulus matrix.

In the foregoing embodiment, for detailed descriptions about three cases in which the precoding matrix W separately satisfies the first condition, the second condition, and the third condition, reference may be made to the following specific embodiments. In addition, the determining a corresponding precoding matrix W according to the PMI in the foregoing step 202 may be specifically: selecting the corresponding precoding matrix W from a codebook according to the PMI.

Figure 3:
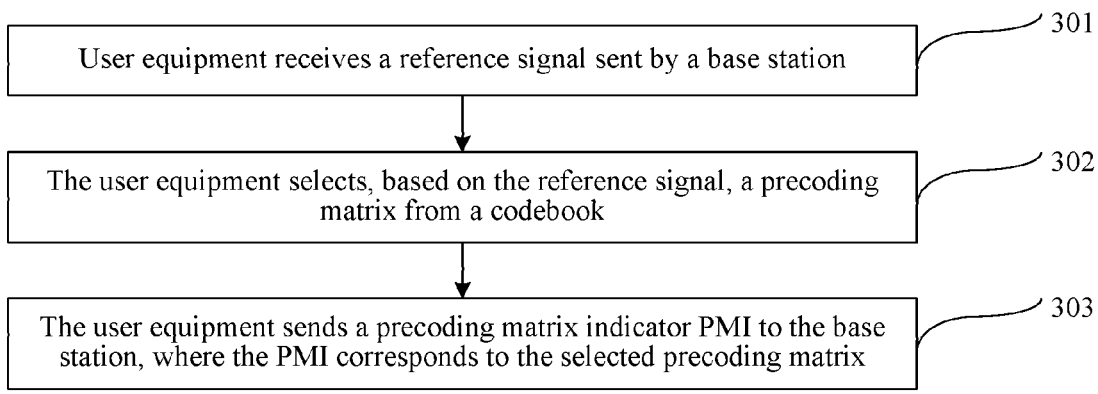
FIG. 3 is a first schematic flowchart of a specific embodiment of the present invention.

FIG. 3 is a first schematic flowchart of a specific embodiment. This embodiment provides a method for determining a precoding matrix indicator that is executed on a user equipment side when a precoding matrix satisfies a first condition. As shown in FIG. 3, the method includes:

Step 301: User equipment receives a reference signal sent by a base station.

Specifically, the reference signal sent by the base station in this step may include: a channel state information reference signal (CSI RS), a demodulation reference signal (DM RS), or a cell-specific reference signal (CRS). The user equipment UE may acquire the reference signal by receiving a reference signal resource configuration notified by an eNB, or obtain a resource configuration of the reference signal according to a cell identity (cellID) and obtain the reference signal in a corresponding resource or subframe, where the eNB notification may be higher-layer signaling such as radio resource control (RRC) signaling, or dynamic signaling such as downlink control information (DCI). The higher-layer signaling is sent to the user equipment by using a physical downlink shared channel (PDSCH). The DCI may be sent to the user equipment by using a physical downlink control channel (PDCCH) or an enhanced PDCCH (ePDCCH).

Step 302: The user equipment selects, based on the reference signal, a precoding matrix from a codebook.

In this embodiment of the present invention, the codebook is a set of an available precoding matrix. The codebook and the PMI may be stored in a device in a table lookup manner; or a device may obtain the corresponding PMI by means of calculation by using a preset formula or algorithm according to the codebook, or obtain the corresponding codebook by means of calculation according to the PMI.

In an optional implementation manner of this embodiment, at least one precoding matrix W included in the codebook is a product of a matrix D and a matrix V, and has the structure shown in formula (1):

$$W=DV \quad (1)$$

where the matrix D is a diagonal matrix, and satisfies:

$$D=\alpha \cdot \text{diag}\{u_1, u_2, \ldots, u_n, u^*_n, u^*_{n-1}, \ldots, u^*_1\} \quad (2)$$

where α is a complex factor, and a real part or an imaginary part of the complex factor may be 0; a complex number $u^*_i$ is a conjugate complex number of a complex number $u_i$, and i=1, ..., n; and the matrix V is a constant modulus matrix, for example, elements of the matrix V may be ±1 or ±j.

It should be noted that, the so-called constant modulus matrix refers to a matrix whose elements have a same module or amplitude. It should be understood that, a constant modulus matrix generally is a non-diagonal matrix, or certainly, may be a diagonal matrix, for example, the constant modulus matrix is a matrix whose elements are 0.

In another optional implementation manner of this embodiment, the matrix V includes a column vector 1 and/or at least one column vector v, where the column vector 1 is a column vector whose elements are all 1, and the column vector v is:

$$v=[v_1 v_2 \ldots v_n \bar{v}_n \bar{v}_{n-1} \ldots \bar{v}_1]^T, \quad (3)$$

where $(\ )^T$ represents transposition of a matrix or vector, an element is $\bar{v}_i = -v_i$, $v_i = \pm 1$, and i=1, ..., n, that is, a value of $v_i$ is +1 or −1. In an exemplary implementation manner, the matrix V is formed only by the column vector 1 and/or the at least one column vector v. That is, in the matrix V, except the included column vector 1, the other column vectors are column vectors v. Further, preferably, when the matrix V includes multiple vectors v, the multiple vectors v s are different; in this case, better orthogonality can be provided, thereby avoiding occurrence of strong interference.

In another optional implementation manner of this embodiment, the codebook includes at least: a precoding matrix $W_i$ and a precoding matrix $W_j$, where the $W_i$ and the $W_j$ satisfy the formula (4):

$$W_i = D(i,j) W_j \qquad (4)$$

where the matrix D(i,j) is a diagonal matrix; optionally, phases of diagonal elements $\mu_1, \mu_2, \ldots, \mu_n$ of the matrix D(i,j) form an arithmetic progression, and the matrix has the structure shown in the formula (5):

$$D(i,j) = \alpha_{(i,j)} \mathrm{diag}\{\mu_1, \mu_2, \ldots, \mu_n, \mu^*_n, \mu^*_{n-1}, \ldots, \mu^*_1\} \qquad (5)$$

where $\alpha_{(i,j)}$ is a complex factor, and a real part or an imaginary part of the complex factor may be 0; and a complex number $\mu^*_m$ is a conjugate complex number of a complex number $\mu_m$, m=1, . . . , n, and n is determined by a quantity of antenna ports.

For the foregoing two precoding matrices in the codebook, the user equipment may select different precoding matrices from the codebook at different time points according to a preset rule or randomly, that is, the user equipment may determine a first precoding matrix indicator PMI at a time point, where the PMI corresponds to the precoding matrix $W_i$ in the codebook, and send the first PMI to the base station; and determine a second precoding matrix indicator PMI at another time point, where the PMI corresponds to the precoding matrix $W_j$ in the codebook, and send the second PMI to the base station.

Corresponding to the case in which the foregoing user equipment sends the first PMI or the second PMI at different time points, on a base station side, the base station may also receive, at a time point, the first precoding matrix indicator PMI sent by the user equipment, and select the corresponding precoding matrix $W_i$ from the codebook according to the first PMI; and receive, at another time point, the second precoding matrix indicator PMI sent by the user equipment, and select the corresponding precoding matrix $W_j$ from the codebook according to the second PMI.

Optionally, the codebook includes at least: a precoding matrix $W_i$ and a precoding matrix $W_k$, where the $W_i$ and $W_k$ satisfy the formula (6):

$$D_i^{-1} W_i = D_k^{-1} W_k = V \qquad (6)$$

where the matrix V includes a column vector 1 and/or at least one column vector v, the column vector 1 is a column vector whose elements are all 1, and the column vector v has the structure shown in the formula (3); and the matrix $D_i$ and the matrix $D_k$ both are diagonal matrices, and have the structure shown in the formula (7):

$$D_m = \alpha_m \cdot \mathrm{diag}\{u_{m,1}, u_{m,2}, \ldots, u_{m,n}, u^*_{m,n}, u^*_{m,n-1}, \ldots, u^*_{m,1}\}, m=i,k \qquad (7)$$

where $\alpha_m$ is a complex factor, and a real part or an imaginary part of the complex factor may be 0; a complex number $u^*_{m,l}$ is a conjugate complex number of a complex number $u_{m,l}$, m=i, k, l=1, . . . , n and n is determined by a quantity of antenna ports; and optionally, phases of diagonal elements $u_{m,1}, u_{m,2}, \ldots, u_{m,n}$ of the matrix form an arithmetic progression.

For the foregoing two precoding matrices in the codebook, the user equipment may select different precoding matrices from the codebook at different time points according to a preset rule or randomly, that is, the user equipment may determine a first precoding matrix indicator PMI at a time point, where the PMI corresponds to the precoding matrix $W_i$ in the codebook, and send the first PMI to the base station; and determine a second precoding matrix indicator PMI at another time point, where the PMI corresponds to the precoding matrix $W_k$ in the codebook, and send the second PMI to the base station.

Corresponding to the case in which the foregoing user equipment sends the first PMI or the second PMI at different time points, on a base station side, the base station may also receive, at a time point, the first precoding matrix indicator PMI sent by the user equipment, and select the corresponding precoding matrix $W_i$ from the codebook according to the first PMI; and receive, at another time point, the second precoding matrix indicator PMI sent by the user equipment, and select the corresponding precoding matrix $W_k$ from the codebook according to the second PMI.

It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

Step 303: The user equipment sends a precoding matrix indicator PMI to the base station, where the PMI corresponds to the selected precoding matrix.

In the foregoing embodiment of the present invention, user equipment selects, based on a reference signal, a precoding matrix from a codebook, and sends a precoding matrix indicator PMI. A precoding matrix W included in the codebook is a product of a matrix D and a matrix V. The D is a diagonal matrix and satisfies D=$\alpha \cdot$diag$\{u_1, u_2, \ldots, u_n, u^*_n, u^*_{n-1}, \ldots, u^*_1\}$, where $u_1, u_2, \ldots, u_n, u^*_n, u^*_{n-1}, \ldots, u^*_1$ forms a conjugate and symmetric sequence, which avoids constant modulus restrictions or a limit that antennas perform transmission by using equal powers, and can effectively control a beam shape and a beam orientation.

Further, the matrix V includes a column vector 1 and/or at least one column vector v=$[v_1 \; v_2 \ldots v_n \; \bar{v}_n \; \bar{v}_{n-1} \ldots \bar{v}_1]^T$, so that column vectors of the precoding matrix are orthogonal to each other, which can effectively reduce inter-layer interference, thereby greatly improving performance of MIMO, especially MU-MIMO. Therefore, the foregoing method for determining a precoding matrix can fully use a degree of freedom of controlling a beam shape and a beam orientation of an antenna system, and meanwhile reduce inter-layer interference of MIMO transmission as much as possible, thereby improving precision of CSI feedback, and a system throughput.

Using n=5 as an example, diagonal elements shown in the formula (2) may be:

$$[u_1, u_2, u_3, u_4, u_5] = \left[ e^{j\frac{\pi}{2}}, \left(\frac{7}{6}\right)^{\frac{1}{2}} e^{j\frac{\pi}{3}}, \left(\frac{8}{6}\right)^{\frac{1}{2}} e^{j\frac{\pi}{4}}, \left(\frac{9}{6}\right)^{\frac{1}{2}} e^{j\frac{\pi}{6}}, \left(\frac{10}{6}\right)^{\frac{1}{2}} \right] \qquad (8)$$

correspondingly, the following formula is satisfied:

$$[u_5^*, u_4^*, u_3^*, u_2^*, u_1^*] = \left[\left(\frac{10}{6}\right)^{\frac{1}{2}}, \left(\frac{9}{6}\right)^{\frac{1}{2}} e^{-j\frac{\pi}{6}}, \left(\frac{8}{6}\right)^{\frac{1}{2}} e^{-j\frac{\pi}{4}}, \left(\frac{7}{6}\right)^{\frac{1}{2}} e^{-j\frac{\pi}{3}}, e^{-j\frac{\pi}{2}}\right] \quad (9)$$

Alternatively, diagonal elements shown in the formula (2) may be:

$$[u_1, u_2, u_3, u_4, u_5] = \left[e^{j\frac{\pi}{2}}, e^{j\frac{\pi}{3}}, e^{j\frac{\pi}{4}}, e^{j\frac{\pi}{6}}, 1\right] \quad (10)$$

correspondingly, the following formula is satisfied:

$$[u_5^*, u_4^*, u_3^*, u_2^*, u_1^*] = \left[1, e^{-j\frac{\pi}{6}}, e^{-j\frac{\pi}{4}}, e^{-j\frac{\pi}{3}}, e^{-j\frac{\pi}{2}}\right] \quad (11)$$

Correspondingly, the column vector v may be:

$$v = [1\ 1\ 1\ 1\ 1\ -1\ -1\ -1\ -1\ -1]^T \quad (12)$$

Optionally, as another embodiment, in the matrix D, phases of the diagonal elements $u_1, u_2, \ldots, u_n$ form an arithmetic progression, and phases of the diagonal elements $u^*_n, u^*_{n-1}, \ldots, u^*_1$ form an arithmetic progression.

Using n=5 as an example, diagonal elements shown in the formula (5) may be:

$$[\mu_1, \mu_2, \mu_3, \mu_4, \mu_5] = \left[e^{j\frac{\pi}{2}}, \left(\frac{7}{6}\right)^{\frac{1}{2}} e^{j\frac{\pi}{3}}, \left(\frac{8}{6}\right)^{\frac{1}{2}} e^{j\frac{\pi}{4}}, \left(\frac{9}{6}\right)^{\frac{1}{2}} e^{j\frac{\pi}{6}}, \left(\frac{10}{6}\right)^{\frac{1}{2}}\right] \quad (8a)$$

correspondingly, the following formula is satisfied:

$$[\mu_5^*, \mu_4^*, \mu_3^*, \mu_2^*, \mu_1^*] = $$
$$\left[\left(\frac{10}{6}\right)^{\frac{1}{2}}, \left(\frac{9}{6}\right)^{\frac{1}{2}} e^{-j\frac{\pi}{6}}, \left(\frac{8}{6}\right)^{\frac{1}{2}} e^{-j\frac{\pi}{4}}, \left(\frac{7}{6}\right)^{\frac{1}{2}} e^{-j\frac{\pi}{3}}, e^{-j\frac{\pi}{2}}\right] \quad (9a)$$

Alternatively, diagonal elements shown in the formula (5) may be:

$$[\mu_1, \mu_2, \mu_3, \mu_4, \mu_5] = \left[e^{j\frac{\pi}{2}}, e^{j\frac{\pi}{3}}, e^{j\frac{\pi}{4}}, e^{j\frac{\pi}{6}}, 1\right] \quad (10a)$$

correspondingly, the following formula is satisfied:

$$[\mu_5^*, \mu_4^*, \mu_3^*, \mu_2^*, \mu_1^*] = \left[1, e^{-j\frac{\pi}{6}}, e^{-j\frac{\pi}{4}}, e^{-j\frac{\pi}{3}}, e^{-j\frac{\pi}{2}}\right] \quad (11a)$$

Using n=4 as an example, diagonal elements shown in the formula (2) may be:

$$[u_1, u_2, u_3, u_4] = \left[e^{j\frac{7\pi}{12}}, \left(\frac{5}{4}\right)^{\frac{1}{2}} e^{j\frac{5\pi}{12}}, \left(\frac{6}{4}\right)^{\frac{1}{2}} e^{j\frac{3\pi}{12}}, \left(\frac{7}{4}\right)^{\frac{1}{2}} e^{j\frac{\pi}{12}}\right] \quad (13)$$

correspondingly, the following formula is satisfied:

$$[u_4^*, u_3^*, u_2^*, u_1^*] = \left[\left(\frac{7}{4}\right)^{\frac{1}{2}} e^{-j\frac{\pi}{12}}, \left(\frac{6}{4}\right)^{\frac{1}{2}} e^{-j\frac{3\pi}{12}}, \left(\frac{5}{4}\right)^{\frac{1}{2}} e^{-j\frac{5\pi}{12}}, e^{-j\frac{7\pi}{12}}\right] \quad (14)$$

Alternatively, diagonal elements shown in the formula (2) are:

$$[u_1, u_2, u_3, u_4] = \left[e^{j\frac{7\pi}{12}}, e^{j\frac{5\pi}{12}}, e^{j\frac{3\pi}{12}}, e^{j\frac{\pi}{12}}\right] \quad (15)$$

correspondingly, the following formula is satisfied:

$$[u_4^*, u_3^*, u_2^*, u_1^*] = \left[e^{-j\frac{\pi}{12}}, e^{-j\frac{3\pi}{12}}, e^{-j\frac{5\pi}{12}}, e^{-j\frac{7\pi}{12}}\right] \quad (16)$$

In the foregoing two formulas, a phase of the diagonal elements $u_1, u_2, \ldots, u_n$ and a phase progression of the diagonal elements $u^*_n, u^*_{n-1}, \ldots, u^*_1$ respectively form arithmetic progressions whose common differences respectively are $-\pi/6$ and $+\pi/6$.

Using n=4 as an example, diagonal elements shown in the formula (5) may be:

$$[\mu_1, \mu_2, \mu_3, \mu_4] = \left[e^{j\frac{7\pi}{32}}, \left(\frac{5}{4}\right)^{\frac{1}{2}} e^{j\frac{5\pi}{32}}, \left(\frac{6}{4}\right)^{\frac{1}{2}} e^{j\frac{3\pi}{32}}, \left(\frac{7}{4}\right)^{\frac{1}{2}} e^{j\frac{\pi}{32}}\right] \quad (13a)$$

correspondingly, the following formula is satisfied:

$$[\mu_4^*, \mu_3^*, \mu_2^*, \mu_1^*] = \left[\left(\frac{7}{4}\right)^{\frac{1}{2}} e^{-j\frac{\pi}{32}}, \left(\frac{6}{4}\right)^{\frac{1}{2}} e^{-j\frac{3\pi}{32}}, \left(\frac{5}{4}\right)^{\frac{1}{2}} e^{-j\frac{5\pi}{32}}, e^{-j\frac{7\pi}{32}}\right] \quad (14a)$$

Alternatively, diagonal elements shown in the formula (5) are:

$$[\mu_1, \mu_2, \mu_3, \mu_4] = \left[e^{j\frac{7\pi}{32}}, e^{j\frac{5\pi}{32}}, e^{j\frac{3\pi}{32}}, e^{j\frac{\pi}{32}}\right] \quad (15a)$$

correspondingly, the following formula is satisfied:

$$[\mu_4^*, \mu_3^*, \mu_2^*, \mu_1^*] = \left[e^{-j\frac{\pi}{32}}, e^{-j\frac{3\pi}{32}}, e^{-j\frac{5\pi}{32}}, e^{-j\frac{7\pi}{32}}\right] \quad (16a)$$

In the foregoing two formulas, a phase of the diagonal elements $u_1, u_2, \ldots, u_n$ and a phase progression of the diagonal elements $u^*_n, u^*_{n-1}, \ldots, u^*_1$ respectively form arithmetic progressions whose common differences respectively are $-\pi/16$ and $\pi/16$.

Using n=4 as an example, diagonal elements of the diagonal matrices shown in the formula (7) may be respectively:

$$[u_{i,1}, u_{i,2}, u_{i,3}, u_{i,4}] = \left[e^{j\frac{7\pi}{16}}, \left(\frac{5}{4}\right)^{\frac{1}{2}} e^{j\frac{5\pi}{16}}, \left(\frac{6}{4}\right)^{\frac{1}{2}} e^{j\frac{3\pi}{16}}, \left(\frac{7}{4}\right)^{\frac{1}{2}} e^{j\frac{\pi}{16}}\right] \quad (17)$$

-continued $$[u_{k,1}, u_{k,2}, u_{k,3}, u_{k,4}] = \left[e^{j\frac{7\pi}{8}}, \left(\frac{5}{4}\right)^{\frac{1}{2}}e^{j\frac{5\pi}{8}}, \left(\frac{6}{4}\right)^{\frac{1}{2}}e^{j\frac{3\pi}{8}}, \left(\frac{7}{4}\right)^{\frac{1}{2}}e^{j\frac{\pi}{8}}\right] \quad (18)$$

Alternatively, diagonal elements of the diagonal matrices shown in the formula (7) may be respectively:

$$[u_{i,1}, u_{i,2}, u_{i,3}, u_{i,4}] = \left[e^{j\frac{7\pi}{16}}, e^{j\frac{5\pi}{16}}, e^{j\frac{3\pi}{16}}, e^{j\frac{\pi}{16}}\right] \quad (19)$$

$$[u_{k,1}, u_{k,2}, u_{k,3}, u_{k,4}] = \left[e^{j\frac{7\pi}{8}}, e^{j\frac{5\pi}{8}}, e^{j\frac{3\pi}{8}}, e^{j\frac{\pi}{8}}\right] \quad (20)$$

In this embodiment, in the matrix D, the phases of the diagonal elements $u_1, u_2, \ldots, u_n$ form an arithmetic progression, and the phases of the diagonal elements $u^*_n$, $u^*_{n-1}, \ldots, u^*_1$ form an arithmetic progression, which may match with an array structure of an antenna port, for example, a common uniform linear array or cross polarization array, where in the former array, array elements or antennas are arranged at a same spacing, and in the latter array, co-polarized antennas or array elements are arranged at a same spacing. Therefore, the phases in the arithmetic progression can improve precoding performance by using a property of the foregoing array structure.

Optionally, as another embodiment, the column vector v of the matrix V may be a column vector of a matrix $[H^T H^T]^T$, where a matrix H is a Hadamard matrix.

Using n=4 as an example, the column vector v is a column vector of the matrix $[H^T H^T]^T$, where $$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (21)$$

In this case, the column vector v may be:

$$v=[1\ -1\ 1\ -1\ 1\ -1\ 1\ -1]^T \quad (22)$$

or, $$v=[1\ 1\ -1\ -1\ 1\ 1\ -1\ -1]^T \quad (23)$$

or, $$v=[1\ -1\ -1\ 1\ 1\ -1\ -1\ 1]^T \quad (24)$$

In this embodiment, the column vector v is a column vector of the matrix $[H^T H^T]^T$, and satisfies the property of the formula (3), and column vectors of the $[H^T H^T]^T$ are orthogonal to each other, so that the obtained column vectors are orthogonal to each other, thereby reducing inter-layer interference that is generated when the precoding matrix is used for MIMO transmission.

In the foregoing embodiment of the present invention, the selecting, by the user equipment, a precoding matrix from a codebook according to the reference signal may be specifically: obtaining, by the user equipment based on the reference signal, channel estimation; and selecting, based on a predefined criterion according to the channel estimation, the precoding matrix from the codebook, where the foregoing predefined criterion may be a channel capacity maximization criterion, a throughput maximization criterion, or a cosine distance minimization criterion.

In addition, in this embodiment of the present invention, the selecting, based on the reference signal, a precoding matrix from a codebook may include:

selecting the precoding matrix from a codebook subset according to the reference signal, where the foregoing codebook subset is a predefined codebook subset, or a codebook subset reported to the base station, or a codebook subset reported to the base station, and returned and confirmed by the base station; the foregoing predefined codebook subset may be predefined in a protocol and is known by the user equipment and the base station in the system; and the codebook subset reported to the base station may be a codebook subset that is determined by the user equipment and is recently (recently) reported to the base station. In this embodiment, codebook subsets are set, for different application scenarios, in the codebook; and therefore, selecting a precoding matrix based on a codebook subset can effectively reduce feedback overheads and the implementation complexity.

Further, the codebook subset in the foregoing embodiment of the present invention may include a set of the precoding matrix W=DV, where the matrix D belongs to a subset of a universal set of the matrix D, or the matrix V belongs to a subset of a universal set of the matrix V.

It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

It should be understood that the precoding matrix in the codebook or the codebook subset may be pre-stored in the user equipment and the base station, or may be calculated by the user equipment and the base station according to the structure of the foregoing precoding matrix, or may be acquired from a network device, which is not limited in the present invention.

In step 303 shown in the foregoing FIG. 3, the precoding matrix indicator sent to the base station may include one or more indexes. Specifically, the codebook or the codebook subset usually is a set of one or more precoding matrices, where one precoding matrix indicator corresponds to one precoding matrix. Different precoding matrix indicators correspond to different precoding matrices in the codebook or the codebook subset, and in this embodiment, the sent precoding matrix indicator corresponds to the selected precoding matrix.

Specifically, the foregoing precoding matrix indicator PMI may include only one index, that is, one index directly indicates one precoding matrix, or the foregoing precoding matrix indicator may include two indexes, namely a first index PMI1 and a second index PMI2, where the first index PMI1 and the second index PMI2 jointly indicate the precoding matrix. In addition, the first index PMI1 corresponds to the matrix D, and the second index PMI2 corresponds to the matrix V. In an implementation manner of this implementation manner, for precoding matrices W indicated by two PMIs that have different first indexes PMI1 and a same second index PMI2, corresponding matrices D are different, and corresponding matrices V are the same. Optionally, for precoding matrices W indicated by two PMIs that have a same first index PMI1 and different second indexes PMI2, corresponding matrices D are the same, and corresponding matrices V are different.

Optionally, the foregoing first index PMI1 and second index PMI2 may have different time-domain granularities or frequency-domain granularities, that is, the PMI1 and the PMI2 separately represent channel characteristics of different periods or bandwidths, or are obtained based on different subframe periods or subbands.

Optionally, as another embodiment, the user equipment sends the first index PMI1 and the second index PMI2 to the base station by using different time periods, for example, the PMI1 may have a longer subframe period than the PMI2.

In addition, in step 303 in the foregoing embodiment of the present invention, the precoding matrix indicator PMI may be sent to the base station by using a physical uplink control channel (PUCCH) or a physical uplink shared channel (PUSCH).

The precoding matrix W in this embodiment may be a precoding matrix obtained by means of row or column transposition, for example, different antenna numbers correspondingly cause row transposition of the precoding matrix. In addition, the structure of the foregoing precoding matrix W not only may be used for antenna configuration in a horizontal direction in an AAS base station, but also may be used for antenna configuration in a perpendicular direction.

Figure 4:
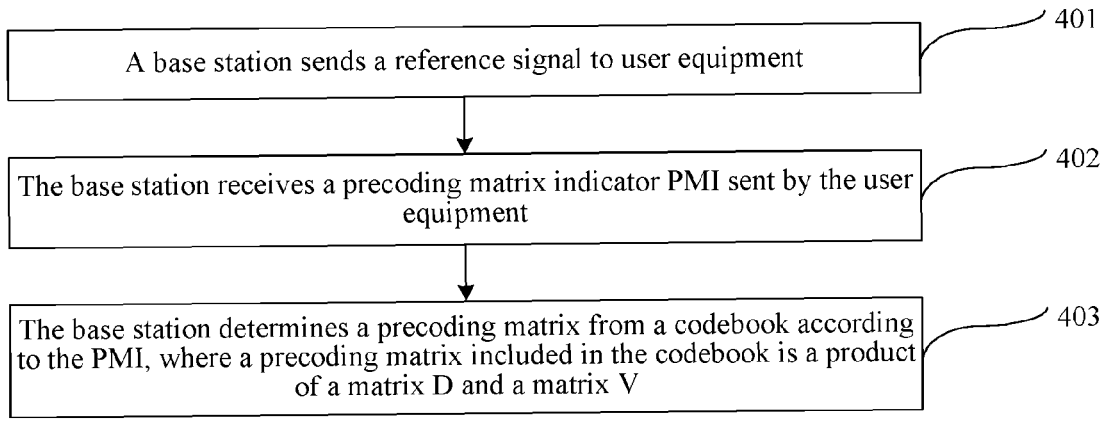
FIG. 4 is a second schematic flowchart of a specific embodiment of the present invention.

FIG. 4 is a second schematic flowchart of a specific embodiment. As shown in FIG. 4, the embodiment includes the following steps:

Step 401: A base station sends a reference signal to user equipment.

Specifically, the reference signal sent by the base station in this step may include a CSI RS, a DM RS, or a CRS. The user equipment UE may acquire the reference signal by receiving an eNB notification, or may obtain, based on a cell identity ID, a resource configuration of the reference signal and obtain the reference signal in a corresponding resource or subframe, where the eNB notification may be higher-layer signaling such as RRC signaling, or dynamic signaling such as DCI.

Step 402: The base station receives a precoding matrix indicator PMI sent by the user equipment.

Specifically, the precoding matrix indicator PMI corresponds to a precoding matrix that is selected from a codebook by the user equipment based on the reference signal.

Step 403: The base station determines a precoding matrix from a codebook according to the PMI, where the codebook includes one precoding matrix W that is a product of a matrix D and a matrix V and has the structure shown in the formula (25):

$$W = DV \quad (25)$$

where the matrix D is a diagonal matrix, and satisfies:

$$D = \alpha \cdot \text{diag}\{u_1, u_2, \ldots, u_n, u^*_n, u^*_{n-1}, \ldots, u^*_1\} \quad (26)$$

where $\alpha$ is a complex factor, a complex number $u^*_i$ is a conjugate complex number of a complex number $u_i$ and $i=1, \ldots, n$; and the matrix V is a constant modulus matrix, for example, elements of the matrix V may be ±1 or ±j.

In another optional implementation manner of this embodiment, the matrix V includes a column vector 1 and/or at least one column vector v, where the column vector 1 is a column vector whose elements are all 1, and the column vector v is:

$$v = [v_1 v_2 \ldots v_n \bar{v}_n \bar{v}_{n-1} \ldots \bar{v}_1]^T \quad (27)$$

where $(\ )^T$ represents transposition of a matrix or vector, an element is $\bar{v}_i = -v_i$, $i=1, \ldots, n$, and $v_i = \pm 1$, that is, a value of $v_i$ is +1 or −1. In an exemplary implementation manner, the matrix V is formed only by the column vector 1 and/or the at least one column vector v, that is, in the matrix V, except the included column vector 1, the other column vectors are all column vectors v.

In another optional implementation manner of this embodiment, the codebook includes multiple precoding matrices, and the multiple precoding matrices include a precoding matrix $W_i$ and a precoding matrix $W_j$, where the $W_i$ and the $W_j$ satisfy the formula (4), and the matrix D(i,j) is a diagonal matrix and has the structure shown in the formula (5).

Optionally, the multiple precoding matrices include a precoding matrix $W_i$ and a precoding matrix $W_k$, where the and the $W_k$ satisfy the formula (6), the matrix V includes a column vector 1 and/or at least one column vector v, the column vector 1 is a column vector whose elements are all 1, and the column vector v has the structure shown in the formula (27). The matrix $D_i$ and the matrix $D_k$ both are diagonal matrices, and have the structure shown in the formula (7).

It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

In the foregoing embodiment of the present invention, a base station receives a precoding matrix indicator PMI sent by user equipment, and determines a precoding matrix from a codebook according to the PMI. A precoding matrix W included in the codebook is a product of a matrix D and a matrix V. The D is a diagonal matrix and satisfies $D = \alpha \cdot \text{diag}\{u_1, u_2, \ldots, u_n, u^*_n, u^*_{n-1}, \ldots, u^*_1\}$, where $u_1, u_2, \ldots, u_n, u^*_n, u^*_{n-1}, \ldots, u^*_1$ forms a conjugate and symmetric sequence, which avoids constant modulus restrictions or a limit that antennas perform transmission by using equal powers, and can effectively control a beam shape and a beam orientation.

Further, the matrix V includes a column vector 1 and/or at least one column vector $v = [v_1 v_2 \ldots v_n \bar{v}_n \bar{v}_{n-1} \ldots \bar{v}_1]^T$, so that column vectors of the precoding matrix are orthogonal to each other, which can effectively reduce inter-layer interference, thereby greatly improving performance of MIMO, especially MU-MIMO. Therefore, the foregoing method for determining a precoding matrix can fully use a degree of freedom of controlling a beam shape and a beam orientation of an antenna system, and meanwhile reduce inter-layer interference of MIMO transmission as much as possible, thereby improving precision of CSI feedback, and a system throughput.

Specifically, the base station may obtain the precoding matrix from the codebook according to the received PMI, where the codebook is the same as the codebook used by the user equipment. Further, the base station may further precode to-be-sent data according to the obtained precoding matrix.

Using n=5 as an example, the foregoing diagonal elements $u_1, u_2, \ldots, u_n$, diagonal elements $u^*_n, u^*_{n-1}, \ldots, u^*_1$, and column vector v in this embodiment may be respectively shown in the formula (8) to the formula (12).

Using n=5 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (8a) to the formula (11a).

Optionally, as another embodiment, in the matrix D, phases of the diagonal elements $u_1, u_2, \ldots, u_n$ form an arithmetic progression, and phases of the diagonal elements $u^*_n, u^*_{n-1}, \ldots, u^*_1$ form an arithmetic progression. Using n=4 as an example, the diagonal elements $u_1, u_2, \ldots, u_n$ and the diagonal elements $u^*_n, u^*_{n-1}, \ldots, u^*_1$ may be respectively shown in the formula (13) to the formula (16).

Using n=4 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (13a) to the formula (16a).

Using n=4 as an example, the diagonal elements of the diagonal matrices shown in the formula (7) used in this embodiment may be respectively shown in the formula (17) to the formula (20).

In this embodiment, in the matrix D, the phases of the diagonal elements $u_1, u_2, \ldots, u_n$ form an arithmetic progression, and the phases of the diagonal elements $u^*_n, u^*_{n-1}, \ldots, u^*_1$ form an arithmetic progression, which may match with an array structure of an antenna port, for example, a common uniform linear array or cross polarization array, where in the former array, array elements or antennas are arranged at a same spacing, and in the latter array, co-polarized antennas or array elements are arranged at a same spacing. Therefore, the phases in the arithmetic progression can improve precoding performance by using a property of the foregoing array structure.

Optionally, as another embodiment, the column vector v of the matrix V may be a column vector of a matrix $[H^T H^T]^T$, where a matrix H is a Hadamard matrix. Using n=4 as an example, the Hadamard matrix and the column vector v may be respectively shown in the formula (21) to the formula (24).

In this embodiment, the column vector v is a column vector of the matrix $[H^T H^T]^T$, and satisfies the property of the formula (27), and column vectors of the $[H^T H^T]^T$ are orthogonal to each other, so that the obtained column vectors are orthogonal to each other, thereby reducing inter-layer interference that is generated when the precoding matrix is used for MIMO transmission.

In this embodiment of the present invention, the determining a precoding matrix from a codebook according to the PMI includes:

determining the precoding matrix from a codebook subset according to the PMI, where the codebook subset is a predefined codebook subset, or a codebook subset reported to the base station, or a codebook subset reported to the base station, and returned and confirmed by the base station. The codebook subset may be a set of the precoding matrix W=DV, where the matrix D or the matrix V is a subset of a candidate matrix thereof It should be understood that the precoding matrix in the codebook or the codebook subset may be pre-stored in the user equipment and the base station, or may be calculated by the user equipment and the base station according to the structure of the foregoing precoding matrix, or may be acquired from a network device, which is not limited in the present invention.

The foregoing precoding matrix indicator PMI may include only one index, that is, one index directly indicates one precoding matrix, or the foregoing precoding matrix indicator may include two indexes, namely a first index PMI1 and a second index PMI2, where the first index PMI1 and the second index PMI2 jointly indicate the precoding matrix. In addition, the first index PMI1 corresponds to the matrix D, and the second index PMI2 corresponds to the matrix V. In an implementation manner of this implementation manner, for precoding matrices W indicated by two PMIs that have different first indexes PMI1 and a same second index PMI2, corresponding matrices D are different, and corresponding matrices V are the same. Optionally, for precoding matrices W indicated by two PMIs that have a same first index PMI1 and different second indexes PMI2, corresponding matrices D are the same, and corresponding matrices V are different.

Optionally, the foregoing first index PMI1 and second index PMI2 may have different time-domain granularities or frequency-domain granularities, that is, the PMI1 and the PMI2 separately represent channel characteristics of different periods or bandwidths, or are obtained based on different subframe periods or subbands.

Optionally, as another embodiment, the base station may receive, by using different time periods, the first index PMI1 and the second index PMI2 that are sent by the user equipment, for example, the PMI1 may have a longer subframe period than the PMI2. In addition, the base station may receive, by using a PUCCH or a PUSCH, the precoding matrix indicator PMI sent by the user equipment.

Figure 5:
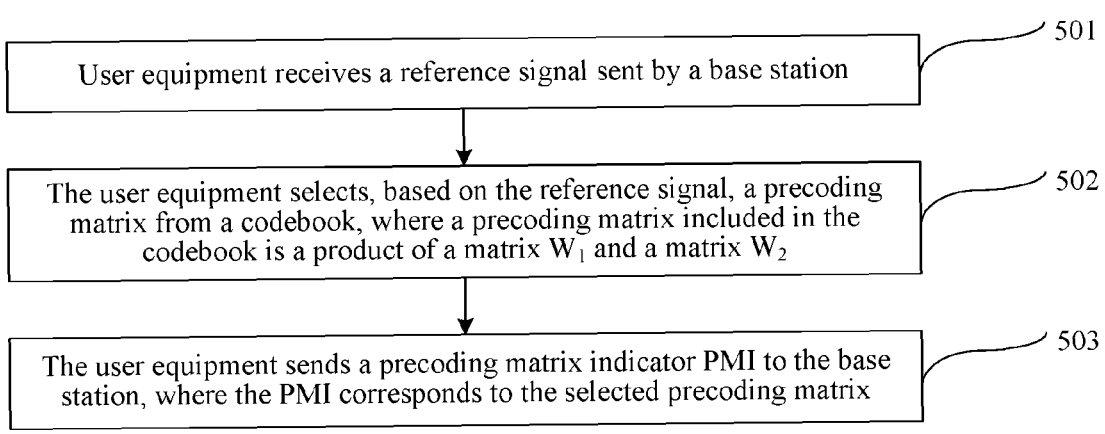
FIG. 5 is a third schematic flowchart of a specific embodiment of the present invention.

FIG. 5 is a third schematic flowchart of a specific embodiment of the present invention. This embodiment provides a method for determining a precoding matrix indicator that is executed on a user equipment side when a precoding matrix satisfies a first condition. As shown in FIG. 5, the method includes the following steps:

Step 501: User equipment receives a reference signal sent by a base station.

Similar to step 301 in the embodiment shown in FIG. 3, in this step, the reference signal sent by the base station may include a CSI RS, a DM RS, or a CRS. The user equipment UE may acquire the reference signal by receiving an eNB notification, or may obtain, based on a cell identity ID, a resource configuration of the reference signal and obtain the reference signal in a corresponding resource or subframe, where the eNB notification may be higher-layer signaling such as RRC signaling, or dynamic signaling such as DCI.

Step 502: The user equipment selects, based on the reference signal, a precoding matrix from a codebook, where a precoding matrix W included in the codebook is a product of a matrix $W_1$ and a matrix $W_2$, where $$W = W_1 W_2 \tag{28}$$

The matrix $W_1$ is a block diagonal matrix, $$W_1 = \mathrm{diag}\{X_1, \ldots, X_{N_B}\}, N_B \geq 1 \tag{29}$$

where at least one block matrix X is a product of a matrix D and a matrix V, and $X \in \{X_1, X_2, \ldots, X_{N_B}\}$, that is, the block matrix X has the structure shown in the formula (30):

$$X = DV \tag{30}$$

The matrix D is a diagonal matrix, $$D = \alpha \cdot \mathrm{diag}\{u_1, u_2, \ldots, u_n, u^*_n, u^*_{n-1}, \ldots, u^*_1\}, \tag{31}$$

where $\alpha$ is a complex factor, a complex number $u^*_i$ is a conjugate complex number of a complex number $u_i$, and i=1, ..., n; and the matrix V includes a column vector 1 and/or at least one column vector v, where the column vector 1 is a column vector whose elements are all 1, and the column vector v is:

$$v = [v_1 v_2 \ldots v_n \bar{v}_n \bar{v}_{n-1} \ldots \bar{v}_1]^T \tag{32}$$

where $(\ )^T$ represents transposition of a matrix or vector, an element is $\bar{v}_i = -v_i$, i=1, ..., n, and $v_i = \pm 1$, that is, a value of $v_i$ is +1 or -1. The matrix $W_2$ is used to select one or more column vectors of the matrix $W_1$, or is used to perform weighted combination on one or more column vectors of the $W_1$ to obtain the precoding matrix W.

In another optional implementation manner of this embodiment, the block matrix X may be multiple different matrices, including a matrix $P_i$ and a matrix $P_j$, where the $P_i$ and the $P_j$ satisfy the formula (33):

$$P_i = D(i,j) P_j \qquad (33)$$

where the matrix D(i,j) is a diagonal matrix, and has the structure shown in the formula (5); and optionally, phases of diagonal elements $\mu_1, \mu_2, \ldots, \mu_n$ of the matrix D(i,j) form an arithmetic progression.

Optionally, the block matrix X may be multiple different matrices, including a matrix $P_i$ and a matrix $P_k$, where the $P_i$ and the $P_k$ satisfy the formula (34):

$$D_i^{-1} P_i = D_k^{-1} P_k = V \qquad (34)$$

where the matrix V includes a column vector 1 and/or at least one column vector v, the column vector 1 is a column vector whose elements are all 1, and the column vector v has the structure shown in the formula (32); and the matrix $D_i$ and the matrix $D_k$ both are diagonal matrices, and have the structure shown in the formula (35):

$$D_m = \alpha_m \cdot \text{diag}\{u_{m,1}, u_{m,2}, \ldots, u_{m,n}, u^*_{m,n}, u^*_{m,n-1}, \ldots, u^*_{m,1}\}, m=i,k \qquad (35)$$

where $\alpha_m$ is a complex factor, and a real part or an imaginary part of the complex factor may be 0; a complex number $u^*_{m,l}$ is a conjugate complex number of a complex number $u_{m,l}$, m=i, k, l=1, ..., n and n is determined by a quantity of antenna ports; and optionally, phases of diagonal elements $u_{m,1}, u_{m,2}, \ldots, u_{m,n}$ of the matrix $D_m$ form an arithmetic progression.

The user equipment may select different precoding matrices at different time points according to a preset rule or randomly, that is, the user equipment may determine a first precoding matrix indicator PMI at a time point, where the PMI corresponds to the precoding matrix $P_i$ in the codebook, and send the first PMI to the base station; and determine a second precoding matrix indicator PMI at another time point, where the PMI corresponds to the precoding matrix $D_k$ in the codebook, and send the second PMI to the base station.

Corresponding to the case in which the foregoing user equipment sends the first PMI or the second PMI at different time points, on a base station side, the base station may also receive, at a time point, the first precoding matrix indicator PMI sent by the user equipment, and select the corresponding precoding matrix $P_i$ from the codebook according to the first PMI; and receive, at another time point, the second precoding matrix indicator PMI sent by the user equipment, and select the corresponding precoding matrix $D_k$ from the codebook according to the second PMI.

It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

Step 503: The user equipment sends a precoding matrix indicator PMI to the base station, where the PMI corresponds to the selected precoding matrix.

In the foregoing embodiment of the present invention, user equipment selects, based on a reference signal, a precoding matrix from a codebook, and sends a precoding matrix indicator PMI. A precoding matrix W included in the codebook is a product of a matrix $W_1$ and a matrix $W_2$, where the matrix $W_1$ is a block diagonal matrix, $W_1 = \text{diag}\{X_1, \ldots, X_{N_B}\}$, and $N_B \geq 1$, where at least one block matrix X is a product of a matrix D and a matrix V, X=DV and $X \in \{X_1, X_2, \ldots, X_{N_B}\}$. The D is a diagonal matrix and satisfies $D = \alpha \cdot \text{diag}\{u_1, u_2, \ldots, u_n, u^*_n, u^*_{n-1}, \ldots, u^*_1\}$, where $u_1, u_2, \ldots, u_n, u^*_n, u^*_{n-1}, \ldots, u^*_1$ forms a conjugate and symmetric sequence, which avoids constant modulus restrictions or a limit that antennas perform transmission by using equal powers, and can effectively control a beam shape and a beam orientation. The matrix V includes a column vector 1 and/or at least one column vector $v = [v_1 \ v_2 \ \ldots \ v_n \ \bar{v}_n \ \bar{v}_{n-1} \ \ldots \ \bar{v}_1]^T$, so that column vectors of the precoding matrix are orthogonal to each other, which can effectively reduce inter-layer interference, thereby greatly improving performance of MIMO, especially MU-MIMO. Therefore, the foregoing method for determining a precoding matrix can fully use a degree of freedom of controlling a beam shape and a beam orientation of an antenna system, and meanwhile reduce inter-layer interference of MIMO transmission as much as possible, thereby improving precision of CSI feedback, and a system throughput.

Specifically, using n=5 as an example, the foregoing diagonal elements $u_1, u_2, \ldots, u_n$ diagonal elements $u^*_n, u^*_{n-1}, \ldots, u^*_1$, and column vector v may be respectively shown in the formula (8) to the formula (12).

Using n=5 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (8a) to the formula (11a).

Optionally, as another embodiment, in the matrix D, phases of the diagonal elements $u_1, u_2, \ldots, u_n$ form an arithmetic progression, and phases of the diagonal elements $u^*_n, u^*_{n-1}, \ldots, u^*_1$ form an arithmetic progression. Using n=4 as an example, the diagonal elements $u_1, u_2, \ldots, u_n$ and the diagonal elements $u^*_n, u^*_{n-1}, \ldots, u^*_1$ may be respectively shown in the formula (13) to the formula (16).

Using n=4 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (13a) to the formula (16a).

Using n=4 as an example, the diagonal elements of the diagonal matrices in the formula (35) used in this embodiment may be respectively shown in the formula (17) to the formula (20).

In this embodiment, in the matrix D, the phases of the diagonal elements $u_1, u_2, \ldots, u_n$ form an arithmetic progression, and the phases of the diagonal elements $u^*_n, u^*_{n-1}, \ldots, u^*_1$ form an arithmetic progression, which may match with an array structure of an antenna port, for example, a common uniform linear array or cross polarization array, where in the former array, array elements or antennas are arranged at a same spacing, and in the latter array, co-polarized antennas or array elements are arranged at a same spacing. Therefore, the phases in the arithmetic progression can improve precoding performance by using a property of the foregoing array structure.

Optionally, as another embodiment, the column vector v of the matrix V may be a column vector of a matrix $[H^T \ H^T]^T$, where a matrix H is a Hadamard matrix. Using n=4 as an example, the Hadamard matrix and the column vector v may be respectively shown in the formula (21) to the formula (24).

In this embodiment, the column vector v is a column vector of the matrix $[H^T\ H^T]^T$, and satisfies the property of the formula (32), and column vectors of the $[H^T\ H^T]^T$ are orthogonal to each other, so that the obtained column vectors are orthogonal to each other, thereby reducing inter-layer interference that is generated when the precoding matrix is used for MIMO transmission.

In the foregoing embodiment of the present invention, the matrix $W_2$ is used to select a column vector of the matrix $W_1$, or is used to perform weighted combination on a column vector of the $W_1$ to form the matrix W.

Using $W_1 = \mathrm{diag}\{X_1, X_2\}$ as an example, where each of a block matrix $X_1$ and a block matrix $X_2$ has four columns, the $W_2$ may be the following matrix:

$$W_2 \in \left\{ \frac{1}{\sqrt{2}} \begin{bmatrix} e_i \\ e_i \end{bmatrix}, \frac{1}{\sqrt{2}} \begin{bmatrix} e_i \\ je_i \end{bmatrix}, \frac{1}{\sqrt{2}} \begin{bmatrix} e_i \\ -e_i \end{bmatrix}, \frac{1}{\sqrt{2}} \begin{bmatrix} e_i \\ -je_i \end{bmatrix} \middle| i=1,2,3,4 \right\} \quad (36)$$

where $e_i$, i=1, 2, 3, 4 represents a 4×1 selection vector, and except that the $i^{th}$ element is 1, other elements are all 0.

Using $W_1 = \mathrm{diag}\{X_1, X_2\}$ as an example, where each of a block matrix $X_1$ and a block matrix $X_2$ has eight columns, the $W_2$ may be the following matrix:

$$W_2 \in \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\} \quad (37)$$

$$Y \in \{e_1, e_2, e_3, e_4, e_5, e_6, e_7, e_8\} \quad (38)$$

or, $$W_2 \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\} \quad (39)$$

$$(Y_1, Y_2) \in \{(e_1, e_1), (e_2, e_2), (e_3, e_3), \quad (40)$$
$$(e_4, e_4), (e_1, e_2), (e_2, e_3), (e_1, e_4), (e_2, e_4)\}$$

where $e_n$, n=1, 2, ..., 8 represents an 8×1 selection vector, and except that the $n^{th}$ element is 1, other elements are all 0.

Using $W_1 = \mathrm{diag}\{X_1, X_2, X_3, X_4\}$ as an example, where each block matrix of $X_1, X_2, X_3, X_4$ has four columns, the $W_2$ may be the following matrix:

$$W_2 \in \left\{ \frac{1}{2} \begin{bmatrix} e_i \\ e^{j\theta} e_i \\ e^{j\phi} e_k \\ e^{j(\phi+\theta)} e_k \end{bmatrix}, \frac{1}{2} \begin{bmatrix} e_i \\ -e^{j\theta} e_i \\ e^{j\phi} e_k \\ -e^{j(\phi+\theta)} e_k \end{bmatrix}, \right. \quad (41)$$

$$\left. \frac{1}{2} \begin{bmatrix} e_i \\ je^{j\theta} e_i \\ e^{j\phi} e_k \\ je^{j(\phi+\theta)} e_k \end{bmatrix}, \frac{1}{2} \begin{bmatrix} e_i \\ -je^{j\theta} e_i \\ e^{j\phi} e_k \\ -je^{j(\phi+\theta)} e_k \end{bmatrix} \middle| \begin{array}{l} i=1,2,3,4; \\ k=1,2,3,4 \end{array} \right\}$$

where $e_i$, i=1, 2, 3, 4 represents a 4×1 selection vector, and except that the $i^{th}$ element is 1, other elements are all 0, where $\theta$ and $\phi$ are phases, for example, $$\theta = \frac{m\pi}{32}, m=0,1,2,3,\ldots \text{ and } \phi = \frac{n\pi}{32}, n=0,1,2,3,\ldots.$$

Further, the block matrix is $X_1 = X_2$, $X_3 = X_4$ or $X_1 = X_2 = X_3 = X_4$.

Using $W_1 = \mathrm{diag}\{X_1, X_2, X_3, X_4\}$ as an example, where each block matrix of $X_1, X_2, X_3, X_4$ has eight columns, the $W_2$ may be the following matrix:

$$W_2 \in \quad (42)$$

$$\left\{ \frac{1}{2}\begin{bmatrix} Y_1 \\ e^{j\theta} Y_1 \\ e^{j\phi} Y_2 \\ e^{j(\phi+\theta)} Y_2 \end{bmatrix}, \frac{1}{2}\begin{bmatrix} Y_1 \\ -e^{j\theta} Y_1 \\ e^{j\phi} Y_2 \\ -e^{j(\phi+\theta)} Y_2 \end{bmatrix}, \frac{1}{2}\begin{bmatrix} Y_1 \\ je^{j\theta} Y_1 \\ e^{j\phi} Y_2 \\ je^{j(\phi+\theta)} Y_2 \end{bmatrix}, \frac{1}{2}\begin{bmatrix} Y_1 \\ -je^{j\theta} Y_1 \\ e^{j\phi} Y_2 \\ -je^{j(\phi+\theta)} Y_2 \end{bmatrix} \right\}$$

$$Y_1 \in \{e_1, e_2, e_3, e_4, e_5, e_6, e_7, e_8\}, \quad (43)$$
$$Y_2 \in \{e_1, e_2, e_3, e_4, e_5, e_6, e_7, e_8\}$$

or, $$W_2 \in \quad (44)$$

$$\left\{ \frac{1}{2\sqrt{2}}\begin{bmatrix} Y_{1,1} & Y_{1,2} \\ e^{j\theta} Y_{1,1} & e^{j\theta} Y_{1,2} \\ e^{j\phi} Y_{2,1} & e^{j\phi} Y_{2,2} \\ e^{j(\phi+\theta)} Y_{2,1} & e^{j(\phi+\theta)} Y_{2,2} \end{bmatrix}, \frac{1}{2\sqrt{2}}\begin{bmatrix} Y_{1,1} & Y_{1,2} \\ e^{j\theta} Y_{1,1} & -e^{j\theta} Y_{1,2} \\ e^{j\phi} Y_{2,1} & e^{j\phi} Y_{2,2} \\ e^{j(\phi+\theta)} Y_{2,1} & -e^{j(\phi+\theta)} Y_{2,2} \end{bmatrix}, \right.$$

$$\left. \frac{1}{2\sqrt{2}}\begin{bmatrix} Y_{1,1} & Y_{1,2} \\ -e^{j\theta} Y_{1,1} & e^{j\theta} Y_{1,2} \\ e^{j\phi} Y_{2,1} & e^{j\phi} Y_{2,2} \\ e^{j(\phi+\theta)} Y_{2,1} & -e^{j(\phi+\theta)} Y_{2,2} \end{bmatrix}, \frac{1}{2\sqrt{2}}\begin{bmatrix} Y_{1,1} & Y_{1,2} \\ -e^{j\theta} Y_{1,1} & e^{j\theta} Y_{1,2} \\ e^{j\phi} Y_{2,1} & e^{j\phi} Y_{2,2} \\ -e^{j(\phi+\theta)} Y_{2,1} & e^{j(\phi+\theta)} Y_{2,2} \end{bmatrix} \right\}$$

$$(Y_{m,1}, Y_{m,2}) \in \left\{ \begin{array}{l} (e_1, e_1), (e_2, e_2), (e_3, e_3), (e_4 + e_4), \\ (e_1, e_2), (e_2, e_3), (e_1, e_4), (e_2, e_4) \end{array} \right\}, m=1,2 \quad (45)$$

where $e_n$, n=1, 2, ..., 8 represents an 8×1 selection vector, and except that the $n^{th}$ element is 1, other elements are all 0, where $\theta$ and $\phi$ are phases, for example, $$\theta = \frac{m\pi}{32}, m=0,1,2,3,\ldots \text{ and } \phi = \frac{n\pi}{32}, n=1,2,3,\ldots.$$

Further, the block matrix is $X_1 = X_2$, $X_3 = X_4$ or $X_1 = X_2 = X_3 = X_4$.

In the foregoing embodiment of the present invention, the selecting, by the user equipment based on the reference signal, a precoding matrix from a codebook may be specifically: obtaining, by the user equipment based on the reference signal, channel estimation; and selecting, based on a predefined criterion according to the channel estimation, the precoding matrix from the codebook, where the foregoing predefined criterion may be a channel capacity maximization criterion, a throughput maximization criterion, or a cosine distance minimization criterion.

In addition, in the foregoing embodiment of the present invention, the selecting, based on the reference signal, a precoding matrix from a codebook may include: selecting the precoding matrix from a codebook subset according to the reference signal, where the foregoing codebook subset is a predefined codebook subset, or a codebook subset reported to the base station, or a codebook subset reported to the base station, and returned and confirmed by the base station; the foregoing predefined codebook subset may be predefined in a protocol and is known by the user equipment and the base station in the system; and the codebook subset reported to the base station may be a codebook subset that is recently determined by the user equipment and reported to the base station. In this embodiment, codebook subsets are set, for different application scenarios, in the codebook; and therefore, selecting a precoding matrix based on a codebook subset can effectively reduce feedback overheads and the implementation complexity.

Further, the codebook subset in the foregoing embodiment of the present invention may include:

a set of a precoding matrix $W=W_1W_2$, where $W_1=\text{diag}\{X_1, \ldots, X_{N_B}\}$, at least one block matrix X is a product of a matrix D and a matrix V, $X \in \{X_1, X_2, \ldots, X_{N_B}\}$, and $X=DV$; and the matrix D, the matrix V, or the matrix $W_2$ is a subset of a candidate matrix thereof.

It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

It should be understood that the precoding matrix in the codebook or the codebook subset may be pre-stored in the user equipment and the base station, or may be calculated by the user equipment and the base station according to the structure of the foregoing precoding matrix, or may be obtained from a network device, which is not limited in the present invention.

Further, in the foregoing precoding matrix, a block matrix $X_k$ and a block matrix $X_l$, $k \neq l$ may be different, or may be the same. In a case in which there are multiple $X_k$ s that are the same as the $X_l$, $k \neq l$, for example, the $X_k$ and the $X_l$, $k \neq l$ that are the same exist in pairs, feedback overheads can be further reduced. Multiple block matrices $X_i$ in the foregoing matrix $W_1$ may respectively correspond to antenna port groups having different polarizations or at different positions, so that the foregoing precoding matrix matches with multiple antenna deployments or configurations.

In step 503 shown in the foregoing FIG. 5, the precoding matrix indicator sent to the base station may include one or more indexes. Specifically, the codebook or the codebook subset usually is a set of one or more precoding matrices, where one precoding matrix indicator corresponds to one precoding matrix. Different precoding matrix indicators correspond to different precoding matrices in the codebook or the codebook subset, and in this embodiment, the sent precoding matrix indicator corresponds to the selected precoding matrix.

Specifically, the foregoing precoding matrix indicator PMI may include only one index, that is, one index directly indicates one precoding matrix, or the foregoing precoding matrix indicator may include two indexes, namely a first index PMI1 and a second index PMI2, where the first index PMI1 and the second index PMI2 jointly indicate the precoding matrix. In addition, the first index PMI1 is used for indicating the matrix $W_1$, and the second index PMI2 is used for indicating the matrix $W_2$. The foregoing first index PMI1 and second index PMI2 may have different time-domain granularities or frequency-domain granularities, that is, the PMI1 and the PMI2 separately represent channel characteristics of different periods or bandwidths, or are obtained based on different subframe periods or subbands.

Optionally, the foregoing PMI may also include three indexes, where the three indexes are respectively used for indicating the matrix D, the matrix V, and the matrix $W_2$.

Optionally, as another embodiment, the user equipment sends the first index PMI1 and the second index PMI2 to the base station by using different time periods, for example, the PMI1 may have a longer subframe period than the PMI2.

In addition, in step 503 in the foregoing embodiment of the present invention, the precoding matrix indicator information PMI may be sent to the base station by using a PUCCH or a PUSCH.

The precoding matrix W in this embodiment may be a precoding matrix obtained by means of row or column transposition, for example, different antenna numbers correspondingly cause row transposition of the precoding matrix. In addition, the structure of the foregoing precoding matrix W not only may be used for antenna configuration in a horizontal direction in an AAS base station, but also may be used for antenna configuration in a perpendicular direction.

In this embodiment of the present invention, user equipment selects, based on a reference signal, a precoding matrix from a codebook, and sends a precoding matrix indicator PMI, where the PMI corresponds to the selected precoding matrix. A precoding matrix W included in the codebook is a product of a matrix $W_1$ and a matrix $W_2$, where the $W_1$ is a block diagonal matrix, and $W_1=\text{diag}\{X_1, \ldots, X_{N_B}\}$, where at least one block matrix X is a product of a matrix D and a matrix V, $X=DV$, and $X \in \{X_1, X_2, \ldots, X_{N_B}\}$. The D is a diagonal matrix and satisfies $D=\alpha \cdot \text{diag}\{u_1, u_2, \ldots, u_n, u^*_n, u^*_{n-1}, \ldots, u^*_1\}$, where $u_1, u_2, \ldots, u_n, u^*_n, u^*_{n-1}, \ldots, u^*_1$ forms a conjugate and symmetric sequence, which avoids constant modulus restrictions or a limit that antennas perform transmission by using equal powers, and can effectively control a beam shape and a beam orientation. The matrix V includes a column vector 1 and at least one column vector $v=[v_1 \, v_2 \ldots v_n \, \bar{v}_n \, \bar{v}_{n-1} \ldots \bar{v}_1]^T$, so that column vectors of the precoding matrix are orthogonal to each other, which can effectively reduce inter-layer interference, thereby greatly improving performance of MIMO, especially MU-MIMO. Multiple block matrices $X_i$ may respectively correspond to antenna port groups having different polarizations or at different positions, so that the foregoing precoding matrix matches with multiple antenna deployments or configurations. Therefore, the foregoing method for determining a precoding matrix can fully use a degree of freedom of controlling a beam shape and a beam orientation in a horizontal and/or perpendicular direction of an active antenna system, and meanwhile reduce inter-layer interference during transmission as much as possible, thereby improving precision of CSI feedback, and a system throughput.

Figure 6:
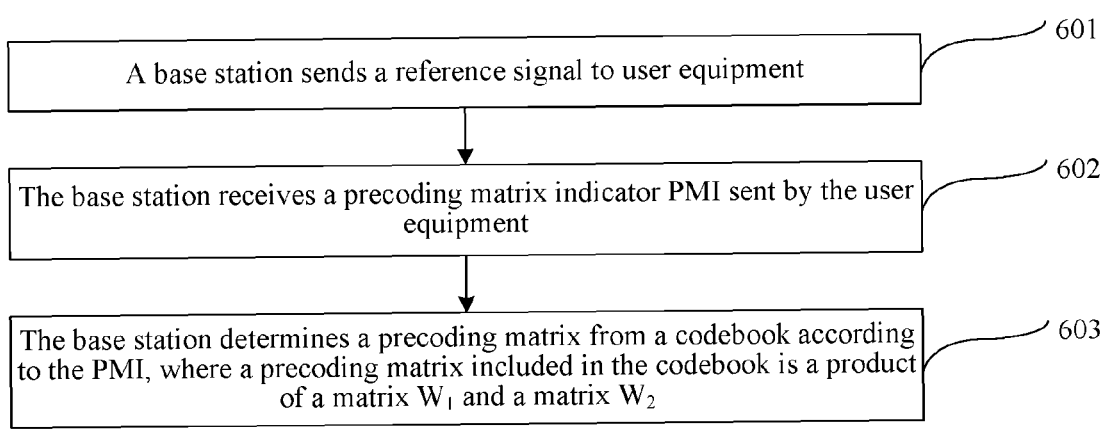
FIG. 6 is a fourth schematic flowchart of a specific embodiment of the present invention.

Corresponding to the embodiment shown in FIG. 5, an embodiment of the present invention further provides a method for determining a precoding matrix indicator that is executed on a base station side when a precoding matrix satisfies a first condition. FIG. 6 is a fourth schematic flowchart of a specific embodiment of the present invention. As shown in FIG. 6, the embodiment includes the following steps:

Step 601: A base station sends a reference signal to user equipment.

The foregoing sent reference signal may include multiple forms, and for details, reference may be made to step 501 in the embodiment shown in FIG. 5.

Step 602: The base station receives a precoding matrix indicator PMI sent by the user equipment.

Specifically, the precoding matrix indicator PMI corresponds to a precoding matrix that is selected from a codebook by the user equipment based on the reference signal.

Step 603: The base station determines a precoding matrix from a codebook according to the PMI, where a precoding matrix W included in the codebook is a product of a matrix $W_1$ and a matrix $W_2$, where $$W = W_1 W_2 \qquad (46)$$

The matrix $W_1$ is a block diagonal matrix, $$W_1 = \text{diag}\{X_1, \ldots, X_{N_B}\}, N_B \geq 1 \qquad (47)$$

where at least one block matrix X is a product of a matrix D and a matrix V, and $X \in \{X_1, X_2, \ldots, X_{N_B}\}$, that is, the block matrix X has the structure shown in the formula (48):

$$X = DV \qquad (48)$$

The matrix D is a diagonal matrix, $$D = \alpha \cdot \text{diag}\{u_1, u_2, \ldots, u_n, u^*_n, u^*_{n-1}, \ldots, u^*_1\} \qquad (49)$$

where $\alpha$ is a complex factor, a complex number $u^*_i$ is a conjugate complex number of a complex number $u_i$, and $i = 1, \ldots, n$; and the matrix V includes a column vector 1 and/or at least one column vector v, where the column vector 1 is a column vector whose elements are all 1, and the column vector v is:

$$v = [v_1 v_2 \ldots v_n \bar{v}_n \bar{v}_{n-1} \ldots \bar{v}_1]^T \qquad (50)$$

where $(\ )^T$ represents transposition of a matrix or vector, an element is $\bar{v}_i = -v_i$, $i = 1, \ldots, n$, and $v_i = \pm 1$, that is, a value of $v_i$ is $+1$ or $-1$. The matrix $W_2$ is used to select one or more column vectors of the matrix $W_1$, or is used to perform weighted combination on one or more column vectors of the $W_1$ to obtain the precoding matrix W.

In another optional implementation manner of this embodiment, the block matrix X may be multiple different matrices, including a matrix $P_i$ and a matrix $P_j$, where the $P_i$ and the $P_j$ satisfy the formula (51):

$$P_i = D(i,j) P_j \qquad (51)$$

where the matrix D(i,j) is a diagonal matrix, and has the structure shown in the formula (5); and optionally, phases of diagonal elements $\mu_1, \mu_2, \ldots, \mu_n$ of the matrix D(i,j) form an arithmetic progression.

The user equipment may select different precoding matrices at different time points according to a preset rule or randomly, that is, the user equipment may determine a first precoding matrix indicator PMI at a time point, where the PMI corresponds to the precoding matrix $P_i$ in the codebook, and send the first PMI to the base station; and determine a second precoding matrix indicator PMI at another time point, where the PMI corresponds to a precoding matrix $D_k$ in the codebook, and send the second PMI to the base station.

Corresponding to the case in which the foregoing user equipment sends the first PMI or the second PMI at different time points, on a base station side, the base station may also receive, at a time point, the first precoding matrix indicator PMI sent by the user equipment, and select the corresponding precoding matrix $P_i$ from the codebook according to the first PMI; and receive, at another time point, the second precoding matrix indicator PMI sent by the user equipment, and select the corresponding precoding matrix $D_k$ from the codebook according to the second PMI.

Optionally, the block matrix X may be multiple different matrices, including a matrix $P_i$ and a matrix $P_k$, where the $P_i$ and the $P_k$ satisfy the formula (52):

$$D_i^{-1} P_i = D_k^{-1} P_k = V \qquad (52)$$

where the matrix V includes a column vector 1 and/or at least one column vector v, the column vector 1 is a column vector whose elements are all 1, and the column vector v has the structure shown in the formula (50); and the matrix $D_i$ and the matrix $D_k$ both are diagonal matrices, and have the structure shown in the formula (53):

$$D_m = \alpha_m \cdot \text{diag}\{u_{m,1}, u_{m,2}, \ldots, u_{m,n}, u^*_{m,n}, u^*_{m,n-1}, \ldots, u^*_{m,1}\}, m = i, k \qquad (53)$$

where $\alpha_m$ is a complex factor, and a real part or an imaginary part of the complex factor may be 0; a complex number $u^*_{m,l}$ is a conjugate complex number of a complex number $u_{m,l}$, m=i,k, l=1, ..., n and n is determined by a quantity of antenna ports; and optionally, phases of diagonal elements $u_{m,1}, u_{m,2}, \ldots, u_{m,n}$ of the matrix $D_m$ form an arithmetic progression.

It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

In the foregoing embodiment of the present invention, a base station receives a precoding matrix indicator PMI sent by user equipment, and determines a precoding matrix from a codebook according to the PMI. A precoding matrix W included in the codebook is a product of a matrix $W_1$ and a matrix $W_2$, where the matrix $W_1$ is a block diagonal matrix, $W_1 = \text{diag}\{X_1, \ldots, X_{N_B}\}$, and $N_B \geq 1$, where at least one block matrix X is a product of a matrix D and a matrix V, $X \in \{X_1, X_2, \ldots, X_{N_B}\}$, and X=DV. The D is a diagonal matrix and satisfies $D = \alpha \cdot \text{diag}\{u_1, u_2, \ldots, u_n, u^*_n, u^*_{n-1}, \ldots, u^*_1\}$, where $u_1, u_2, \ldots, u_n, u^*_n, u^*_{n-1}, \ldots, u^*_1$ forms a conjugate and symmetric sequence, which avoids constant modulus restrictions, and can effectively control a beam shape and a beam orientation. The matrix V includes a column vector 1 and at least one column vector $v = [v_1 v_2 \ldots v_n \bar{v}_n \bar{v}_{n-1} \ldots \bar{v}_1]^T$, so that column vectors of the precoding matrix are orthogonal to each other, which can effectively reduce inter-layer interference, thereby greatly improving performance of MIMO, especially MU-MIMO. Therefore, the foregoing method for determining a precoding matrix can fully use a degree of freedom of controlling a beam shape and a beam orientation of an antenna system, and meanwhile reduce inter-layer interference of MIMO transmission as much as possible, thereby improving precision of CSI feedback, and a system throughput.

Specifically, the base station may obtain the precoding matrix from the codebook according to the received PMI, where the codebook is the same as the codebook used by the user equipment. Further, the base station may further precode to-be-sent data according to the obtained precoding matrix.

Using n=5 as an example, the foregoing diagonal elements $u_1, u_2, \ldots, u_n$, diagonal elements $u^*_n, u^*_{n-1}, \ldots, u^*_1$, and column vector v may be respectively shown in the formula (8) to the formula (12).

Using n=5 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (8a) to the formula (11a).

Optionally, as another embodiment, in the matrix D, phases of the diagonal elements $u_1, u_2, \ldots, u_n$ form an arithmetic progression, and phases of the diagonal elements $u^*_n, u^*_{n-1}, \ldots, u^*_1$ form an arithmetic progression. Using n=4 as an example, the diagonal elements $u_1, u_2, \ldots, u_n$ and the diagonal elements $u^*_n, u^*_{n-1}, \ldots, u^*_1$ may be respectively shown in the formula (13) to the formula (16).

Using n=4 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (13a) to the formula (16a).

Using n=4 as an example, the diagonal elements of the diagonal matrices shown in the formula (53) used in this embodiment may be respectively shown in the formula (17) to the formula (20).

In this embodiment, in the matrix D, the phases of the diagonal elements $u_1, u_2, \ldots, u_n$ form an arithmetic progression, and the phases of the diagonal elements $u^*_n, u^*_{n-1}, \ldots, u^*_1$ form an arithmetic progression, which may match with an array structure of an antenna port, for example, a common uniform linear array or cross polarization array, where in the former array, array elements or antennas are arranged at a same spacing, and in the latter array, co-polarized antennas or array elements are arranged at a same spacing. Therefore, the phases in the arithmetic progression can improve precoding performance by using a property of the foregoing array structure.

Optionally, as another embodiment, the column vector v of the matrix V may be a column vector of a matrix $[H^T H^T]^T$, where a matrix H is a Hadamard matrix. Using n=4 as an example, the Hadamard matrix and the column vector v may be respectively shown in the formula (21) to the formula (24).

In this embodiment, the column vector v is a column vector of the matrix $[H^T H^T]^T$, and satisfies the property of the formula (50), and column vectors of the $[H^T H^T]^T$ are orthogonal to each other, so that the obtained column vectors are orthogonal to each other, thereby reducing inter-layer interference that is generated when the precoding matrix is used for MIMO transmission. In the foregoing embodiment of the present invention, the matrix $W_2$ is used to select a column vector of the matrix $W_1$, or is used to perform weighted combination on a column vector of the $W_1$ to form the matrix W.

Using $W_1$=diag$\{X_1, X_2\}$ as an example, where each of a block matrix $W_1$ and a block matrix $X_2$ has four columns, the $W_2$ may be the matrix shown in the formula (36). Using $W_1$=diag$\{X_1, X_2\}$ as an example, where each of a block matrix $W_1$ and a block matrix $X_2$ has eight columns, the $W_2$ may be the matrix shown in the formula (37) to the formula (40).

Using $W_1$=diag$\{X_1, X_2, X_3, X_4\}$ as an example, where each block matrix of $X_1, X_2, X_3, X_4$ has four columns, the $W_2$ may be the matrix shown in the formula (41). Further, the block matrix is $X_1=X_2, X_3=X_4$ or $X_1=X_2=X_3=X_4$.

Using $W_1$=diag$\{X_1, X_2, X_3, X_4\}$ as an example, where each block matrix of $X_1, X_2, X_3, X_4$ has eight columns, the $W_2$ may be the matrix shown in the formula (42) to the formula (45). Further, the block matrix is $X_1=X_2, X_3=X_4$ or $X_1=X_2=X_3=X_4$.

In the foregoing embodiment of the present invention, the determining a precoding matrix from a codebook according to the PMI may include:

determining the precoding matrix from a codebook subset according to the PMI, where the foregoing codebook subset is a predefined codebook subset, or a codebook subset reported to the base station, or a codebook subset reported to the base station, and returned and confirmed by the base station.

The foregoing codebook subset may include a set of the precoding matrix $W=W_1 W_2$, where $W_1$=diag$\{X_1, \ldots, X_{N_B}\}$, $X_k$=DV, and the matrix D, the matrix V, or the matrix $W_2$ is a subset of a candidate matrix thereof.

It should be understood that the precoding matrix in the codebook or the codebook subset may be pre-stored in the user equipment and the base station, or may be calculated by the user equipment and the base station according to the structure of the foregoing precoding matrix, which is not limited in the present invention.

In addition, the foregoing precoding matrix indicator PMI may include only one index, that is, one index directly indicates one precoding matrix, or the foregoing precoding matrix indicator may include two indexes, namely a first index PMI1 and a second index PMI2, where the first index PMI1 and the second index PMI2 jointly indicate the precoding matrix. In addition, the first index PMI1 is used for indicating the matrix $W_1$, and the second index PMI2 is used for indicating the matrix $W_2$. The foregoing first index PMI1 and second index PMI2 may have different time-domain granularities or frequency-domain granularities, that is, the PMI1 and the PMI2 separately represent channel characteristics of different periods or bandwidths, or are obtained based on different subframe periods or subbands.

Optionally, the foregoing PMI may also include three indexes, where the three indexes are respectively used for indicating the matrix D, the matrix V, and the matrix $W_2$.

Optionally, as another embodiment, the base station receives, by using different time periods, the first index PMI1 and the second index PMI2 that are sent by the user equipment, for example, the PMI1 may have a longer subframe period than the PMI2.

Specifically, the foregoing base station may receive, by using a PUCCH or a PUSCH, the precoding matrix indicator PMI sent by the user equipment UE.

The precoding matrix W in this embodiment of the present invention may be a precoding matrix obtained by means of row or column transposition, for example, different antenna numbers correspondingly cause row transposition of the precoding matrix. The precoding matrix provided in the foregoing embodiment of the present invention not only may be used for antenna configuration in a horizontal direction in an AAS base station, but also may be used for antenna configuration in a perpendicular direction.

Figure 7:
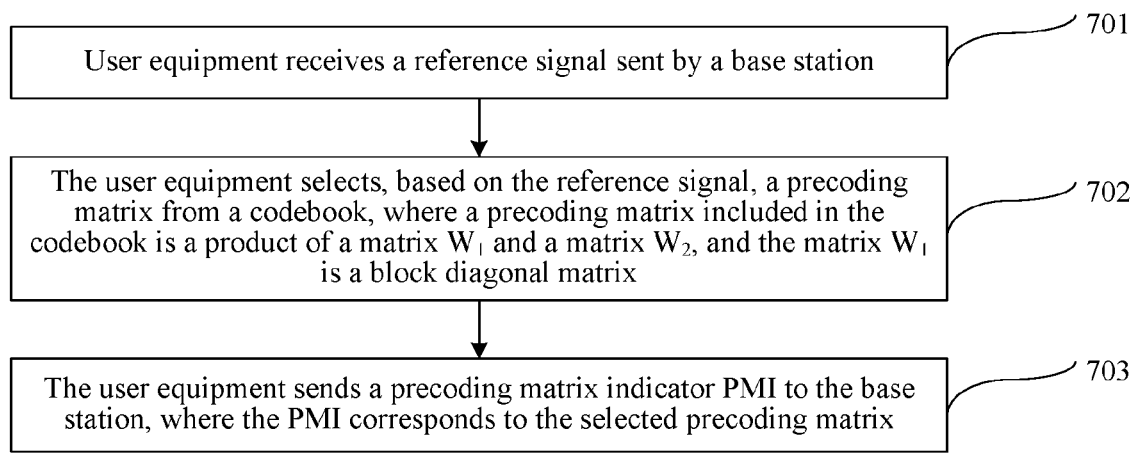
FIG. 7 is a fifth schematic flowchart of a specific embodiment of the present invention.

FIG. 7 is a fifth schematic flowchart of a specific embodiment of the present invention. This embodiment provides a method for determining a precoding matrix indicator that is executed on a user equipment side when a precoding matrix satisfies a third condition. As shown in FIG. 7, the method includes the following steps:

Step 701: User equipment receives a reference signal sent by a base station.

Specifically, in this step, the user equipment may receive the reference signal in multiple manners, and the reference signal sent by the base station may include a CSI RS, a DM RS, or a CRS. The user equipment UE may acquire the reference signal by using a received eNB notification, or may obtain, based on a cell identity ID, a resource configuration of the reference signal and obtain the reference signal in a corresponding resource or subframe, where the eNB notification may be higher-layer signaling such as RRC signaling, or dynamic signaling such as DCI.

Step 702: The user equipment selects, based on the reference signal, a precoding matrix from a codebook, where a precoding matrix W included in the codebook is a product of a matrix $W_1$ and a matrix $W_2$, where $$W=W_1 W_2 \tag{54}$$

The matrix $W_1$ is a block diagonal matrix, $$W_1=\text{diag}\{X_1, \ldots, X_{N_B}\}, N_B \geq 1 \tag{55}$$

where at least one block matrix X is a Kronecker product of a matrix A and a matrix B, and $X \in \{X_1, X_2, \ldots, X_{N_B}\}$, that is, the block matrix X has the structure shown in the formula (56):

$$X = A \otimes B \quad (56)$$

where the matrix A or the matrix B is a product of a matrix D and a matrix V, $$A = DV \quad (57)$$

or $$B = DV \quad (58)$$

The matrix D is a diagonal matrix, and satisfies:

$$D = \alpha \cdot \text{diag}\{u_1, u_2, \ldots, u_n, u^*_n, u^*_{n-1}, \ldots, u^*_1\} \quad (59)$$

where $\alpha$ is a complex factor, a complex number $u^*_i$ is a conjugate complex number of a complex number $u_i$, and $i=1, \ldots, n$; and the matrix V includes a column vector 1 and/or at least one column vector v, where the column vector 1 is a column vector whose elements are all 1, and the column vector v is:

$$v = [v_1 v_2 \ldots v_n \bar{v}_n \bar{v}_{n-1} \ldots \bar{v}_1]^T \quad (60)$$

where an element is $\bar{v}_i = -v_i$, and $i=1, \ldots, n$, and $v_i = \pm 1$, that is, a value of $v_i$ is +1 or −1. The matrix $W_2$ is used to select one or more column vectors of the matrix $W_1$, or is used to perform weighted combination on one or more column vectors of the $W_1$ to obtain the precoding matrix W.

In another optional implementation manner of this embodiment, the matrix A or the matrix B may be multiple different matrices, including a matrix $P_i$ and a matrix $P_j$, where the $P_i$ and the $P_j$ satisfy the formula (61):

$$P_i = D(i,j) P_j \quad (61)$$

where the matrix D(i,j) is a diagonal matrix, and has the structure shown in the formula (5); and optionally, phases of diagonal elements $\mu_1, \mu_2, \ldots, \mu_n$ of the matrix D(i,j) form an arithmetic progression.

Optionally, the matrix A or the matrix B may be multiple different matrices, including a matrix $P_i$ and a matrix $P_k$, where the $P_i$ and the $P_k$ satisfy the formula (62):

$$D_i^{-1} P_i = D_k^{-1} P_k = V \quad (62)$$

where the matrix V includes a column vector 1 and/or at least one column vector v, the column vector 1 is a column vector whose elements are all 1, and the column vector v has the structure shown in the formula (60); and the matrix $D_i$ and the matrix $D_k$ both are diagonal matrices, and have the structure shown in the formula (63):

$$D_m = \alpha_m \cdot \text{diag}\{u_{m,1}, u_{m,2}, \ldots, u_{m,n}, u^*_{m,n}, u^*_{m,n-1}, \ldots, u^*_{m,1}\}, m = i, k \quad (63)$$

where $\alpha_m$ is a complex factor, and a real part or an imaginary part of the complex factor may be 0; a complex number $u^*_{m,l}$ is a conjugate complex number of a complex number $u_{m,l}$, $m = i,k$, $l = 1, \ldots, n$ and n is determined by a quantity of antenna ports; and optionally, phases of diagonal elements $u_{m,1}, u_{m,2}, \ldots, u_{m,n}$ of the matrix $D_m$ form an arithmetic progression.

It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

Step 703: The user equipment sends a precoding matrix indicator PMI to the base station, where the PMI corresponds to the selected precoding matrix.

In the foregoing embodiment of the present invention, user equipment selects, based on a reference signal, a precoding matrix from a codebook, and sends a precoding matrix indicator PMI. A precoding matrix W included in the codebook is a product of a matrix $W_1$ and a matrix $W_2$, where the matrix $W_1$ is a block diagonal matrix, $W_1 = \text{diag}\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$; and the matrix A or the matrix B is a product of a matrix D and a matrix V, where $A = DV$ or $B = DV$. The D is a diagonal matrix and satisfies $D = \alpha \cdot \text{diag}\{u_1, u_2, \ldots, u_n, u^*_n, u^*_{n-1}, \ldots, u^*_1\}$, where $u_1, u_2, \ldots, u_n, u^*_n, u^*_{n-1}, \ldots, u^*_1$ forms a conjugate and symmetric sequence, which avoids constant modulus restrictions or a limit that antennas perform transmission by using equal powers, and can effectively control a beam shape and a beam orientation. The matrix V includes a column vector 1 and at least one column vector $v = [v_1 v_2 \ldots v_n \bar{v}_n \bar{v}_{n-1} \ldots \bar{v}_1]^T$, so that column vectors of the precoding matrix are orthogonal to each other, which can effectively reduce inter-layer interference, thereby greatly improving performance of MIMO, especially MU-MIMO. Therefore, the foregoing method for determining a precoding matrix can fully use a degree of freedom of controlling a beam shape and a beam orientation in horizontal and perpendicular directions of an active antenna system, and meanwhile reduce inter-layer interference during transmission as much as possible, thereby improving precision of CSI feedback, and a system throughput.

Optionally, the base station may further obtain the precoding matrix according to the received PMI.

Specifically, the base station may obtain the precoding matrix from the codebook according to the received PMI, where the codebook is the same as the codebook used by the user equipment.

Specifically, when the matrix A is the matrix having the structure shown in the formula (57), the matrix B may be the matrix having the structure shown in the formula (58). In addition, the matrix B may also be a discrete fourier transformation (DFT) matrix, a Householder matrix, a Hadamard matrix, or a precoding matrix in a two-antenna codebook, a four-antenna codebook, or an eight-antenna codebook in an LTE R10 system.

Specifically, when the matrix B is the matrix having the structure shown in the formula (57), the matrix A may be the matrix having the structure shown in the formula (58). In addition, the matrix A may also be a DFT matrix, a Householder matrix, a Hadamard matrix, or a precoding matrix in a two-antenna codebook, a four-antenna codebook, or an eight-antenna codebook in an LTE R10 system.

Specifically, using n=5 as an example, the foregoing diagonal elements $u_1, u_2, \ldots, u_n$, diagonal elements $u^*_n, u^*_{n-1}, \ldots, u^*_1$, and column vector v may be respectively shown in the formula (8) to the formula (12).

Using n=5 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (8a) to the formula (11a).

Optionally, as another embodiment, in the matrix D, phases of the diagonal elements $u_1, u_2, \ldots, u_n$ form an arithmetic progression, and phases of the diagonal elements $u^*_n, u^*_{n-1}, \ldots, u^*_1$ form an arithmetic progression. Using n=4 as an example, the diagonal elements $u_1, u_2, \ldots, u_n$ and the diagonal elements $u^*_n, u^*_{n-1}, \ldots, u^*_1$ may be respectively shown in the formula (13) to the formula (16).

Using n=4 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (13a) to the formula (16a).

Using n=4 as an example, the diagonal elements of the diagonal matrices in the formula (63) used in this embodiment may be respectively shown in the formula (17) to the formula (20).

In this embodiment, in the matrix D, the phases of the diagonal elements $u_1, u_2, \ldots, u_n$ form an arithmetic progression, and the phases of the diagonal elements $u^*_n, u^*_{n-1}, \ldots, u^*_1$ form an arithmetic progression, which may match with an array structure of an antenna port, for example, a common uniform linear array or cross polarization array, where in the former array, array elements or antennas are arranged at a same spacing, and in the latter array, co-polarized antennas or array elements are arranged at a same spacing. Therefore, the phases in the arithmetic progression can improve precoding performance by using a property of the foregoing array structure.

Optionally, as another embodiment, the column vector v of the matrix V may be a column vector of a matrix $[H^T H^T]^T$, where a matrix H is a Hadamard matrix. Using n=4 as an example, the Hadamard matrix and the column vector v may be respectively shown in the formula (21) to the formula (24).

In this embodiment, the column vector v is a column vector of the matrix $[H^T H^T]^T$, and satisfies the property of the formula (60), and column vectors of the $[H^T H^T]^T$ are orthogonal to each other, so that the obtained column vectors are orthogonal to each other, thereby reducing inter-layer interference that is generated when the precoding matrix is used for MIMO transmission.

In the foregoing embodiment of the present invention, the matrix $W_2$ is used to select a column vector of the matrix $W_1$, or is used to perform weighted combination on a column vector of the $W_1$ to form the matrix W.

Using $W_1$=diag$\{X_1, X_2\}$ as an example, where each of a block matrix $X_1$ and a block matrix $X_2$ has four columns, the $W_2$ may be the matrix shown in the formula (36). Using $W_1$=diag$\{X_1, X_2\}$ as an example, where each of a block matrix $X_1$ and a block matrix $X_2$ has eight columns, the $W_2$ may be the matrix shown in the formula (37) to the formula (40).

Using $W_1$=diag$\{X_1, X_2, X_3, X_4\}$ as an example, where each block matrix of $X_1, X_2, X_3, X_4$ has four columns, the $W_2$ may be the matrix shown in the formula (41). Further, the block matrix is $X_1=X_2, X_3=X_4$ or $X_1=X_2=X_3=X_4$.

Using $W_1$=diag$\{X_1, X_2, X_3, X_4\}$ as an example, where each block matrix of $X_1, X_2, X_3, X_4$ has eight columns, the $W_2$ may be the matrix shown in the formula (42) to the formula (45). Further, the block matrix is $X_1=X_2, X_3=X_4$ or $X_1=X_2=X_3=X_4$.

In the foregoing embodiment of the present invention, the selecting, by the user equipment, a precoding matrix from a codebook according to the reference signal may be specifically: obtaining, by the user equipment based on the reference signal, channel estimation; and selecting, based on a predefined criterion according to the channel estimation, the precoding matrix from the codebook, where the foregoing predefined criterion may be a channel capacity maximization criterion, a throughput maximization criterion, or a cosine distance minimization criterion.

In addition, in the foregoing embodiment of the present invention, the selecting a precoding matrix from a codebook according to the reference signal may include:

selecting the precoding matrix from a codebook subset according to the reference signal, where the foregoing codebook subset is a predefined codebook subset, or a codebook subset reported to the base station, or a codebook subset reported to the base station, and returned and confirmed by the base station. In this embodiment, codebook subsets are set, for different application scenarios, in the codebook; and therefore, selecting a precoding matrix based on a codebook subset can effectively reduce feedback overheads and the implementation complexity.

Specifically, the codebook subset in the foregoing embodiment of the present invention may include:

a set of a precoding matrix $W=W_1W_2$, where $W_1$=diag$\{X_1, \ldots, X_{N_B}\}$, at least one block matrix is $X=A \otimes B$ and $X\in\{X_1, X_2, \ldots, X_{N_B}\}$, where A=DV or B=DV, and the matrix D, the matrix V, or the matrix $W_2$ is a subset of a candidate matrix thereof.

It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

It should be understood that the precoding matrix in the codebook or the codebook subset may be pre-stored in the user equipment and the base station, or may be calculated by the user equipment and the base station according to the structure of the foregoing precoding matrix, which is not limited in the present invention.

Further, in the foregoing precoding matrix, a block matrix $X_k$ and a block matrix $X_l$, k≠l may be different, or may be the same. In a case in which there are multiple $X_k$ s that are the same as the $X_l$, k≠l, for example, the $X_k$ and the $X_l$, k≠l that are the same exist in pairs, feedback overheads can be further reduced. Multiple block matrices $X_l$ in the foregoing matrix $W_1$ may respectively correspond to antenna port groups having different polarizations or at different positions, so that the foregoing precoding matrix matches with multiple antenna deployments or configurations.

In step 703 shown in the foregoing FIG. 7, the precoding matrix indicator sent to the base station may include one or more indexes. Specifically, the codebook or the codebook subset usually is a set of one or more precoding matrices, where one precoding matrix indicator corresponds to one precoding matrix Different precoding matrix indicators correspond to different precoding matrices in the codebook or the codebook subset, and in this embodiment, the sent precoding matrix indicator corresponds to the selected precoding matrix.

Specifically, the foregoing precoding matrix indicator PMI may include only one index, that is, one index directly indicates one precoding matrix, or the foregoing precoding matrix indicator may include two indexes, namely a first index PMI1 and a second index PMI2, where the first index PMI1 and the second index PMI2 jointly indicate the precoding matrix. In addition, the first index PMI1 is used for indicating the matrix $W_1$, and the second index PMI2 is used for indicating the matrix $W_2$. The foregoing first index PMI1 and second index PMI2 may have different time-domain granularities or frequency-domain granularities, that is, the PMI1 and the PMI2 separately represent channel characteristics of different periods or bandwidths, or are obtained based on different subframe periods or subbands.

Optionally, the foregoing PMI may also include three indexes, where the three indexes are respectively used for indicating the matrix D, the matrix V, and the matrix $W_2$.

Optionally, as another embodiment, the user equipment sends the first index PMI1 and the second index PMI2 to the base station by using different time periods, for example, the PMI1 may have a longer subframe period than the PMI2.

In addition, in step 703 in the foregoing embodiment of the present invention, the precoding matrix indicator information PMI may be sent to the base station by using a PUCCH or a PUSCH.

The precoding matrix W in this embodiment may be a precoding matrix obtained by means of row or column transposition, for example, different antenna numbers correspondingly cause row transposition of the precoding matrix. In addition, the structure of the foregoing precoding matrix W not only may be used for antenna configuration in a horizontal direction in an AAS base station, but also may be used for antenna configuration in a perpendicular direction.

In this embodiment of the present invention, user equipment selects, based on a reference signal, a precoding matrix from a codebook, and sends a precoding matrix indicator PMI, where the PMI corresponds to the selected precoding matrix. A precoding matrix W included in the codebook is a product of a matrix $W_1$ and a matrix $W_2$, where the $W_1$ is a block diagonal matrix, $W_1 = \text{diag}\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$; and the matrix A or the matrix B is a product of a matrix D and a matrix V. The D is a diagonal matrix and satisfies $D = \alpha \cdot \text{diag}\{u_1, u_2, \ldots, u_n, u^*_n, u^*_{n-1}, \ldots, u^*_1\}$, where $u_1, u_2, \ldots, u_n, u^*_n, u^*_{n-1}, \ldots, u^*_1$ forms a conjugate and symmetric sequence, which avoids constant modulus restrictions or a limit that antennas perform transmission by using equal powers, and can effectively control a beam shape and a beam orientation. The matrix V includes a column vector 1 and at least one column vector $v = [v_1 v_2 \ldots v_n \bar{v}_n \bar{v}_{n-1} \ldots \bar{v}_1]^T$, so that column vectors of the precoding matrix are orthogonal to each other, which can effectively reduce inter-layer interference, thereby greatly improving performance of MIMO, especially MU-MIMO. Multiple block matrices $X_i$ may respectively correspond to antenna port groups having different polarizations or at different positions, so that the foregoing precoding matrix matches with multiple antenna deployments or configurations. Meanwhile, the matrix A or the matrix B may separately quantize a beam in a horizontal direction and a perpendicular direction. Therefore, the foregoing method for determining a precoding matrix can fully use a degree of freedom of controlling a beam shape and a beam orientation in horizontal and perpendicular directions of an active antenna system, and meanwhile reduce inter-layer interference during transmission as much as possible, thereby improving precision of CSI feedback, and a system throughput.

Figure 8:
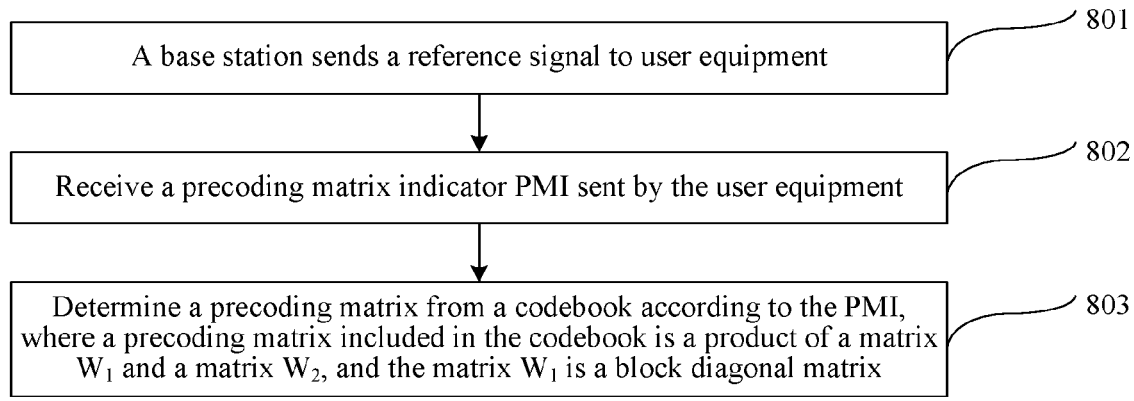
FIG. 8 is a sixth schematic flowchart of a specific embodiment of the present invention.

Corresponding to the embodiment shown in FIG. 7, the present invention further provides a method executed on a base station side. FIG. 8 is a sixth schematic flowchart of a specific embodiment of the present invention. As shown in FIG. 8, the embodiment includes the following steps:

Step 801: A base station sends a reference signal to user equipment.

Specifically, for a manner in which the base station sends the reference signal, reference may be made to step 701 shown in FIG. 7.

Step 802: Receive a precoding matrix indicator PMI sent by the user equipment.

Specifically, the precoding matrix indicator PMI corresponds to a precoding matrix that is selected from a codebook by the user equipment based on the reference signal.

Step 803: Determine a precoding matrix from a codebook according to the PMI, where a precoding matrix W included in the codebook is a product of a matrix $W_1$ and a matrix $W_2$, where $$W = W_1 W_2 \quad (64)$$

The matrix $W_1$ is a block diagonal matrix, $$W_1 = \text{diag}\{X_1, \ldots, X_{N_B}\}, N_B \geq 1 \quad (65)$$

where at least one block matrix X is a Kronecker product of a matrix A and a matrix B, and $X \in \{X_1, X_2, \ldots, X_{N_B}\}$, that is, the block matrix X has the structure shown in the formula (66):

$$X = A \otimes B \quad (66)$$

where the matrix A or the matrix B is a product of a matrix D and a matrix V, $$A = DV \quad (67)$$

or, $$B = DV \quad (68)$$

where the matrix D is a diagonal matrix, and satisfies:

$$D = \alpha \cdot \text{diag}\{u_1, u_2, \ldots, u_n, u^*_n, u^*_{n-1}, \ldots, u^*_1\} \quad (69)$$

where $\alpha$ is a complex factor, a complex number $u^*_i$ is a conjugate complex number of a complex number $u_i$, and $i = 1, \ldots, n$; and the matrix V includes a column vector 1 and at least one column vector v, where the column vector 1 is a column vector whose elements are all 1, and the column vector v is:

$$v = [v_1 v_2 \ldots v_n \bar{v}_n \bar{v}_{n-1} \ldots \bar{v}_1]^T \quad (70)$$

where an element is $\bar{v}_i = -v_i$, $i = 1, \ldots, n$, and $v_i = \pm 1$, that is, a value of $v_i$ is +1 or −1. The matrix $W_2$ used to select one or more column vectors of the matrix $W_1$, or is used to perform weighted combination on one or more column vectors of the $W_1$ to obtain the precoding matrix W.

In another optional implementation manner of this embodiment, the matrix A or the matrix B may be multiple different matrices, including a matrix $P_i$ and a matrix $P_j$, where the $P_i$ and the $P_j$ satisfy the formula (71):

$$P_i = D(i,j) P_j \quad (71)$$

where the matrix $D(i,j)$ is a diagonal matrix, and has the structure shown in the formula (5); and optionally, phases of diagonal elements $\mu_1, \mu_2, \ldots, \mu_n$ of the matrix $D(i,j)$ form an arithmetic progression.

Optionally, the matrix A or the matrix B may be multiple different matrices, including a matrix $P_i$ and a matrix $P_k$, where the $P_i$ and the $P_k$ satisfy the formula (72):

$$D_i^{-1} P_i = D_k^{-1} P_k = V \quad (72)$$

where the matrix V includes a column vector 1 and/or at least one column vector v, the column vector 1 is a column vector whose elements are all 1, and the column vector v has the structure shown in the formula (60); and the matrix $D_i$ and the matrix $D_k$ both are diagonal matrices, and have the structure shown in the formula (73):

$$D_m = \alpha_m \cdot \text{diag}\{u_{m,1}, u_{m,2}, \ldots, u_{m,n}, u^*_{m,n}, u^*_{m,n-1}, \ldots, u^*_{m,1}\}, m=i,k \quad (73)$$

where $\alpha_m$ is a complex factor, and a real part or an imaginary part of the complex factor may be 0; a complex number $u^*_{m,l}$ is a conjugate complex number of a complex number $u_{m,l}$, m=i, k, l=1, . . . , n, and n is determined by a quantity of antenna ports; and optionally, phases of diagonal elements $u_{m,1}$, $u_{m,2}$, . . . , $u_{m,n}$ of the matrix $D_m$ form an arithmetic progression.

It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

In the foregoing embodiment of the present invention, a base station receives a precoding matrix indicator PMI sent by user equipment, and determines a precoding matrix from a codebook according to the PMI. A precoding matrix W included in the codebook is a product of a matrix $W_1$ and a matrix $W_2$, where the matrix $W_1$ is a block diagonal matrix, $W_1 = \text{diag}\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$; and the matrix A or the matrix B is a product of a matrix D and a matrix V, where A=DV or B=DV. The D is a diagonal matrix and satisfies $D = \alpha \cdot \text{diag}\{u_1, u_2, \ldots, u_n, u^*_n, u^*_{n-1}, \ldots, u^*_1\}$, where $u_1, u_2, \ldots, u_n, u^*_n, u^*_{n-1}, \ldots, u^*_1$ forms a conjugate and symmetric sequence, which avoids constant modulus restrictions or a limit that antennas perform transmission by using equal powers, and can effectively control a beam shape and a beam orientation. The matrix V includes a column vector 1 and at least one column vector $v = [v_1 \, v_2 \, \ldots \, v_n \, \overline{v}_n \, \overline{v}_{n-1} \, \ldots \, \overline{v}_1]^T$, so that column vectors of the precoding matrix are orthogonal to each other, which can effectively reduce inter-layer interference, thereby greatly improving performance of MIMO, especially MU-MIMO. Therefore, the foregoing method for determining a precoding matrix can fully use a degree of freedom of controlling a beam shape and a beam orientation in horizontal and perpendicular directions of an active antenna system, and meanwhile reduce inter-layer interference during transmission as much as possible, thereby improving precision of CSI feedback, and a system throughput.

Specifically, the base station may obtain the precoding matrix from the codebook according to the received PMI, where the codebook is the same as the codebook used by the user equipment. Further, the base station may further precode to-be-sent data according to the obtained precoding matrix.

Specifically, when the matrix A is the matrix having the structure shown in the formula (67), the matrix B may be the matrix having the structure shown in the formula (68). The matrix B may also be a DFT matrix, a Householder matrix, a Hadamard matrix, or a precoding matrix in a two-antenna codebook, a four-antenna codebook, or an eight-antenna codebook in an LTE R10 system.

Specifically, when the matrix B is the matrix having the structure shown in the formula (68), the matrix A may be the matrix having the structure shown in the formula (67). The matrix A may also be a DFT matrix, a Householder matrix, a Hadamard matrix, or a precoding matrix in a two-antenna codebook, a four-antenna codebook, or an eight-antenna codebook in an LTE R10 system.

Specifically, using n=5 as an example, the foregoing diagonal elements $u_1, u_2, \ldots, u_n$, diagonal elements $u^*_n$, $u^*_{n-1}, \ldots, u^*_1$ and column vector v may be respectively shown in the formula (8) to the formula (12).

Using n=5 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (8a) to the formula (11a).

Optionally, as another embodiment, in the matrix D, phases of the diagonal elements $u_1, u_2, \ldots, u_n$ form an arithmetic progression, and phases of the diagonal elements $u^*_n, u^*_{n-1}, \ldots, u^*_1$ form an arithmetic progression.

Using n=4 as an example, the diagonal elements $u_1, u_2, \ldots, u_n$ and the diagonal elements $u^*_n, u^*_{n-1}, \ldots, u^*_1$ may be respectively shown in the formula (13) to the formula (16).

Using n=4 as an example, the diagonal elements $\mu_1, \mu_2, \ldots, \mu_n$ and the diagonal elements $\mu^*_n, \mu^*_{n-1}, \ldots, \mu^*_1$ in the formula (5) used in this embodiment may be respectively shown in the formula (13a) to the formula (16a).

Using n=4 as an example, the diagonal elements of the diagonal matrices in the formula (73) used in this embodiment may be respectively shown in the formula (17) to the formula (20).

In this embodiment, in the matrix D, the phases of the diagonal elements $u_1, u_2, \ldots, u_n$ form an arithmetic progression, and the phases of the diagonal elements $u^*_n$, $u^*_{n-1}, \ldots, u^*_1$ form an arithmetic progression, which may match with an array structure of an antenna port, for example, a common uniform linear array or cross polarization array, where in the former array, array elements or antennas are arranged at a same spacing, and in the latter array, co-polarized antennas or array elements are arranged at a same spacing. Therefore, the phases in the arithmetic progression can improve precoding performance by using a property of the foregoing array structure.

Optionally, as another embodiment, the column vector v of the matrix V may be a column vector of a matrix $[H^T \, H^T]^T$, where a matrix H is a Hadamard matrix. Using n=4 as an example, the Hadamard matrix and the column vector v may be respectively shown in the formula (21) to the formula (24).

In this embodiment, the column vector v is a column vector of the matrix $[H^T \, H^T]^T$, and satisfies the property of the formula (70), and column vectors of the $[H^T \, H^T]^T$ are orthogonal to each other, so that the obtained column vectors are orthogonal to each other, thereby reducing inter-layer interference that is generated when the precoding matrix is used for MIMO transmission.

In the foregoing embodiment of the present invention, the matrix $W_2$ is used to select a column vector of the matrix $W_1$, or is used to perform weighted combination on a column vector of the $W_1$ to form the matrix W. Using $W_1 = \text{diag}\{X_1, X_2\}$ as an example, where each of a block matrix $X_1$ and a block matrix $X_2$ has four columns, the $W_2$ may be the matrix shown in the formula (36). Using $W_1 \, \text{diag}\{X_1, X_2\}$ as an example, where each of a block matrix $X_1$ and a block matrix $X_2$ has eight columns, the $W_2$ may be the matrix shown in the formula (37) to the formula (40).

Using $W_1 = \text{diag}\{X_1, X_2, X_3, X_4\}$ as an example, where each block matrix of $X_1, X_2, X_3, X_4$ has four columns, the $W_2$ may be the matrix shown in the formula (41). Further, the block matrix is $X_1 = X_2$, $X_3 = X_4$ or $X_1 = X_2 = X_3 = X_4$.

Using $W_1=\text{diag}\{X_1, X_2, X_3, X_4\}$ as an example, where each block matrix of $X_1$, $X_2$, $X_3$, $X_4$ has eight columns, the $W_2$ may be the matrix shown in the formula (42) to the formula (45). Further, the block matrix is $X_1=X_2$, $X_3=X_4$ or $X_1=X_2=X_3=X_4$.

In the foregoing embodiment of the present invention, the determining a precoding matrix from a codebook according to the PMI includes:

determining the precoding matrix from the codebook according to the PMI, where the foregoing codebook subset is a predefined codebook subset, or a codebook subset reported to the base station, or a codebook subset reported to the base station, and returned and confirmed by the base station. In this embodiment, codebook subsets are set, for different application scenarios, in the codebook; and therefore, selecting a precoding matrix based on a codebook subset can effectively reduce feedback overheads and the implementation complexity.

Specifically, the codebook subset in the foregoing embodiment of the present invention may include:

a set of a precoding matrix $W=W_1 W_2$, where $W_i=\text{diag}\{X_1, \ldots, X_{N_B}\}$ at least one block matrix is $X=A \otimes B$ and $X \in \{X_1, X_2, \ldots, X_{N_B}\}$, where $A=DV$ or $B=DV$, and the matrix D, the matrix V, or the matrix $W_2$ is a subset of a candidate matrix thereof It should be pointed out that diagonal elements of the foregoing diagonal matrix may have same amplitude. In this case, the structure of the foregoing precoding matrix allows that transmit antennas corresponding to rows of the precoding matrix have symmetric transmit powers based on actual considerations, and in this case, the foregoing codebook can still control a beam orientation by using a symmetric property of the powers of the transmit antennas, and meanwhile ensure orthogonality between transmission layers.

It should be understood that the precoding matrix in the codebook or the codebook subset may be pre-stored in the user equipment and the base station, or may be calculated by the user equipment and the base station according to the structure of the foregoing precoding matrix, which is not limited in the present invention.

In addition, the precoding matrix indicator sent to the base station may include one or more indexes. Specifically, the codebook or the codebook subset usually is a set of one or more precoding matrices, where one precoding matrix indicator corresponds to one precoding matrix. Different precoding matrix indicators correspond to different precoding matrices in the codebook or the codebook subset, and in this embodiment, the sent precoding matrix indicator corresponds to the selected precoding matrix.

Specifically, the foregoing precoding matrix indicator PMI may include only one index, that is, one index directly indicates one precoding matrix, or the foregoing precoding matrix indicator may include two indexes, namely a first index PMI1 and a second index PMI2, where the first index PMI1 and the second index PMI2 jointly indicate the precoding matrix. In addition, the first index PMI1 is used for indicating the matrix $W_1$, and the second index PMI2 is used for indicating the matrix $W_2$. The foregoing first index PMI1 and second index PMI2 may have different time-domain granularities or frequency-domain granularities, that is, the PMI1 and the PMI2 separately represent channel characteristics of different periods or bandwidths, or are obtained based on different subframe periods or subbands.

Optionally, the foregoing PMI may also include three indexes, where the three indexes are respectively used for indicating the matrix D, the matrix V, and the matrix $W_2$.

Optionally, as another embodiment, the base station receives, by using different time periods, the first index PMI1 and the second index PMI2 that are sent by the user equipment, for example, the PMI1 may have a longer subframe period than the PMI2.

Specifically, the foregoing base station may receive, by using a PUCCH or a PUSCH, the precoding matrix indicator PMI sent by the user equipment UE.

The precoding matrix W in this embodiment of the present invention may be a precoding matrix obtained by means of row or column transposition, for example, different antenna numbers correspondingly cause row transposition of the precoding matrix.

In the foregoing embodiment of the present invention, a base station sends a reference signal and receives a precoding matrix indicator PMI sent by user equipment, where the PMI corresponds to a precoding matrix that is selected from a codebook by the user equipment based on the reference signal. A precoding matrix W included in the codebook is a product of a matrix $W_1$ and a matrix $W_2$, where the $W_1$ is a block diagonal matrix, $W_1=\text{diag}\{X_1, \ldots, X_{N_B}\}$, and $N_B \geq 1$, where at least one block matrix X is a Kronecker product of a matrix A and a matrix B, $X=A \otimes B$, and $X \in \{X_1, X_2, \ldots, X_{N_B}\}$; and the matrix A or the matrix B is a product of a matrix D and a matrix V. The D is a diagonal matrix and satisfies $D=\alpha \cdot \text{diag}\{u_1, u_2, \ldots, u_n, u^*_n, u^*_{n-1}, \ldots, u^*_1\}$, where $u_1, u_2, \ldots, u_n, u^*_n, u^*_{n-1}, \ldots, u^*_1$ forms a conjugate and symmetric sequence, which avoids constant modulus restrictions, and can effectively control a beam shape and a beam orientation. The matrix V includes a column vector 1 and at least one column vector $v=[v_1 \ v_2 \ \ldots \ v_n \ \bar{v}_n \ \bar{v}_{n-1} \ \ldots \ \bar{v}_1]^T$, so that column vectors of the precoding matrix are orthogonal to each other, which can effectively reduce inter-layer interference, thereby greatly improving performance of MIMO, especially MU-MIMO. Therefore, the foregoing method for determining a precoding matrix can fully use a degree of freedom of controlling a beam shape and a beam orientation in horizontal and perpendicular directions of an active antenna system, and meanwhile reduce inter-layer interference during transmission as much as possible, thereby improving precision of CSI feedback, and a system throughput.

Figure 9:
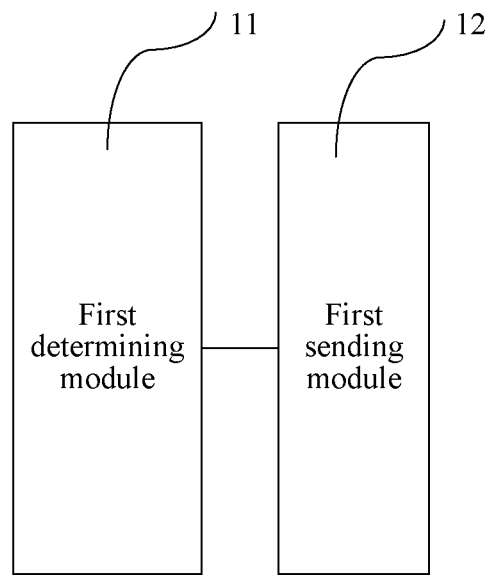
FIG. 9 is a first schematic structural diagram of an apparatus for determining a precoding matrix indicator according to an embodiment of the present invention.

FIG. 9 is a first schematic structural diagram of an apparatus for determining a precoding matrix indicator according to an embodiment of the present invention. As shown in FIG. 9, the apparatus includes a first determining module 11 and a first sending module 12. The first determining module is configured to determine a precoding matrix indicator PMI, where the PMI corresponds to a precoding matrix W, and the precoding matrix W satisfies a first condition, a second condition, or a third condition; and the first sending module is configured to send the PMI to a base station, where the first condition is that the precoding matrix W satisfies $W=DV$, where the matrix D is a diagonal matrix, $D=\alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix;

the second condition is that the precoding matrix W includes one or more column vectors of a block diagonal matrix $W_1$, or the precoding matrix W is obtained by performing weighted combination on one or more column vectors of a block diagonal matrix $W_1$, where $W_1=\text{diag}\{X_1, \ldots, X_{N_B}\}$, and $N_B \geq 1$, where at least one block matrix X is a product $X=DV$ of a matrix D and a matrix V, and $X \in \{X_1, X_2, \ldots, X_{N_B}\}$; the matrix D is a diagonal matrix, $D = \alpha \cdot \mathrm{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1 = \mathrm{diag}\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$; the matrix A or the matrix B is a product of a matrix D and a matrix V; the matrix D is a diagonal matrix, $D = \alpha \cdot \mathrm{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, $i = 1, \ldots, n$, and n is a quantity of rows of the matrix A or the matrix B; and the matrix V is a constant modulus matrix.

In the second condition or the third condition, the precoding matrix W satisfies $W = W_1 W_2$, where the matrix $W_2$ is used to select one or more column vectors of the matrix $W_1$; or is used to perform weighted combination on one or more column vectors of the $W_1$ to obtain the precoding matrix W.

Phases of diagonal elements $u_1, u_2, \ldots, u_n$ of the foregoing matrix D form an arithmetic progression.

The foregoing matrix V includes a column vector 1 and/or at least one column vector v, the column vector 1 is a column vector whose elements are all 1, and the column vector v is $v = [v_1 \ v_2 \ldots v_n \ \bar{v}_n \ \bar{v}_{n-1} \ldots \bar{v}_1]^T$, where an element is $\bar{v}_i = -v_i$, $v_i = \pm 1$, and $i = 1, \ldots, n$. The matrix V includes only the column vector 1 and the at least one column vector v, and when the matrix V includes multiple column vectors v, the multiple column vectors v are different. Optionally, the column vector v of the matrix V is a column vector of a matrix $[H^T \ H^T]^T$, where a matrix H is a Hadamard matrix.

In addition, the foregoing PMI includes a first index PMI1 and a second index PMI2, where when the precoding matrix W satisfies the first condition, the first index PMI1 corresponds to the matrix D, and the second index PMI2 corresponds to the matrix V;

when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

Further, the foregoing first index PMI1 and second index PMI2 have different time-domain granularities or frequency-domain granularities; or the first index PMI1 and the second index PMI2 are sent to the base station by using different time periods.

In the foregoing embodiment of the present invention, the foregoing apparatus further includes:

a first receiving module, configured to receive a reference signal sent by the base station, and select, from a codebook according to the reference signal, the precoding matrix W corresponding to the PMI.

The codebook includes a precoding matrix $W_i$ and a precoding matrix $W_j$, and the two precoding matrices satisfy $W_i = D(i,j) W_j$, where $D(i,j) = \alpha_{(i,j)} \mathrm{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, $m = 1, \ldots, n$, and n is determined by a quantity of antenna ports. Optionally, phases of diagonal elements $\mu_1, \mu_2, \ldots, \mu_n$ of the foregoing matrix $D(i,j)$ form an arithmetic progression.

Alternatively, the foregoing codebook includes a precoding matrix $W_i$ and a precoding matrix $W_k$, and the two precoding matrices satisfy $D_i^{-1} W_i = D_k^{-1} W_k = V$, where $D_m = \alpha_m \cdot \mathrm{diag}\{u_{m,1}, u_{m,2}, \ldots, u_{m,n}, u^*_{m,n}, u^*_{m,n-1}, \ldots, u^*_{m,1}\}$, $m = i, k$, $\alpha_m$ is a complex factor, a complex number $u^*_{m,l}$ is a conjugate complex number of a complex number $u_{m,l}$, $m = i, k$, $l = 1, \ldots, n$, and n is determined by a quantity of antenna ports.

Optionally, phases of diagonal elements $u_{m,1}, u_{m,2}, \ldots, u_{m,n}$ of the matrix $D_m$ form an arithmetic progression.

Figure 10:
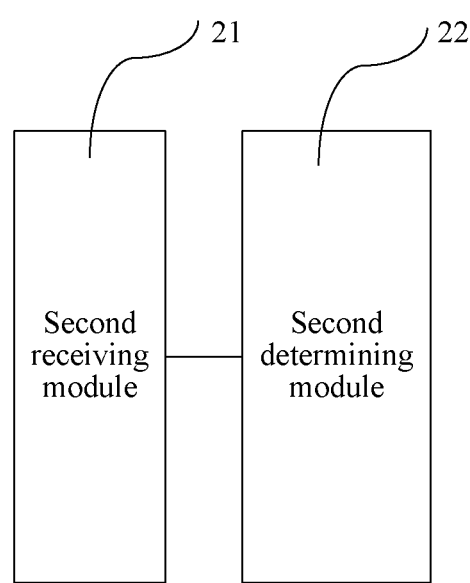
FIG. 10 is a second schematic structural diagram of an apparatus for determining a precoding matrix indicator according to an embodiment of the present invention.

FIG. 10 is a second schematic structural diagram of an apparatus for determining a precoding matrix indicator according to an embodiment of the present invention. As shown in FIG. 10, the apparatus includes a second receiving module 21 and a second determining module 22. The second receiving module 21 is configured to receive a precoding matrix indicator PMI sent by user equipment; and the second determining module 22 is configured to determine a corresponding precoding matrix W according to the PMI, where the precoding matrix W satisfies a first condition, a second condition, or a third condition, where the first condition is that the precoding matrix W satisfies $W = DV$; the second condition is that the precoding matrix W includes one or more column vectors of a block diagonal matrix $W_1$, or the precoding matrix W is obtained by performing weighted combination on one or more column vectors of a block diagonal matrix $W_1$, where $W_1 = \mathrm{diag}\{X_1, \ldots, X_{N_B}\}$ and $N_B \geq 1$, where at least one block matrix X is a product $X = DV$ of a matrix D and a matrix V, and $X \in \{X_1, X_2, \ldots, X_{N_B}\}$; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1 = \mathrm{diag}\{X_1, \ldots, X_{N_B}\}$, and $N_B \geq 1$, where at least one block matrix X is a Kronecker product of a matrix A and a matrix B, $X = A \otimes B$, and $X \in \{X_1, X_2, \ldots, X_{N_B}\}$; the matrix A or the matrix B is a product of a matrix D and a matrix V; the matrix D is a diagonal matrix, $i = 1, \ldots, n$, and n is a quantity of rows of the matrix A or the matrix B, where the matrix D is a diagonal matrix, $D = \alpha \cdot \mathrm{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix.

In the foregoing embodiment of the present invention, in the second condition or the third condition, the precoding matrix W satisfies $W = W_1 W_2$, where the matrix $W_2$ is used to select one or more column vectors of the matrix $W_1$; or is used to perform weighted combination on one or more column vectors of the $W_1$ to obtain the precoding matrix W.

Optionally, phases of diagonal elements $u_1, u_2, \ldots, u_n$ of the foregoing matrix D form an arithmetic progression.

Further, the matrix V includes a column vector 1 and/or at least one column vector v, the column vector 1 is a column vector whose elements are all 1, and the column vector v is $v = [v_1 \ v_2 \ldots v_n \ \bar{v}_n \ \bar{v}_{n-1} \ldots \bar{v}_1]^T$, where an element is $\bar{v}_i = -v_i$, $v_i = \pm 1$, and $i = 1, \ldots, n$. Optionally, the matrix V includes only the column vector 1 and the at least one column vector v, and when the matrix V includes multiple column vectors v, the multiple column vectors v are different.

In addition, the column vector v of the foregoing matrix V is a column vector of a matrix $[H^T \, H^T]^T$, where a matrix H is a Hadamard matrix.

In the foregoing embodiment of the present invention, the precoding matrix indicator PMI includes a first index PMI1 and a second index PMI2, where when the precoding matrix W satisfies the first condition, the first index PMI1 corresponds to the matrix D, and the second index PMI2 corresponds to the matrix V;

when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

Optionally, the first index PMI1 and the second index PMI2 have different time-domain granularities or frequency-domain granularities; or the first index PMI1 and the second index PMI2 are sent to the base station by using different time periods.

In addition, the foregoing determining a corresponding precoding matrix W according to the PMI includes:

selecting the corresponding precoding matrix W from a codebook according to the PMI.

Specifically, the foregoing codebook includes a precoding matrix $W_i$ and a precoding matrix $W_j$, and the two precoding matrices satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n, and n is determined by a quantity of antenna ports.

Phases of diagonal elements $\mu_1, \mu_2, \ldots, \mu_n$ of the matrix $D(i,j)$ form an arithmetic progression.

Alternatively, the foregoing codebook includes a precoding matrix $W_i$ and a precoding matrix $W_k$, and the two precoding matrices satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, $\alpha_m$ is a complex factor, a complex number $u^*_{m,l}$ is a conjugate complex number of a complex number $u_{m,l}$, m=i,k l=1, . . . , n, and n is determined by a quantity of antenna ports.

Phases of diagonal elements $u_{m,1}, u_{m,2}, \ldots, u_{m,n}$ of the foregoing matrix $D_m$ form an arithmetic progression.

Figure 11:
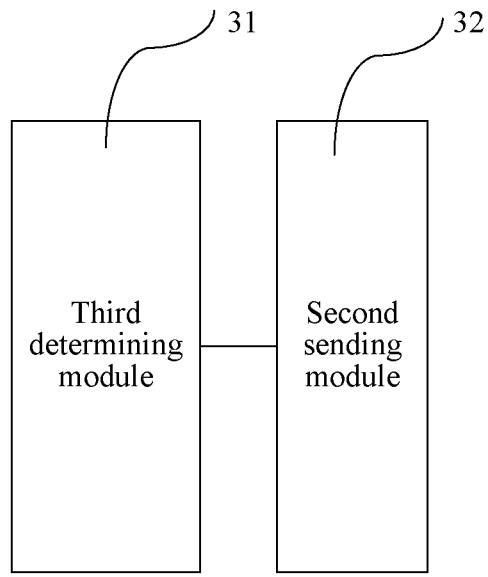
FIG. 11 is a third schematic structural diagram of an apparatus for determining a precoding matrix indicator according to an embodiment of the present invention.

FIG. 11 is a third schematic structural diagram of an apparatus for determining a precoding matrix indicator according to an embodiment of the present invention. As shown in FIG. 11, the apparatus includes a third determining module 31 and a second sending module 32. The third determining module 31 is configured to determine a first precoding matrix indicator PMI, where the PMI corresponds to a precoding matrix $W_i$ in a codebook; and the second sending module 32 is configured to send the first PMI to a base station, where the codebook includes at least: the precoding matrix $W_i$ and a precoding matrix $W_j$, and the precoding matrix $W_i$ and the precoding matrix $W_j$ in the codebook satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n, and n is determined by a quantity of antenna ports.

Optionally, phases of diagonal elements $\mu_1, \mu_2, \ldots, \mu_n$ of the foregoing matrix $D(i,j)$ form an arithmetic progression.

Figure 12:
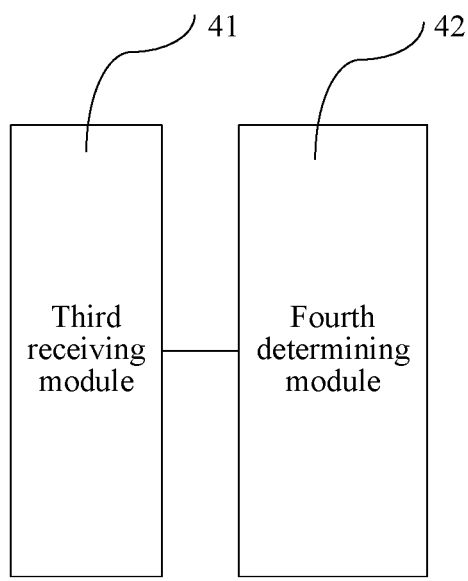
FIG. 12 is a fourth schematic structural diagram of an apparatus for determining a precoding matrix indicator according to an embodiment of the present invention.

FIG. 12 is a fourth schematic structural diagram of an apparatus for determining a precoding matrix indicator according to an embodiment of the present invention. As shown in FIG. 12, the apparatus includes a third receiving module 41 and a fourth determining module 42. The third receiving module 41 is configured to receive a first precoding matrix indicator PMI sent by user equipment; and the fourth determining module 42 is configured to determine a corresponding precoding matrix $W_i$ from a codebook according to the first PMI, where the codebook includes at least: the precoding matrix $W_i$ and a precoding matrix $W_j$, and the precoding matrix $W_i$ and the precoding matrix $W_j$ in the codebook satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, m=1, . . . , n, and n is determined by a quantity of antenna ports.

Optionally, phases of diagonal elements $\mu_1, \mu_2, \ldots, \mu_n$ of the foregoing matrix $D(i,j)$ form an arithmetic progression.

Figure 13:
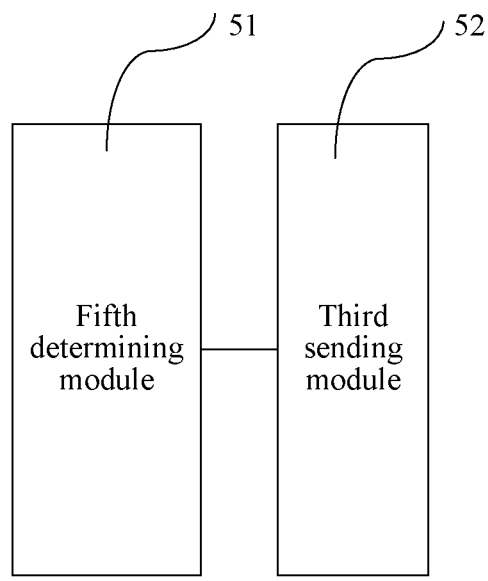
FIG. 13 is a fifth schematic structural diagram of an apparatus for determining a precoding matrix indicator according to an embodiment of the present invention.

FIG. 13 is a fifth schematic structural diagram of an apparatus for determining a precoding matrix indicator according to an embodiment of the present invention. As shown in FIG. 13, the apparatus includes a fifth determining module 51 and a third sending module 52. The fifth determining module 51 is configured to determine a first precoding matrix indicator PMI, where the first PMI corresponds to a precoding matrix $W_i$ in a codebook; and the third sending module 52 is configured to send the first PMI to a base station, where the codebook includes at least: the precoding matrix $W_i$ and a precoding matrix $W_j$, and the precoding matrix $W_i$ and a precoding matrix $W_k$ in the codebook satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, m=i,k, $\alpha_m$ is a complex factor, a complex number $u^*_{m,l}$ is a conjugate complex number of a complex number $u_{m,l}$, m=i,k, l=1, . . . , n, and n is determined by a quantity of antenna ports; and the matrix V is a constant modulus matrix.

Optionally, phases of diagonal elements $u_{m,1}, u_{m,2}, \ldots, u_{m,n}$ of the foregoing matrix $D_m$ form an arithmetic progression.

Figure 14:
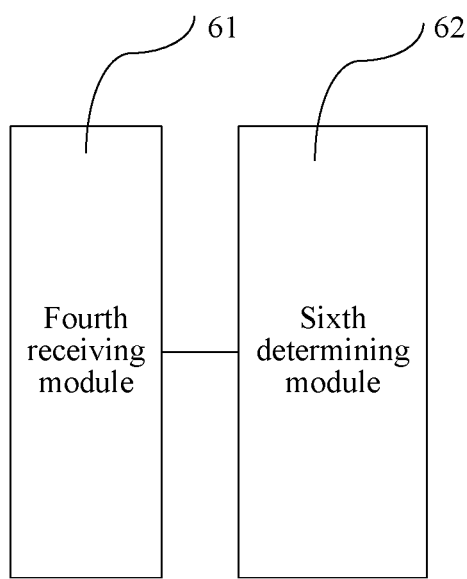
FIG. 14 is a sixth schematic structural diagram of an apparatus for determining a precoding matrix indicator according to an embodiment of the present invention.

FIG. 14 is a sixth schematic structural diagram of an apparatus for determining a precoding matrix indicator according to an embodiment of the present invention.

As shown in FIG. 14, the apparatus includes a fourth receiving module 61 and a sixth determining module 62. The fourth receiving module 61 is configured to receive a first precoding matrix indicator PMI sent by user equipment; and the sixth determining module 62 is configured to determine a corresponding precoding matrix $W_i$ from a codebook according to the first PMI, where the codebook includes at least: the precoding matrix $W_i$ and a precoding matrix $W_j$, and the precoding matrix $W_i$ and a precoding matrix $W_k$ in the codebook satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, m=i,k, $\alpha_m$ is a complex factor, a complex number $u^*_{m,l}$ is a conjugate complex number of a complex number $u_{m,l}$, m=i,k, l=1, . . . , n, and n is determined by a quantity of antenna ports; and the matrix V is a constant modulus matrix.

Optionally, phases of diagonal elements $u_{m,1}, u_{m,2}, \ldots, u_{m,n}$ of the foregoing matrix $D_m$ form an arithmetic progression.

Figure 15:
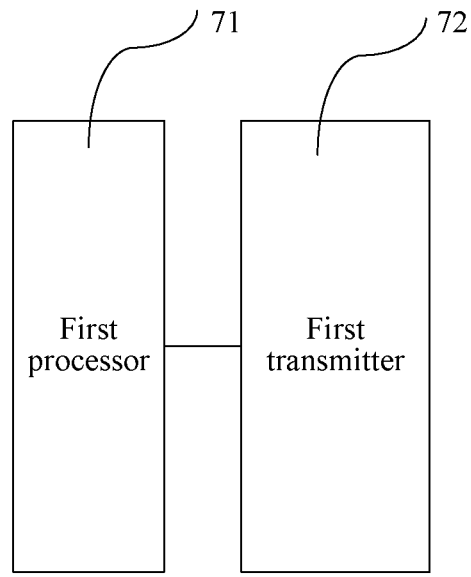
FIG. 15 is a first schematic structural diagram of user equipment according to an embodiment of the present invention.

FIG. 15 is a first schematic structural diagram of user equipment according to an embodiment of the present invention. As shown in FIG. 14, the user equipment includes a first processor 71 and a first transmitter 72. The first processor 71 is configured to determine a precoding matrix indicator PMI, where the PMI corresponds to a precoding matrix W, and the precoding matrix W satisfies a first condition, a second condition, or a third condition; and the first transmitter 72 is configured to send the PMI to a base station, where the first condition is that the precoding matrix W satisfies W=DV, where the matrix D is a diagonal matrix, $D=\alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix; the second condition is that the precoding matrix W includes one or more column vectors of a block diagonal matrix $W_1$, or the precoding matrix W is obtained by performing weighted combination on one or more column vectors of a, block diagonal matrix $W_1$, where $W_1=\text{diag}\{X_1, \ldots, X_{N_B}\}$ and $N_B \geq 1$, where at least one block matrix X is a product X=DV of a matrix D and a matrix V, and $X \in \{X_1, X_2, \ldots, X_{N_B}\}$; the matrix D is a diagonal matrix, $D=\alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1=\text{diag}\{X_1, \ldots, X_{N_B}\}$, and $N_B \geq 1$, where at least one block matrix X is a Kronecker product of a matrix A and a matrix B, $X=A \otimes B$ and $X \in \{X_1, X_2, \ldots, X_{N_B}\}$; the matrix A or the matrix B is a product of a matrix D and a matrix V; the matrix D is a diagonal matrix, $D=\alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, i=1, ..., n, and n is a quantity of rows of the matrix A or the matrix B; and the matrix V is a constant modulus matrix.

In the foregoing embodiment of the present invention, in the second condition or the third condition, the precoding matrix W satisfies $W=W_1W_2$, where the matrix $W_2$ is used to select one or more column vectors of the matrix $W_1$; or is used to perform weighted combination on one or more column vectors of the $W_1$ to obtain the precoding matrix W.

Optionally, phases of diagonal elements $u_1, u_2, \ldots, u_n$ of the foregoing matrix D form an arithmetic progression.

In addition, the matrix V includes a column vector 1 and/or at least one column vector v, the column vector 1 is a column vector whose all elements are all 1, and the column vector v is $v=[v_1 \, v_2 \ldots v_n \, \bar{v}_n \, \bar{v}_{n-1} \ldots \bar{v}_1]^T$, where an element is $\bar{v}_i=-v_i$, $v_i=\pm 1$, and i=1, ..., n. Optionally, the matrix V includes only the column vector 1 and the at least one column vector v, and when the matrix V includes multiple column vectors V, the multiple column vectors v are different. The column vector v of the foregoing matrix V is a column vector of a matrix $[H^T \, H^T]^T$, where a matrix H is a Hadamard matrix.

In the foregoing embodiment of the present invention, the PMI includes a first index PMI1 and a second index PMI2, where when the precoding matrix W satisfies the first condition, the first index PMI1 corresponds to the matrix D, and the second index PMI2 corresponds to the matrix V;

when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

Optionally, the foregoing first index PMI1 and second index PMI2 have different time-domain granularities or frequency-domain granularities; or the first index PMI1 and the second index PMI2 are sent to the base station by using different time periods.

In the foregoing embodiment of the present invention, the user equipment further includes:

a first receiver, configured to receive a reference signal sent by the base station, and select, from a codebook according to the reference signal, the precoding matrix W corresponding to the PMI.

The foregoing codebook includes the precoding matrix $W_i$ and a precoding matrix $W_j$, and the two precoding matrices satisfy $W_i=D(i,j)W_j$, where $D(i,j)=\alpha_{(i,j)}\text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $u^*_m$ is a conjugate complex number of a complex number $\mu_m$, m=1, ..., n, and n is determined by a quantity of antenna ports.

Optionally, phases of diagonal elements $\mu_1, \mu_2, \ldots, \mu_n$ of the matrix D(i,j) form an arithmetic progression.

Alternatively, the foregoing codebook includes the precoding matrix $W_i$ and a precoding matrix $W_k$, and the two precoding matrices satisfy $D_i^{-1}W_i=D_k^{-1}W_k=V$, where $D_m=\alpha_m \cdot \text{diag}\{u_{m,1}, u_{m,2}, \ldots, u_{m,n}, u^*_{m,n}, u^*_{m,n-1}, \ldots, u^*_{m,1}\}$, $\alpha_m$ is a complex factor, a complex number $u^*_{m,l}$ is a conjugate complex number of a complex number $u_{m,l}$, m=i,k, l=1, ..., n, and n is determined by a quantity of antenna ports.

Optionally, phases of diagonal elements $u_{m,1}, u_{m,2}, \ldots, u_{m,n}$ of the foregoing matrix $D_m$ form an arithmetic progression.

Figure 16:
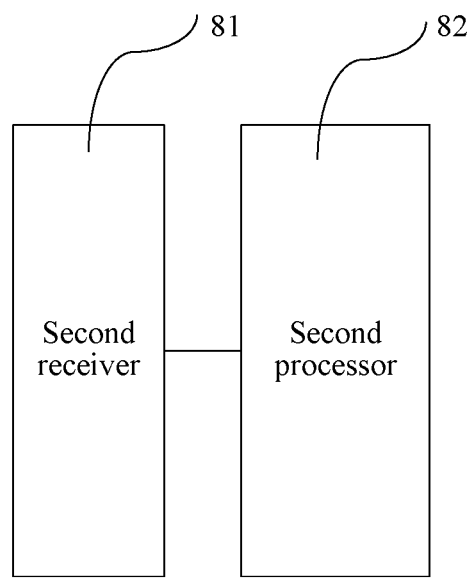
FIG. 16 is a first schematic structural diagram of a base station according to an embodiment of the present invention.

FIG. 16 is a first schematic structural diagram of a base station according to an embodiment of the present invention. As shown in FIG. 16, the base station includes a second receiver 81 and a second processor 82. The second receiver 81 is configured to receive a precoding matrix indicator PMI sent by user equipment; and the second processor 82 is configured to determine a corresponding precoding matrix W according to the PMI, where the precoding matrix W satisfies a first condition, a second condition, or a third condition, where the first condition is that the precoding matrix W satisfies W=DV;

the second condition is that the precoding matrix W includes one or more column vectors of a block diagonal matrix $W_1$, or the precoding matrix W is obtained by performing weighted combination on one or more column vectors of a block diagonal matrix $W_1$, where $W_1=\text{diag}\{X_1, \ldots, X_{N_B}\}$, and $N_B \geq 1$, where at least one block matrix X is a product X=DV of a matrix D and a matrix V, and $X \in \{X_1, X_2, \ldots, X_{N_B}\}$; and the third condition is that the precoding matrix W includes one or more column vectors of a block diagonal matrix $W_1$, or the precoding matrix W is obtained by performing weighted combination on one or more column vectors of a block diagonal matrix $W_1$, where $W_1=\text{diag}\{X_1, \ldots, X_{N_B}\}$, and $N_B \geq 1$, where at least one block matrix X is a Kronecker product of a matrix A and a matrix B, $X=A \otimes B$, and $X \in \{X_1, X_2, \ldots, X_{N_B}\}$; the matrix A or the matrix B is a product of a matrix D and a matrix V; the matrix D is a diagonal matrix, i=1, ..., n, and n is a quantity of rows of the matrix A or the matrix B, where the matrix D is a diagonal matrix, $D=\alpha \cdot \text{diag}\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix.

In the foregoing embodiment of the present invention, in the second condition or the third condition, the precoding matrix W satisfies $W=W_1W_2$, where the matrix $W_2$ is used to select one or more column vectors of the matrix $W_1$; or is used to perform weighted combination on one or more column vectors of the $W_1$ to obtain the precoding matrix W.

Optionally, phases of diagonal elements $u_1, u_2, \ldots, u_n$ of the matrix D form an arithmetic progression.

In the foregoing embodiment of the present invention, the matrix V includes a column vector 1 and/or at least one column vector v, the column vector 1 is a column vector whose elements are all 1, and the column vector v is $v=[v_1\ v_2 \ldots v_n\ \bar{v}_n\ \bar{v}_{n-1} \ldots \bar{v}_1]^T$, where an element is $\bar{v}_i = -v_i$, $v_i = \pm 1$, and $i=1, \ldots, n$. Optionally, the matrix V includes only the column vector 1 and the at least one column vector v, and when the matrix V includes multiple column vectors v, the multiple column vectors v are different. In addition, the column vector v of the foregoing matrix V is a column vector of a matrix $[H^T\ H^T]^T$, where a matrix H is a Hadamard matrix.

In the foregoing embodiment of the present invention, the precoding matrix indicator PMI includes a first index PMI1 and a second index PMI2, where when the precoding matrix W satisfies the first condition, the first index PMI1 corresponds to the matrix D, and the second index PMI2 corresponds to the matrix V; when the precoding matrix W satisfies the second condition, the first index PMI1 corresponds to the matrix $W_1$, and the second index PMI2 corresponds to the matrix $W_2$; or when the precoding matrix W satisfies the third condition, the first index PMI1 corresponds to the matrix $W_1$, and the second index PMI2 corresponds to the matrix $W_2$.

Optionally, the first index PMI1 and the second index PMI2 have different time-domain granularities or frequency-domain granularities; or the first index PMI1 and the second index PMI2 are sent to the base station by using different time periods.

In the foregoing embodiment of the present invention, the determining a corresponding precoding matrix W according to the PMI includes:

selecting the corresponding precoding matrix W from a codebook according to the PMI.

In addition, the foregoing codebook includes a precoding matrix $W_i$ and a precoding matrix $W_j$, and the two precoding matrices satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, $m=1, \ldots, n$, and n is determined by a quantity of antenna ports. Optionally, phases of diagonal elements $\mu_1, \mu_2, \ldots, \mu_n$ of the matrix $D(i,j)$ form an arithmetic progression.

Alternatively, the codebook includes a precoding matrix $W_i$ and a precoding matrix $W_k$, and the two precoding matrices satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, $\alpha_m$ is a complex factor, a complex number $u^*_{m,l}$ is a conjugate complex number of a complex number $u_{m,l}$, $m=i,k$, $l=1, \ldots, n$, and n is determined by a quantity of antenna ports. Optionally, phases of diagonal elements $u_{m,1}, u_{m,2}, \ldots, u_{m,n}$ of the foregoing matrix $D_m$ form an arithmetic progression.

Figure 17:
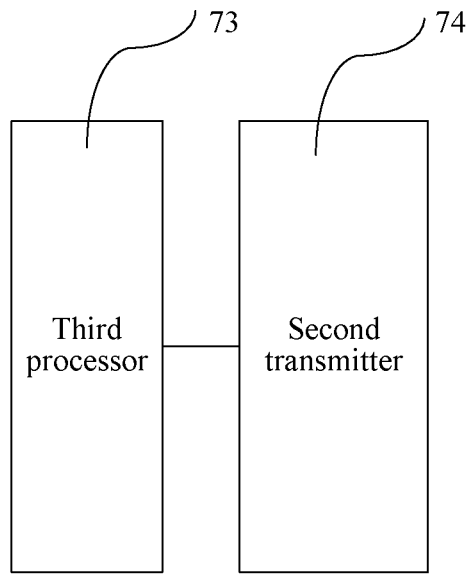
FIG. 17 is a second schematic structural diagram of user equipment according to an embodiment of the present invention.

FIG. 17 is a second schematic structural diagram of user equipment according to an embodiment of the present invention. As shown in FIG. 17, the user equipment includes a third processor 73 and a second transmitter 74. The third processor 73 is configured to determine a first precoding matrix indicator PMI, where the PMI corresponds to a precoding matrix $W_i$ in a codebook; and the second transmitter 74 is configured to send the first PMI to a base station, where the codebook includes at least: the precoding matrix $W_i$ and a precoding matrix $W_j$, and the precoding matrix $W_i$ and the precoding matrix $W_j$ in the codebook satisfy $W_i = D(i,j)W_j$; where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, $m=1, \ldots, n$, and n is determined by a quantity of antenna ports.

Optionally, phases of diagonal elements $\mu_1, \mu_2, \ldots, \mu_n$ of the foregoing matrix $D(i,j)$ form an arithmetic progression.

Figure 18:
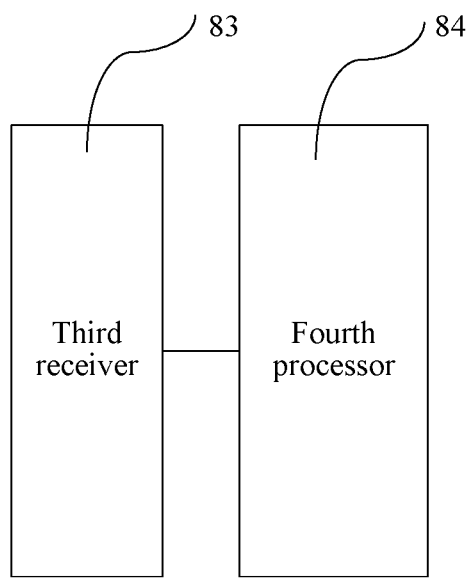
FIG. 18 is a second schematic structural diagram of a base station according to an embodiment of the present invention.

FIG. 18 is a second schematic structural diagram of a base station according to an embodiment of the present invention. As shown in FIG. 18, the base station includes a third receiver 81 and a fourth processor 82. The third receiver 81 included in the base station is configured to receive a first precoding matrix indicator PMI sent by user equipment; and the fourth processor 82 is configured to determine a corresponding precoding matrix $W_i$ from a codebook according to the first PMI, where the codebook includes at least: the precoding matrix $W_i$ and a precoding matrix $W_j$, and the precoding matrix $W_i$ and the precoding matrix $W_j$ in the codebook satisfy $W_i = D(i,j)W_j$, where $D(i,j) = \alpha_{(i,j)} \text{diag}\{\mu_1, \mu_2, \ldots, \mu_n, \mu^*_n, \mu^*_{n-1}, \ldots, \mu^*_1\}$, $\alpha_{(i,j)}$ is a complex factor, a complex number $\mu^*_m$ is a conjugate complex number of a complex number $\mu_m$, $m=1, \ldots, n$, and n is determined by a quantity of antenna ports.

Optionally, phases of diagonal elements $\mu_1, \mu_2, \ldots, \mu_n$ of the foregoing matrix $D(i,j)$ form an arithmetic progression.

Figure 19:
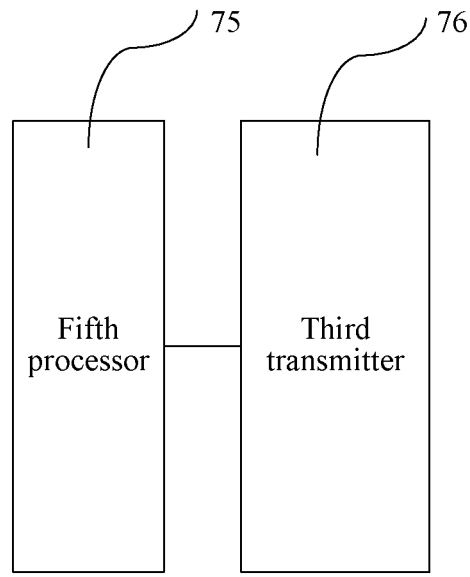
FIG. 19 is a third schematic structural diagram of user equipment according to an embodiment of the present invention.

FIG. 19 is a third schematic structural diagram of user equipment according to an embodiment of the present invention. As shown in FIG. 19, the user equipment includes a fifth processor 75 and a third transmitter 76. The fifth processor 75 is configured to determine a first precoding matrix indicator PMI, where the first PMI corresponds to a precoding matrix $W_i$ in a codebook; and the third transmitter 76 is configured to send the first PMI to a base station, where the codebook includes at least: the precoding matrix $W_i$ and a precoding matrix $W_j$, and the precoding matrix $W_i$ and a precoding matrix $W_k$ in the codebook satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, $m=i, k$, $\alpha_m$ is a complex factor, a complex number $u^*_{m,l}$ is a conjugate complex number of a complex number $u_{m,l}$, $m=i, k$, $l=1, \ldots, n$, and n is determined by a quantity of antenna ports; and the matrix V is a constant modulus matrix.

Optionally, phases of diagonal elements $u_{m,1}, u_{m,2}, \ldots, u_{m,n}$ of the foregoing matrix $D_m$ form an arithmetic progression.

Figure 20:
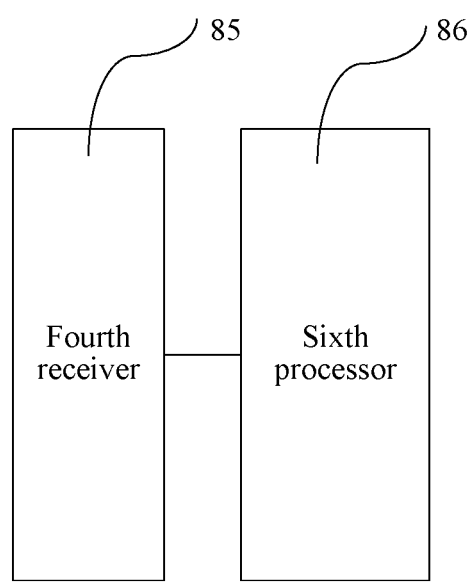
FIG. 20 is a third schematic structural diagram of a base station according to an embodiment of the present invention.

FIG. 20 is a third schematic structural diagram of a base station according to an embodiment of the present invention. As shown in FIG. 20, the base station includes a fourth receiver 85 and a sixth processor 86. The fourth receiver 85 is configured to receive a first precoding matrix indicator PMI sent by user equipment; and the sixth processor 86 is configured to determine a corresponding precoding matrix $W_i$ from a codebook according to the first PMI, where the codebook includes at least: the precoding matrix $W_i$ and a precoding matrix $W_j$, and the precoding matrix $W_i$ and a precoding matrix $W_k$ in the codebook satisfy $D_i^{-1}W_i = D_k^{-1}W_k = V$, where $D_m = \alpha_m \cdot \text{diag}\{u_{m,1}, u_{m,2}, \ldots, u_{m,n}, u^*_{m,n}, u^*_{m,n-1}, \ldots, u^*_{m,1}\}$, $m=i, k$, $\alpha_m$ is a complex factor, a complex number $u^*_{m,l}$ is a conjugate complex number of a complex number $u_{m,l}$, $m=i, k$, $l=1, \ldots, n$, and n is determined by a quantity of antenna ports; and the matrix V is a constant modulus matrix.

Optionally, phases of diagonal elements $u_{m,1}, u_{m,2}, \ldots, u_{m,n}$ of the foregoing matrix $D_m$ form an arithmetic progression.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A method for determining a precoding matrix indicator (PMI), comprising:
   receiving, by a user equipment, a reference signal sent by a base station; and
   determining, by the user equipment, the PMI according to the reference signal, wherein the PMI corresponds to a precoding matrix W, and the precoding matrix W satisfies a first condition, a second condition, or a third condition;
   sending, by the user equipment, the PMI to the base station; wherein
   the first condition is that the precoding matrix W satisfies W=DV, wherein D is a diagonal matrix, $D=\alpha \cdot diag\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, $i=1, \ldots, n$, and n is determined by a quantity of antenna ports; and V is a constant modulus matrix;
   the second condition is that the precoding matrix W comprises one or more column vectors of a block diagonal matrix $W_1$, or the precoding matrix W is obtained by performing weighted combination on one or more column vectors of a block diagonal matrix $W_1$, wherein $W_1=diag\{X_1, \ldots, X_{N_B}\}$, and $N_B \geq 1$, wherein at least one block matrix X is a product X=DV of a matrix D and a matrix V, and $X \in \{X_1, X_2, \ldots, X_{N_B}\}$; the matrix D is a diagonal matrix, $D=\alpha \cdot diag\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, $i=1, \ldots, n$, and n is determined by a quantity of antenna ports; and the matrix V is a constant modulus matrix; and
   the third condition is that the precoding matrix W comprises one or more column vectors of a block diagonal matrix $W_1$, or the precoding matrix W is obtained by performing weighted combination on one or more column vectors of a block diagonal matrix $W_1$, wherein $W_1=diag\{X_1, \ldots, X_{N_B}\}$, and $N_B \geq 1$, wherein at least one block matrix X is a Kronecker product of a matrix A and a matrix B, $X=A \otimes B$, and $X \in \{X_1, X_2, \ldots, X_{N_B}\}$; the matrix A or the matrix B is a product of a matrix D and a matrix V; the matrix D is a diagonal matrix, $D=\alpha \cdot diag\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, $i=1, \ldots, n$, and n is a quantity of rows of the matrix A or the matrix B; and the matrix V is a constant modulus matrix.

2. The method according to claim 1, wherein phases of diagonal elements $u_1, u_2, \ldots, u_n$ of the matrix D form an arithmetic progression.

3. The method according to claim 1, wherein the matrix V comprises at least one of a column vector 1 and one or more column vectors $v_m$, the column vector 1 is a column vector whose elements are all 1, and any column vector $v_m$ is in the form $v=[v_1\ v_2\ \ldots\ v_n\ \bar{v}_n\ \bar{v}_{n-1}\ \ldots\ \bar{v}_1]^T$, wherein an element is $\bar{v}_i=-v_i$, $v_i=\pm 1$, $i=1, \ldots, n$, and $[\ ]^T$ is a transposing matrix.

4. A method for determining a precoding matrix indicator (PMI), comprising:
   transmitting, by a base station, a reference signal to a user equipment;
   receiving, by the base station, the PMI, according to the reference signal, and sent by the user equipment;
   determining, by the base station, a corresponding precoding matrix W according to the PMI, wherein the precoding matrix W satisfies a first condition, a second condition, or a third condition; wherein
   the first condition is that the precoding matrix W satisfies W=DV;
   the second condition is that the precoding matrix W comprises one or more column vectors of a block diagonal matrix $W_1$, or the precoding matrix W is obtained by performing weighted combination on one or more column vectors of a block diagonal matrix $W_1$, wherein $W_1=diag\{X_1, \ldots, X_{N_B}\}$, and $N_B \geq 1$, wherein at least one block matrix X is a product X=DV of a matrix D and a matrix V, and $X \in \{X_1, X_2, \ldots, X_{N_B}\}$; and
   the third condition is that the precoding matrix W comprises one or more column vectors of a block diagonal matrix $W_1$, or the precoding matrix W is obtained by performing weighted combination on one or more column vectors of a block diagonal matrix $W_1$, wherein $W_1=diag\{X_1, \ldots, X_{N_B}\}$, and $N_B \geq 1$, wherein at least one block matrix X is a Kronecker product of a matrix A and a matrix B, $X=A \otimes B$, and $X \in \{X_1, X_2, \ldots, X_{N_B}\}$; the matrix A or the matrix B is a product of a matrix D and a matrix V, the matrix D is a diagonal matrix, $i=1, \ldots, n$, and n is a quantity of rows of the matrix A or the matrix B,
   wherein the matrix D is a diagonal matrix, $D=\alpha \cdot diag\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix.

5. The method according to claim 4, wherein
phases of diagonal elements $u_1, u_2, \ldots, u_n$ of the matrix D form an arithmetic progression.

6. The method according to claim 4, wherein
the matrix V comprises at least one of a column vector 1 and one or more column vectors $v_m$, the column vector 1 is a column vector whose elements are all 1, and any column vector $v_m$ is in the form $v=[v_1\ v_2\ \ldots\ v_n\ \bar{v}_n\ \bar{v}_{n-1}\ \ldots\ \bar{v}_1]^T$, wherein an element is $\bar{v}_i=-v_i$, $v_i=\pm 1$, $i=1, \ldots, n$, and $[\ ]^T$ is a transposing matrix.

7. A user equipment, comprising:
a receiver, configured to receive a reference signal sent by a base station;
a first processor, configured to determine a precoding matrix indicator (PMI) according to the reference signal, wherein the PMI corresponds to a precoding matrix W, and the precoding matrix W satisfies a first condition, a second condition, or a third condition; and a first transmitter, configured to send the PMI to the base station; wherein the first condition is that the precoding matrix W satisfies W=DV, wherein D is a diagonal matrix, D=$\alpha$·diag$\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and V is a constant modulus matrix;

the second condition is that the precoding matrix W comprises one or more column vectors of a block diagonal matrix $W_1$, or the precoding matrix W is obtained by performing weighted combination on one or more column vectors of a block diagonal matrix $W_1$, wherein $W_1$=diag$\{X_1, \ldots, X_{N_B}\}$, and $N_B \geq 1$, wherein at least one block matrix X is a product X=DV of a matrix D and a matrix V, and X$\in\{X_1, X_2, \ldots, X_{N_B}\}$; the matrix D is a diagonal matrix, D=$\alpha$·diag$\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix; and the third condition is that the precoding matrix W comprises one or more column vectors of a block diagonal matrix $W_1$, or the precoding matrix W is obtained by performing weighted combination on one or more column vectors of a block diagonal matrix $W_1$, wherein $W_1$=diag$\{X_1, \ldots, X_{N_B}\}$, and $N_B \geq 1$, wherein at least one block matrix X is a Kronecker product of a matrix A and a matrix B, X=A$\otimes$B, and X$\in\{X_1, X_2, \ldots, X_{N_B}\}$; the matrix A or the matrix B is a product of a matrix D and a matrix V; the matrix D is a diagonal matrix, D=$\alpha$·diag$\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, i=1, \ldots, n, and n is a quantity of rows of the matrix A or the matrix B; and the matrix V is a constant modulus matrix.

8. The user equipment according to claim 7, wherein phases of diagonal elements $u_1, u_2, \ldots, u_n$ of the matrix D form an arithmetic progression.

9. The user equipment according to claim 7, wherein the matrix V comprises at least one of a column vector 1 and one or more column vectors $v_m$, the column vector 1 is a column vector whose elements are all 1, and any column vector $v_m$ is in the form v=$[v_1 \, v_2 \, \ldots \, v_n \, \bar{v}_n \, \bar{v}_{n-1} \, \ldots \, \bar{v}_1]^T$, wherein an element is $\bar{v}_i=-v_i$, $v_i=\pm 1$, i=1, \ldots, n, and $[\,]^T$ is a transposing matrix.

10. A base station, comprising:

a transmitter, configured to transmit a reference signal to a user equipment;

a receiver, configured to receive a precoding matrix indicator (PMI), according to the reference signal, and sent by the user equipment; and a second processor, configured to: determine a corresponding precoding matrix W according to the PMI, wherein the precoding matrix W satisfies a first condition, a second condition, or a third condition, wherein the first condition is that the precoding matrix W satisfies W=DV;

the second condition is that the precoding matrix W comprises one or more column vectors of a block diagonal matrix $W_1$, or the precoding matrix W is obtained by performing weighted combination on one or more column vectors of a block diagonal matrix $W_1$, wherein $W_1$=diag$\{X_1, \ldots, X_{N_B}\}$, and $N_B \geq 1$, wherein at least one block matrix X is a product X=DV of a matrix D and a matrix V, and X$\in\{X_1, X_2, \ldots, X_{N_B}\}$; and the third condition is that the precoding matrix W comprises one or more column vectors of a block diagonal matrix $W_1$, or the precoding matrix W is obtained by performing weighted combination on one or more column vectors of a block diagonal matrix $W_1$, wherein $W_1$=diag$\{X_1, \ldots, X_{N_B}\}$, and $N_B \geq 1$, wherein at least one block matrix X is a Kronecker product of a matrix A and a matrix B, X=A$\otimes$B, and X$\in\{X_1, X_2, \ldots, X_{N_B}\}$; the matrix A or the matrix B is a product of a matrix D and a matrix V; the matrix D is a diagonal matrix, i=1, \ldots, n, and n is a quantity of rows of the matrix A or the matrix B, wherein the matrix D is a diagonal matrix, D=$\alpha$·diag$\{u_1, u_2, \ldots, u_n, u^*_n, u^*_{n-1}, \ldots, u^*_1\}$, $\alpha$ is a complex factor, a complex number $u^*_i$ is a conjugate complex number of a complex number $u_i$, and n is determined by a quantity of antenna ports; and the matrix V is a constant modulus matrix.

11. The base station according to claim 10, wherein phases of diagonal elements $u_1, u_2, \ldots, u_n$ of the matrix D form an arithmetic progression.

12. The base station according to claim 10, wherein the matrix V comprises at least one of a column vector 1 and one or more column vectors $v_m$, the column vector 1 is a column vector whose elements are all 1, and any column vector $v_m$ is in the form v=$[v_1 \, v_2 \, \ldots \, v_n \, \bar{v}_n \, \bar{v}_{n-1} \, \ldots \, \bar{v}_1]^T$, wherein an element is $\bar{v}_i=-v_i$, $v_i=\pm 1$, i=1, \ldots, n, and $[\,]^T$ is a transposing mix.

13. The method according to claim 1, wherein the precoding matrix W is used to control a beam shape and a beam orientation, in a horizontal direction and a perpendicular direction.

* * * * *